(12) United States Patent
Ito et al.

(10) Patent No.: US 8,866,884 B2
(45) Date of Patent: Oct. 21, 2014

(54) IMAGE PROCESSING APPARATUS, IMAGE PROCESSING METHOD AND PROGRAM

(75) Inventors: Atsushi Ito, Tokyo (JP); Toshio Yamazaki, Tokyo (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 873 days.

(21) Appl. No.: 12/960,066

(22) Filed: Dec. 3, 2010

(65) Prior Publication Data

US 2011/0273531 A1 Nov. 10, 2011

(30) Foreign Application Priority Data

Dec. 14, 2009 (JP) ................................ P2009-283080

(51) Int. Cl.
*H04N 13/00* (2006.01)
*H04N 13/02* (2006.01)

(52) U.S. Cl.
CPC .......... *H04N 13/026* (2013.01); *H04N 13/0275* (2013.01); *H04N 2213/003* (2013.01)
USPC .......... 348/43; 348/46; 348/51; 348/E13.001; 348/E13.002; 348/E13.003; 348/E13.02; 348/E13.068; 348/E13.074; 348/E13.075; 382/154; 382/162; 345/419

(58) Field of Classification Search
CPC .. H04N 13/00; H04N 13/026; H04N 13/0282
USPC ................ 348/43, 46, 51, E13.001, E13.002, 348/E13.003, E13.02, E13.068, E13.074, 348/E13.075; 345/419; 382/154, 162
See application file for complete search history.

(56) References Cited

U.S. PATENT DOCUMENTS

| 6,005,975 | A | * | 12/1999 | Cheon ........................... 382/199 |
| 6,163,337 | A | * | 12/2000 | Azuma et al. .................. 348/43 |
| 6,445,833 | B1 | | 9/2002 | Murata et al. |
| 6,553,184 | B1 | | 4/2003 | Ando et al. |

(Continued)

FOREIGN PATENT DOCUMENTS

| JP | 06-194602 | 7/1994 |
| JP | 08-30806 | 2/1996 |

(Continued)

OTHER PUBLICATIONS

Office Action issued Jun. 11, 2013 by Japan Patent Office in corresponding Application No. JP 2009-283080 (4 pages).

*Primary Examiner* — Behrooz Senfi
*Assistant Examiner* — Maria Vazquez Colon
(74) *Attorney, Agent, or Firm* — Finnegan, Henderson, Farabow, Garrett & Dunner, L.L.P.

(57) ABSTRACT

An image processing apparatus includes an image input unit that inputs a two-dimensional image signal, a depth information output unit that inputs or generates depth information of image areas constituting the two-dimensional image signal, an image conversion unit that receives the image signal and the depth information from the image input unit and the depth information output unit, and generates and outputs a left eye image and a right eye image for realizing binocular stereoscopic vision, and an image output unit that outputs the left and right eye images. The image conversion unit extracts a spatial feature value of the input image signal, and performs an image conversion process including an emphasis process applying the feature value and the depth information with respect to the input image signal, thereby generating at least one of the left eye image and the right eye image.

17 Claims, 28 Drawing Sheets

(56) References Cited

U.S. PATENT DOCUMENTS

| | | | |
|---|---|---|---|
| 6,584,219 B1* | 6/2003 | Yamashita et al. | 382/154 |
| 7,262,767 B2 | 8/2007 | Yamada | |
| 7,869,649 B2* | 1/2011 | Watanabe et al. | 382/162 |
| 7,929,027 B2* | 4/2011 | Okamoto et al. | 348/231.2 |
| 8,029,139 B2* | 10/2011 | Ellinger et al. | 353/7 |
| 8,029,193 B2* | 10/2011 | Schroeder | 384/55 |
| 8,040,307 B2* | 10/2011 | Kim et al. | 345/87 |
| 8,131,098 B2* | 3/2012 | Watanabe et al. | 382/254 |
| 8,238,024 B2* | 8/2012 | Tzschoppe et al. | 359/464 |
| 2011/0135182 A1* | 6/2011 | Goto et al. | 382/131 |
| 2012/0127287 A1* | 5/2012 | Redmann | 348/54 |

FOREIGN PATENT DOCUMENTS

| | | |
|---|---|---|
| JP | 08-063615 | 3/1996 |
| JP | 9-116930 | 5/1997 |
| JP | 10-51812 | 2/1998 |
| JP | 11-098534 | 4/1999 |
| JP | 2000-092516 | 3/2000 |
| JP | 2000-261828 | 9/2000 |
| JP | 2001-320731 | 11/2001 |
| JP | 2005-151534 | 6/2005 |

* cited by examiner

OCCLUSION PORTION

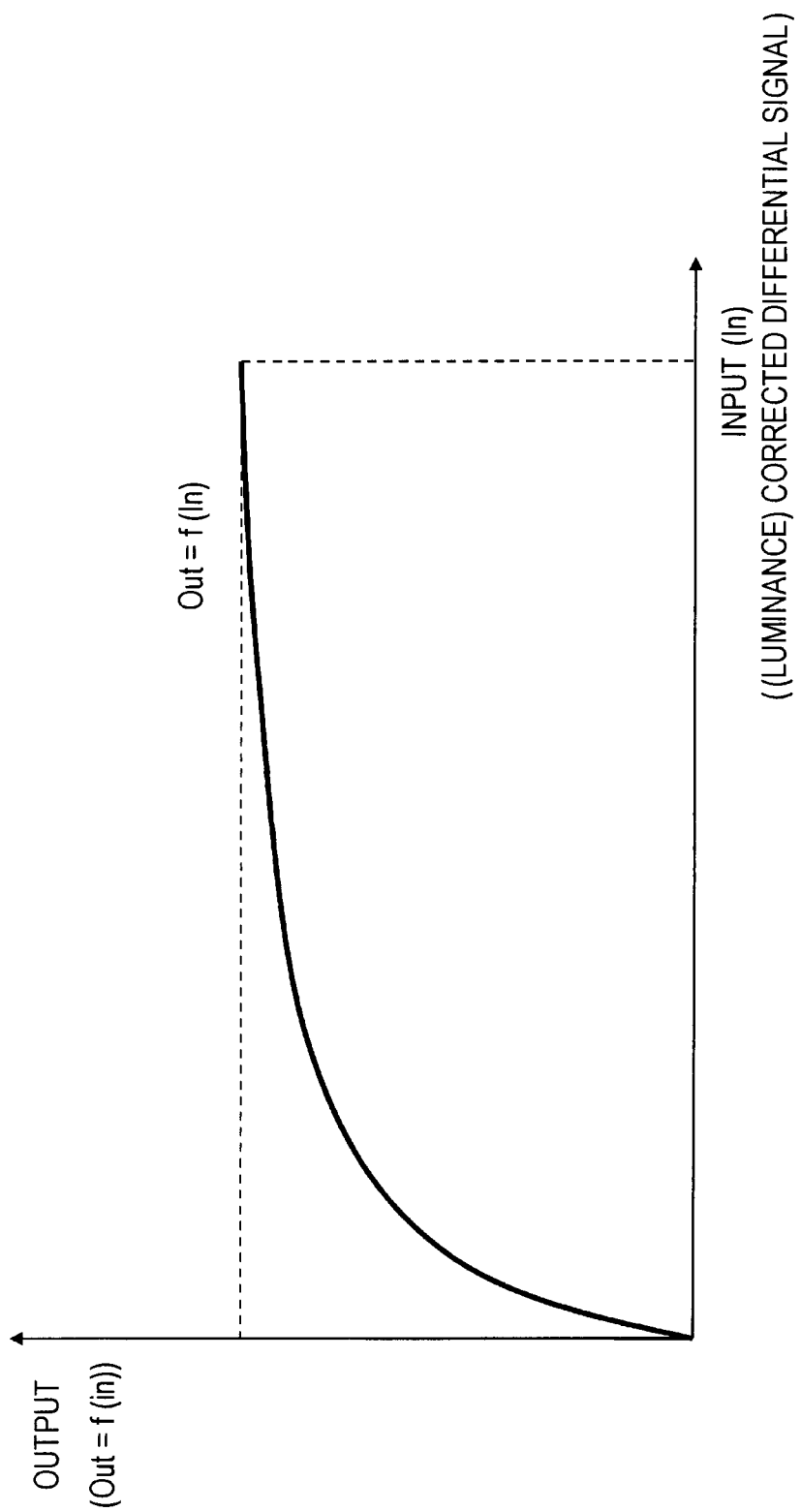

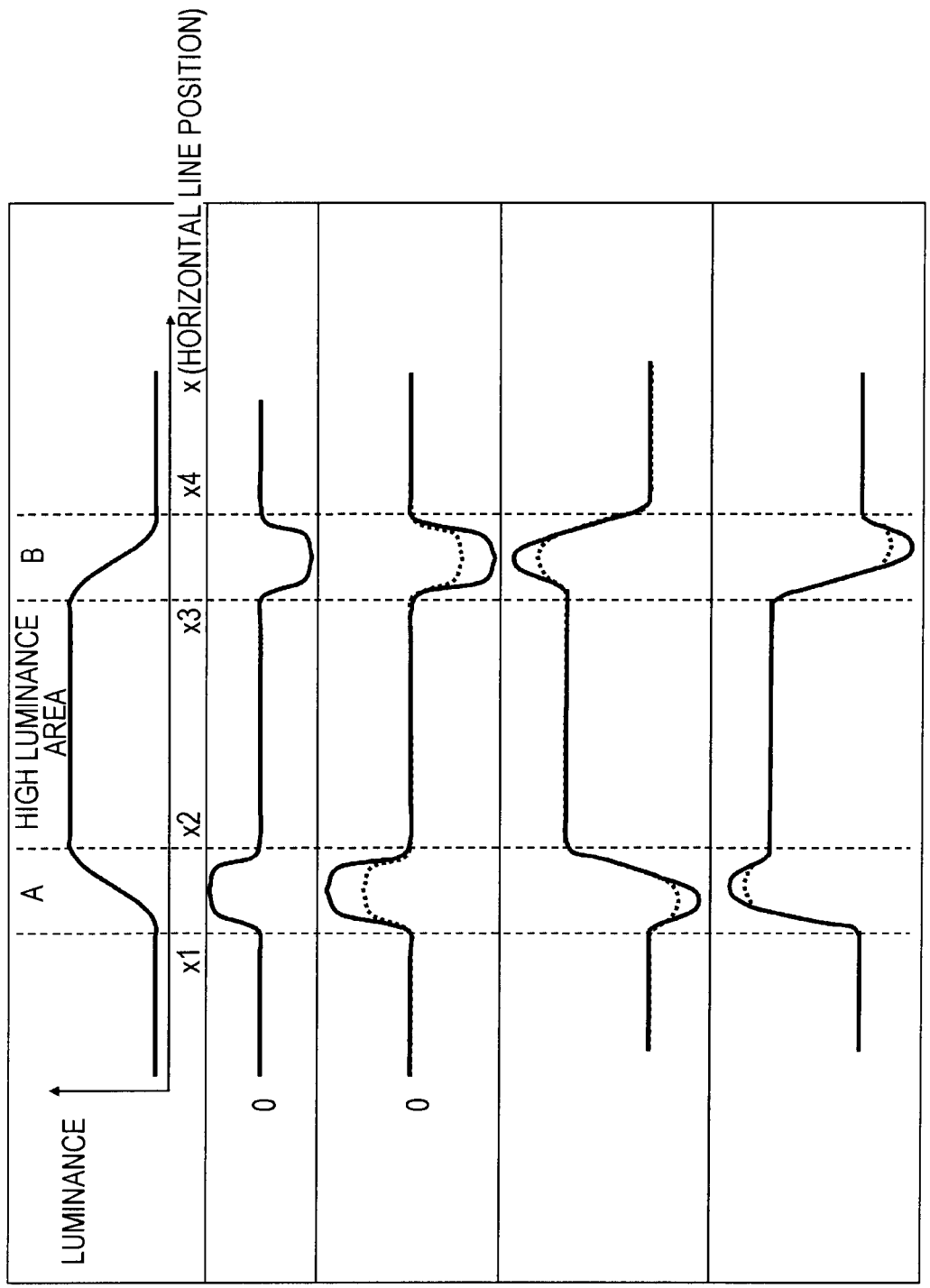

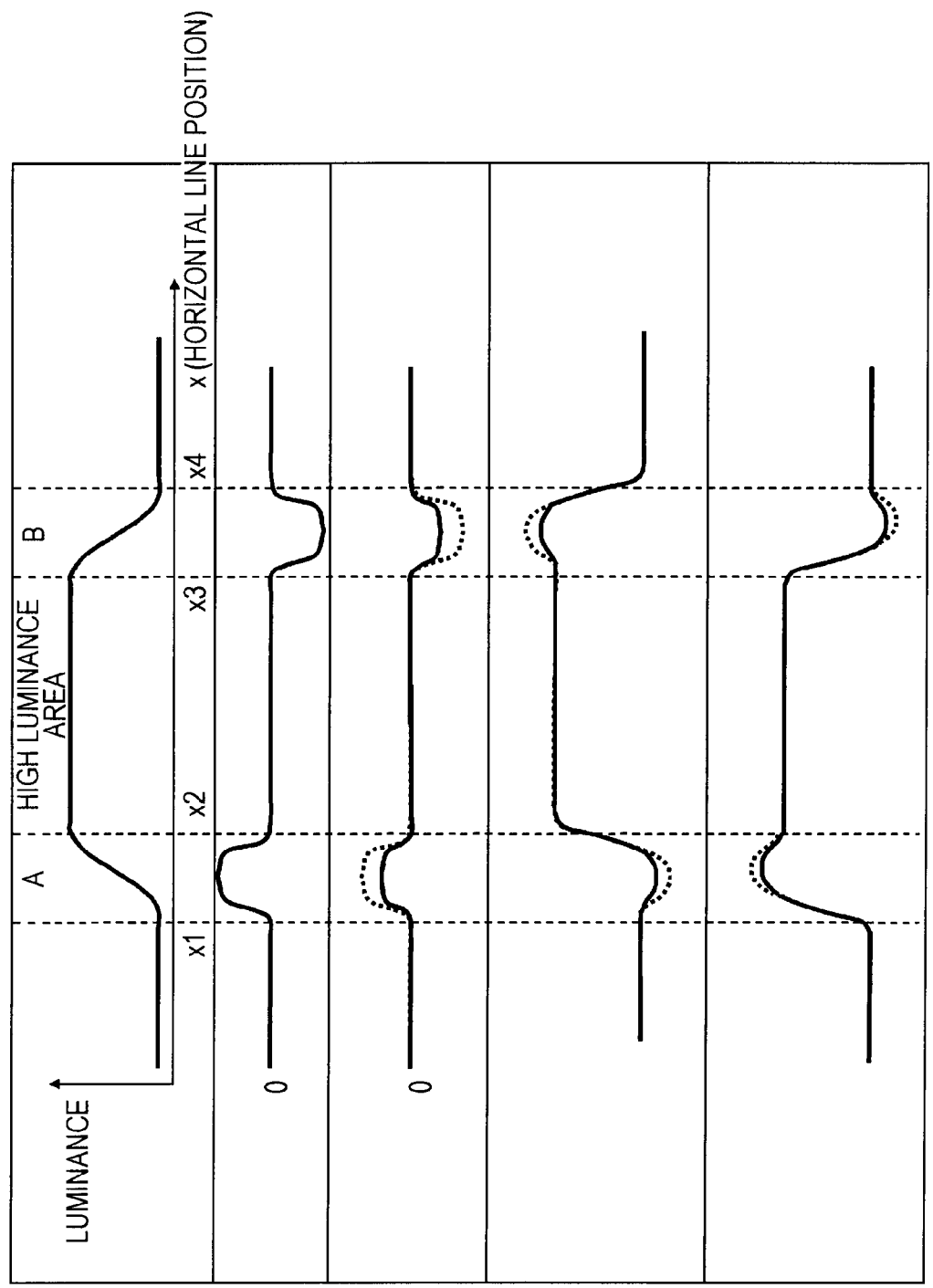

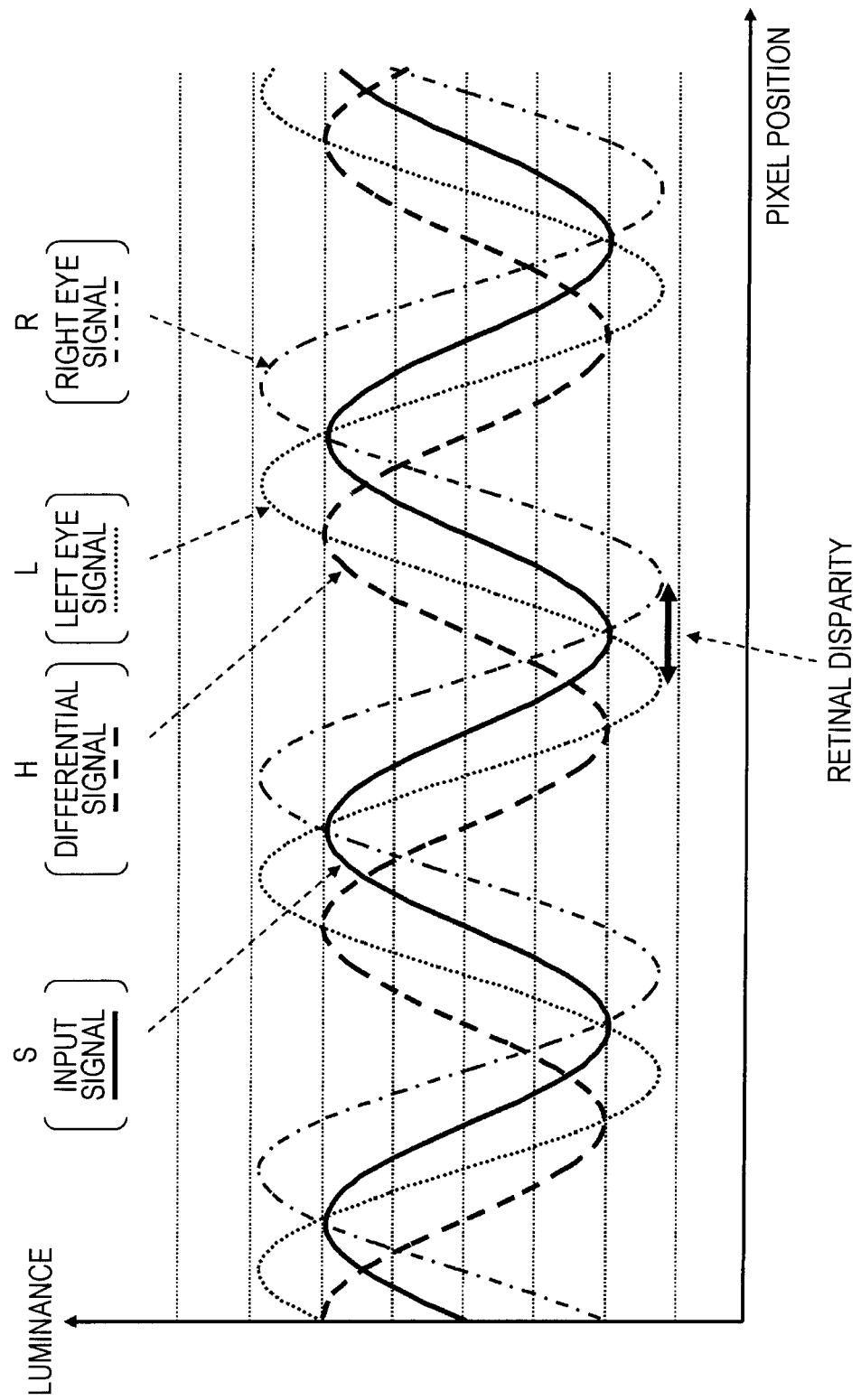

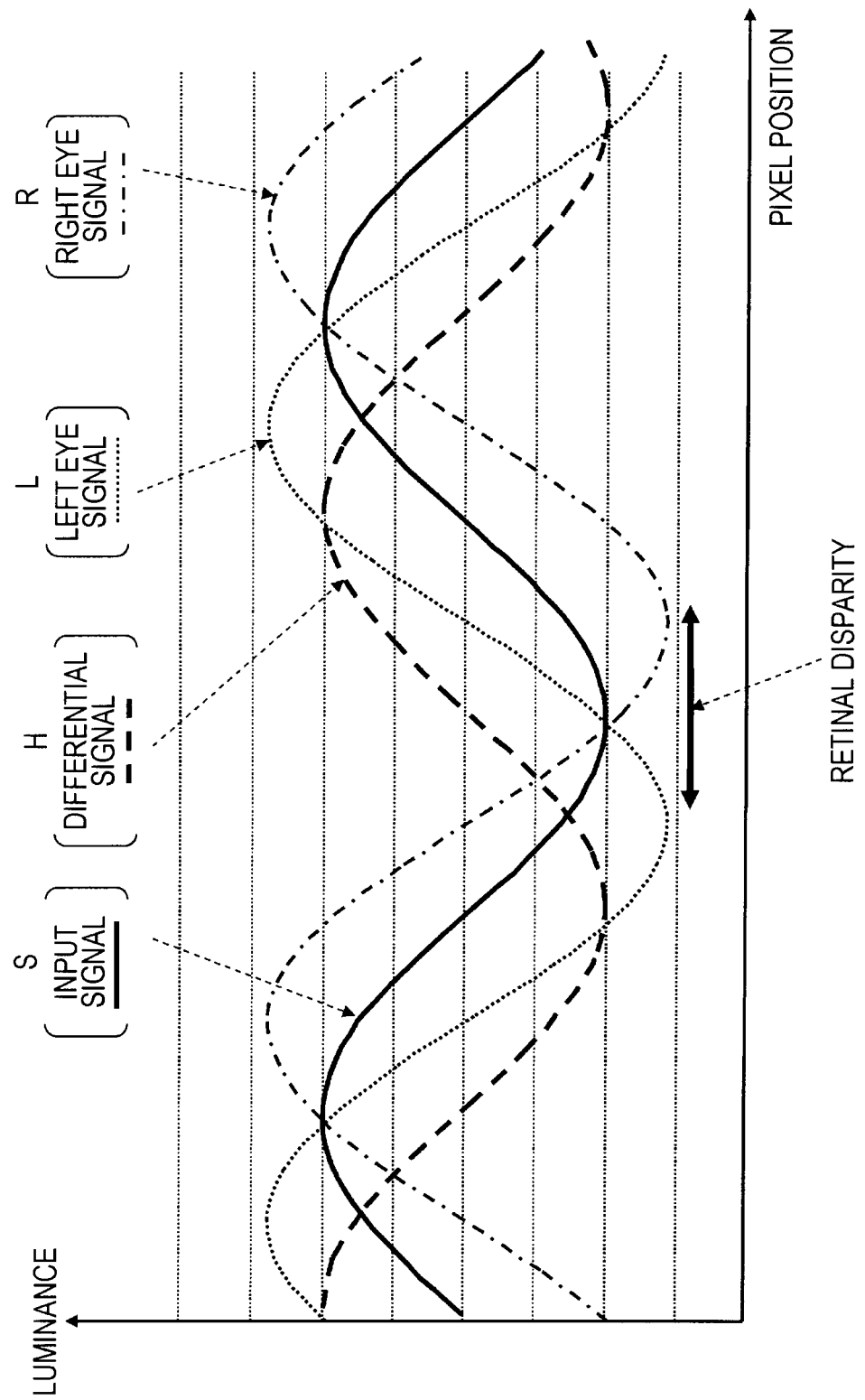

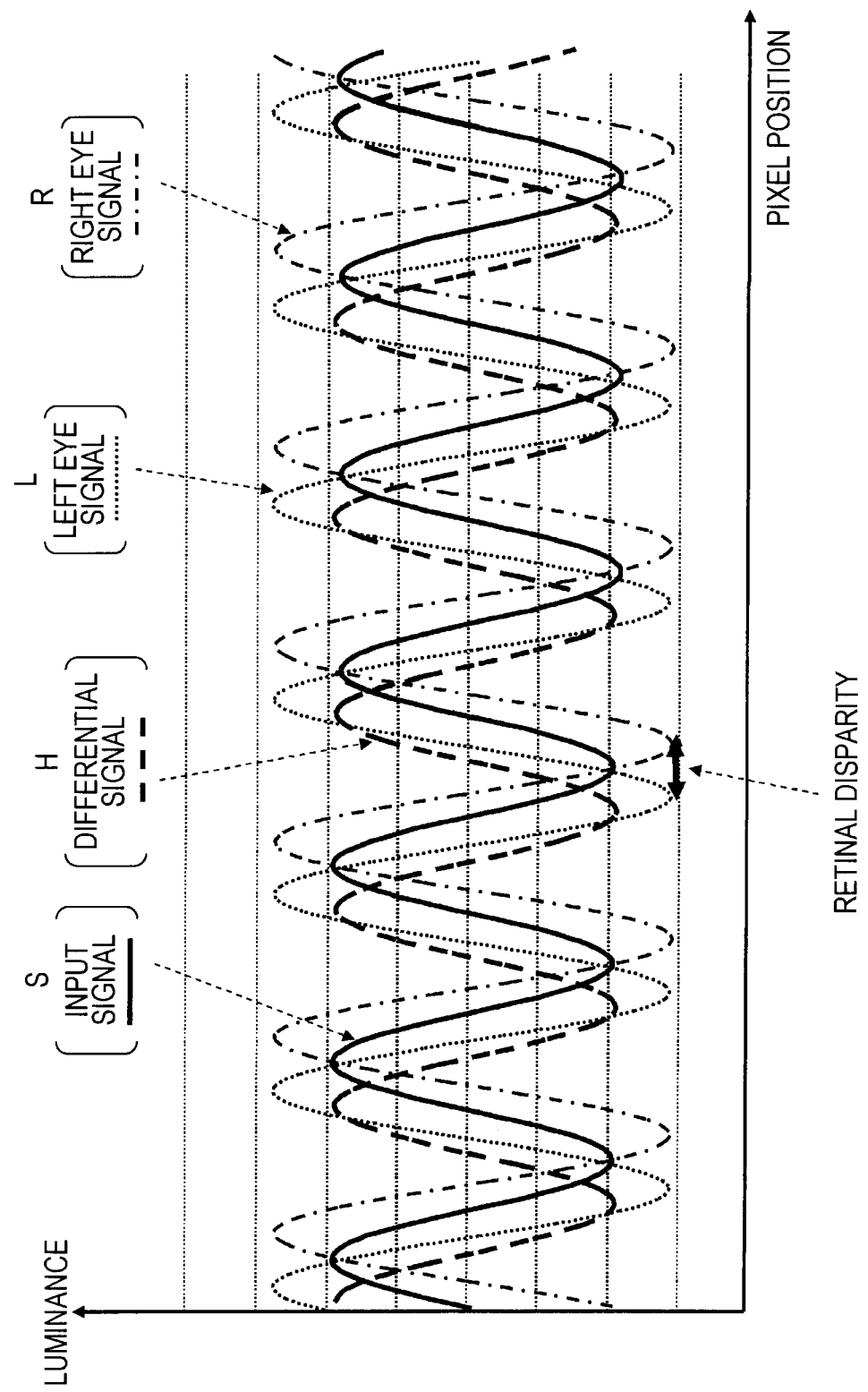

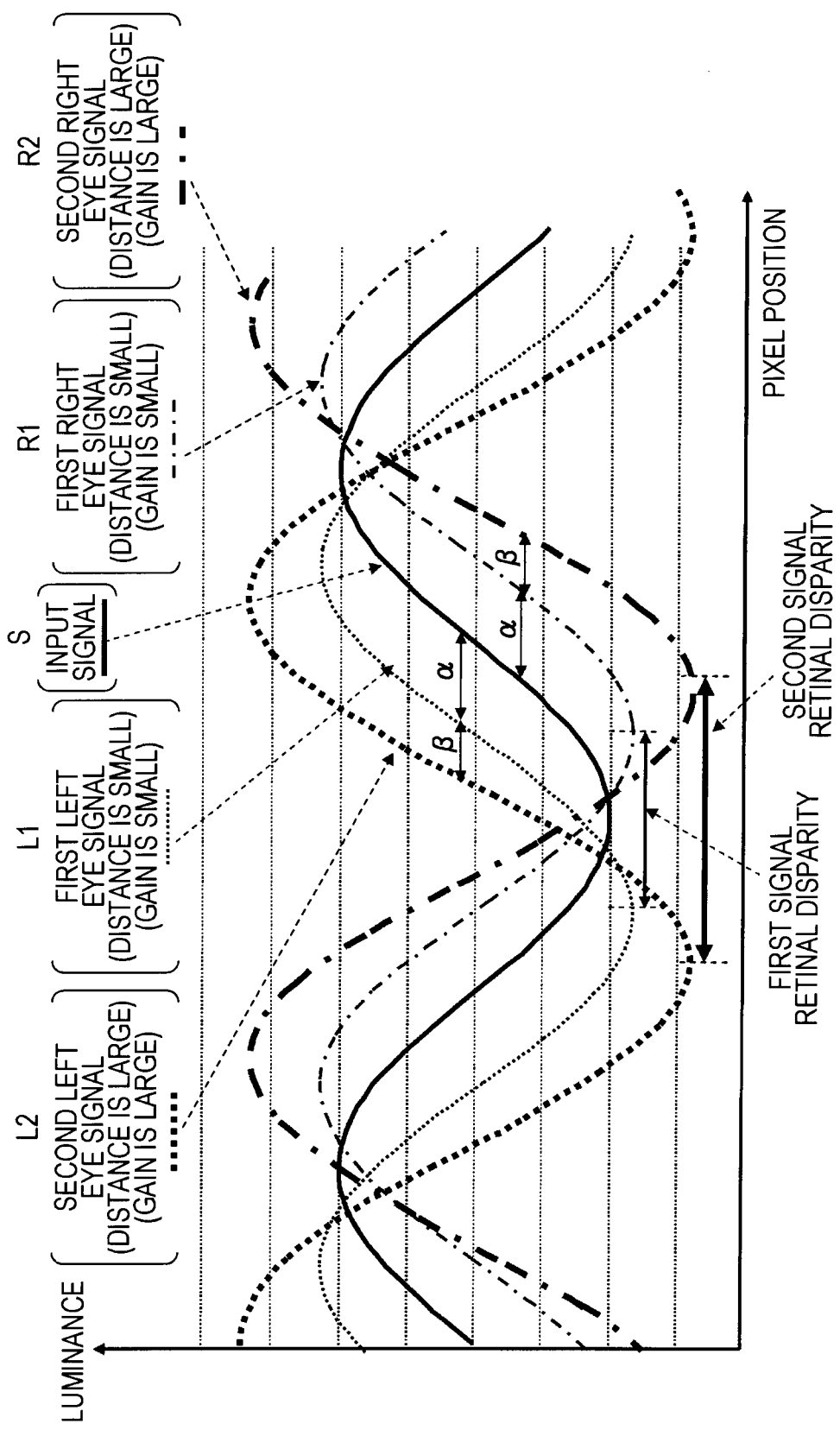

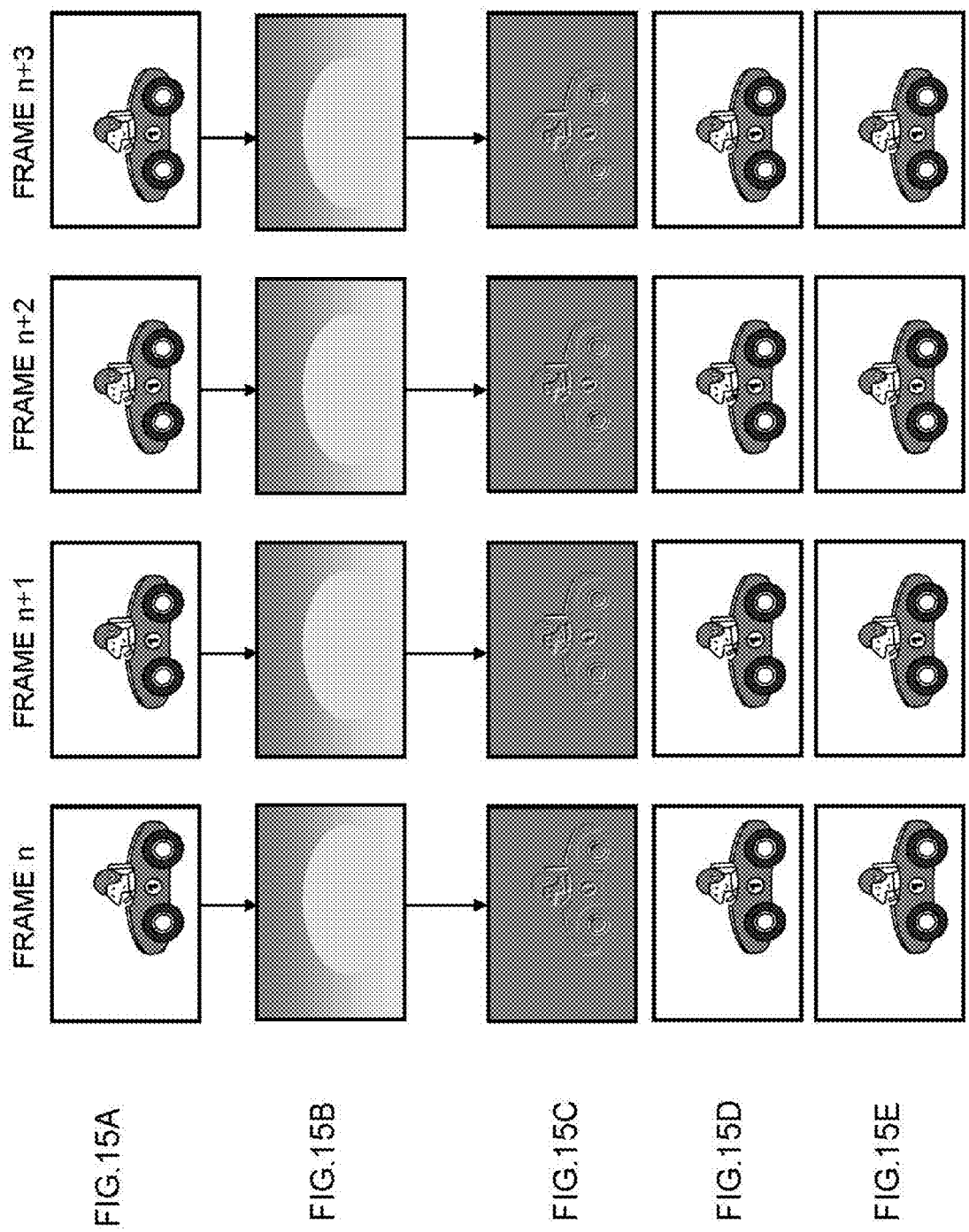

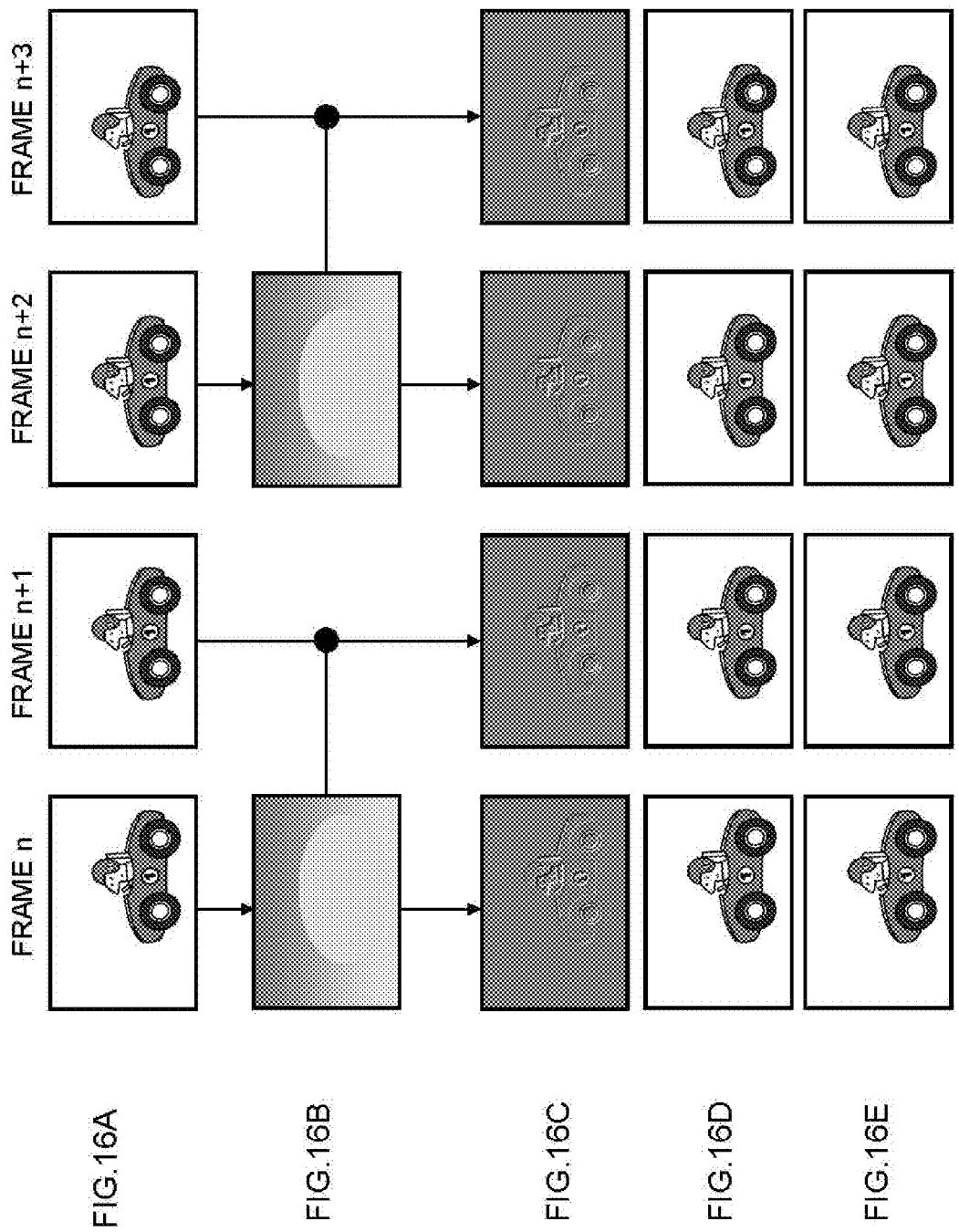

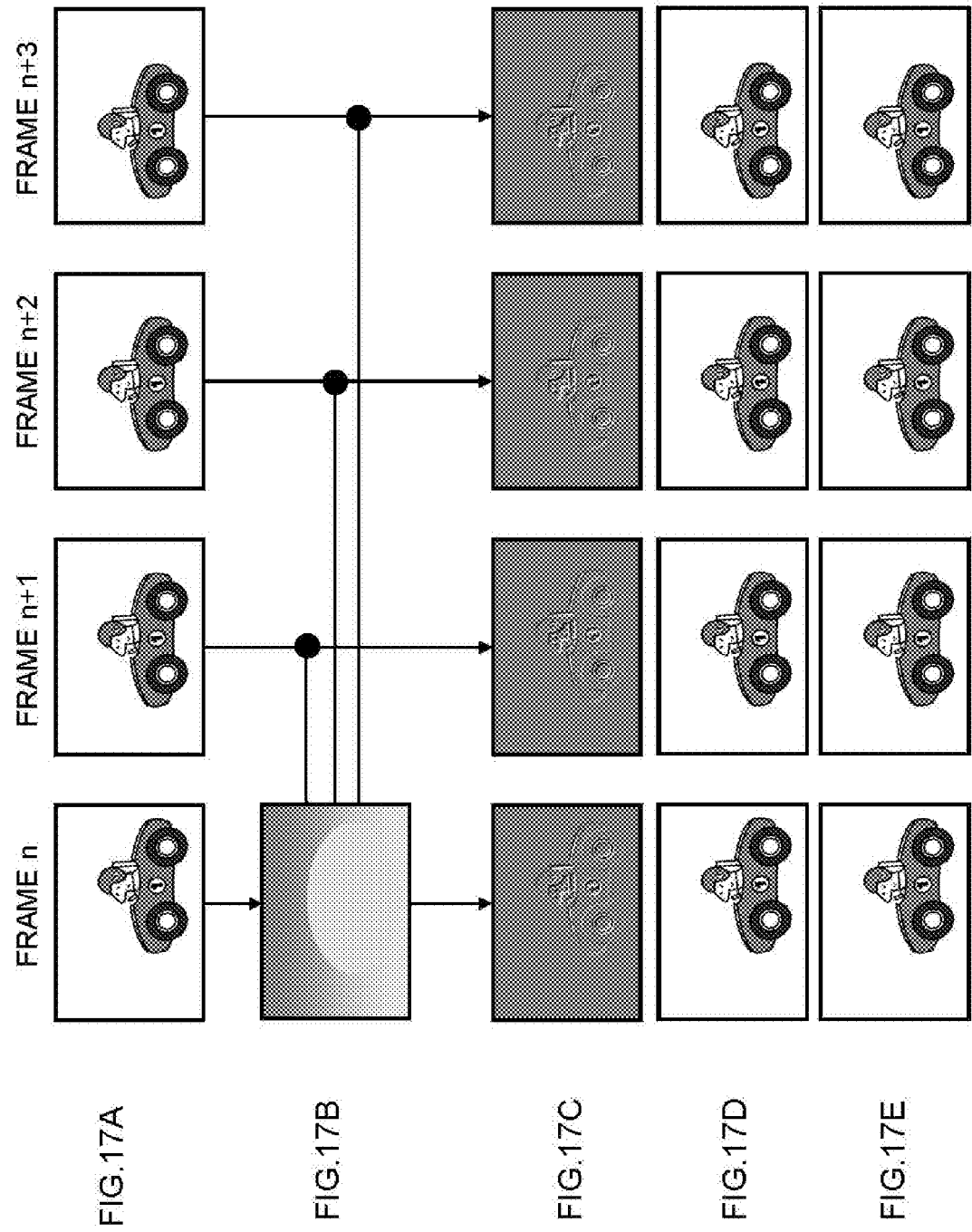

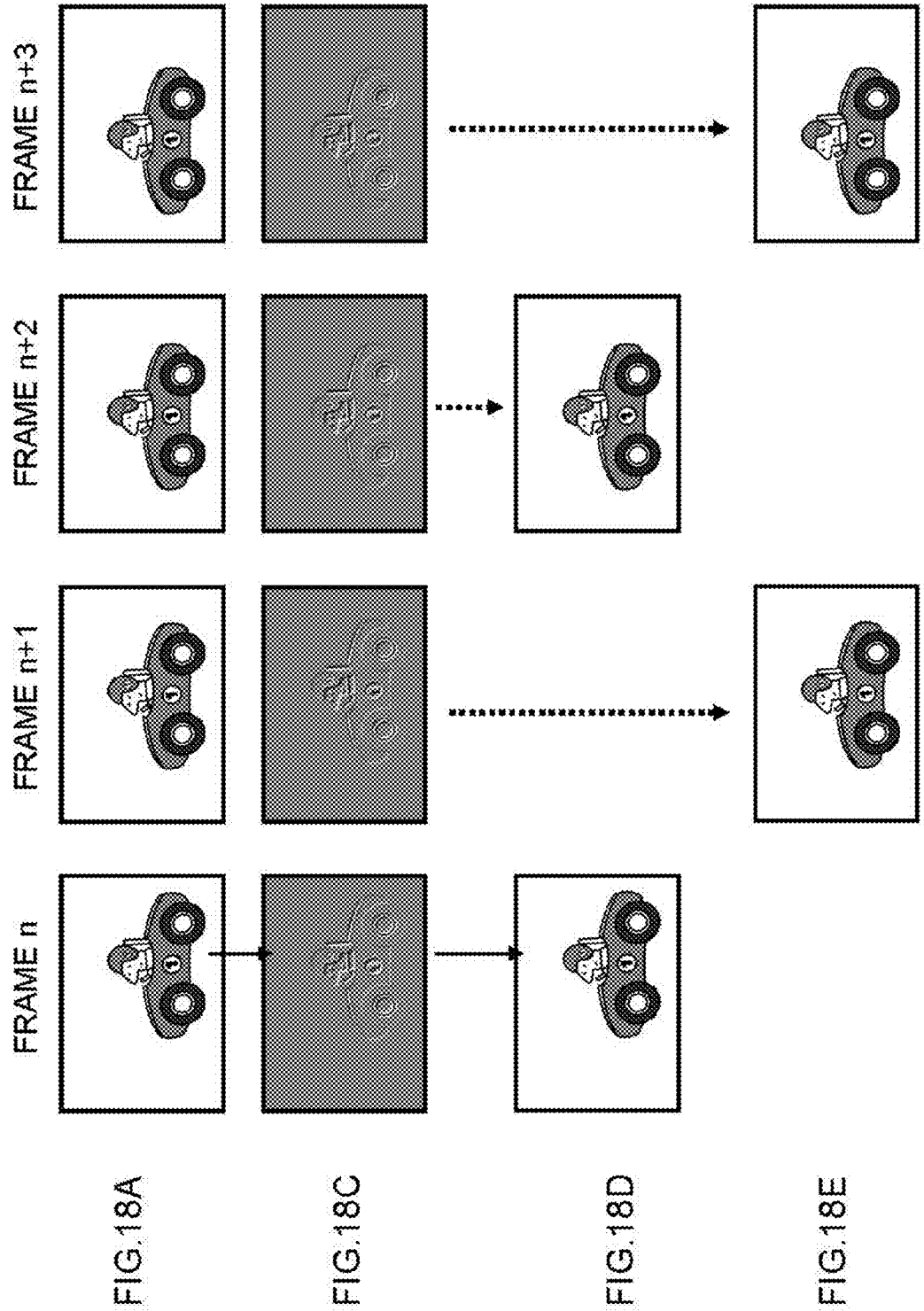

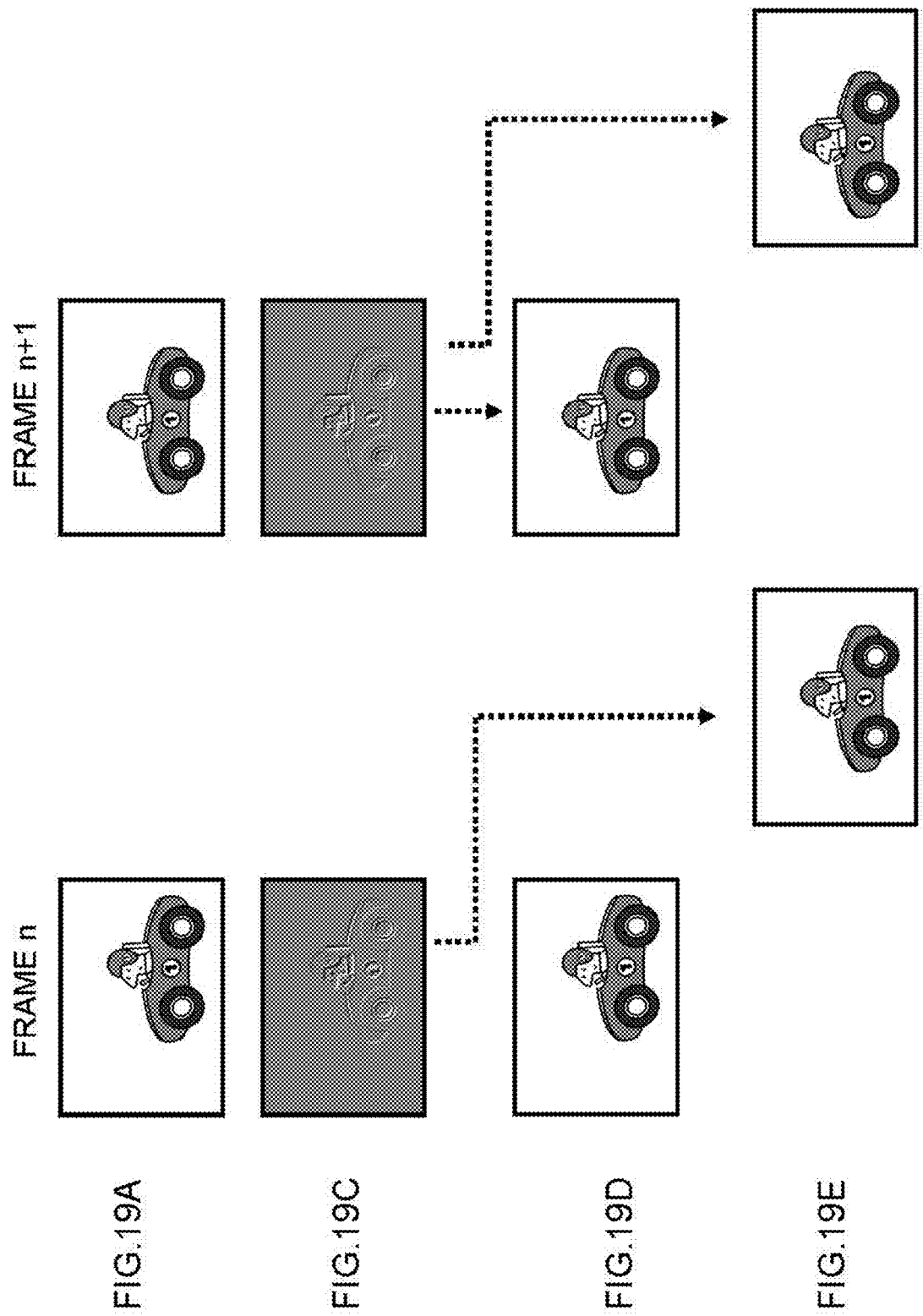

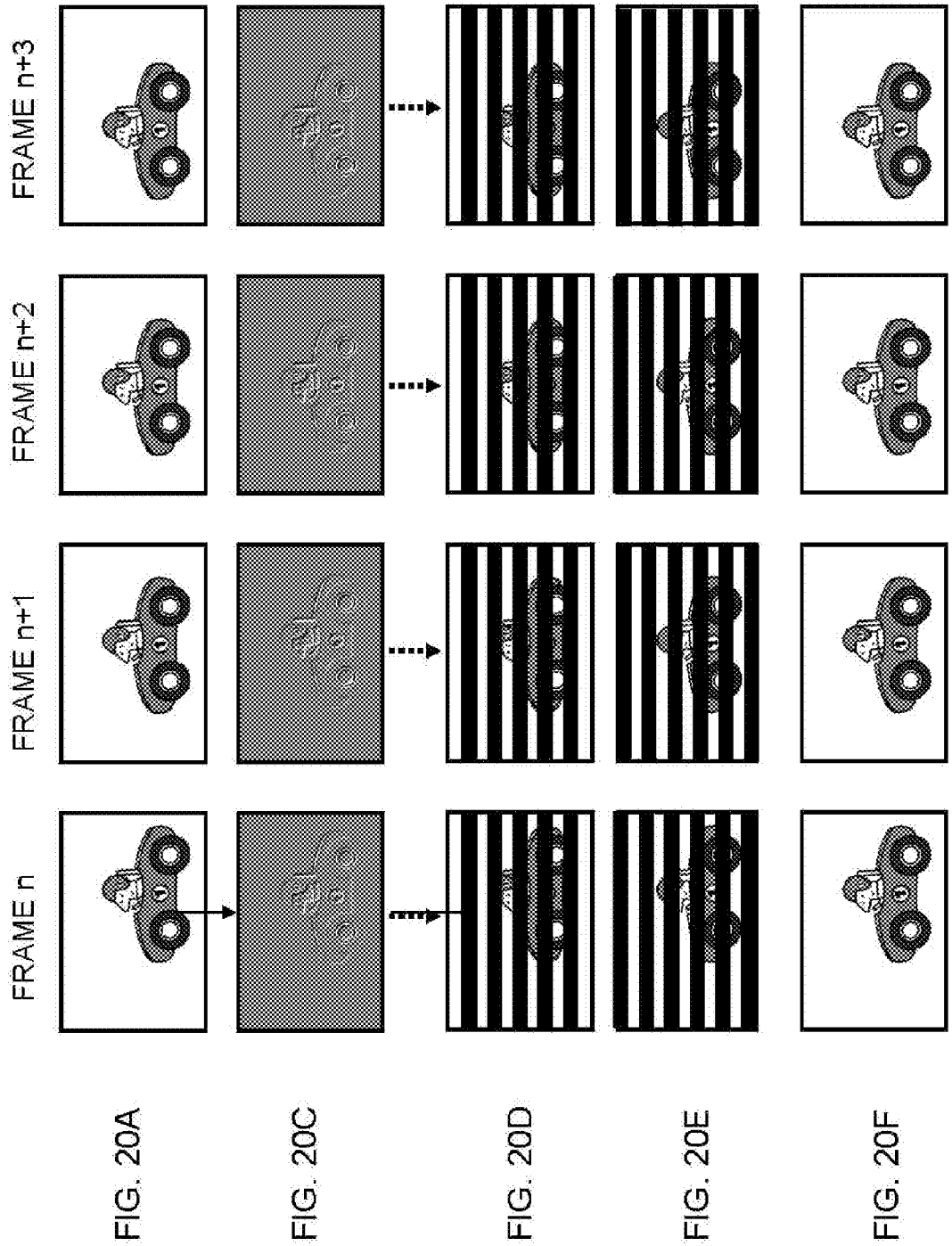

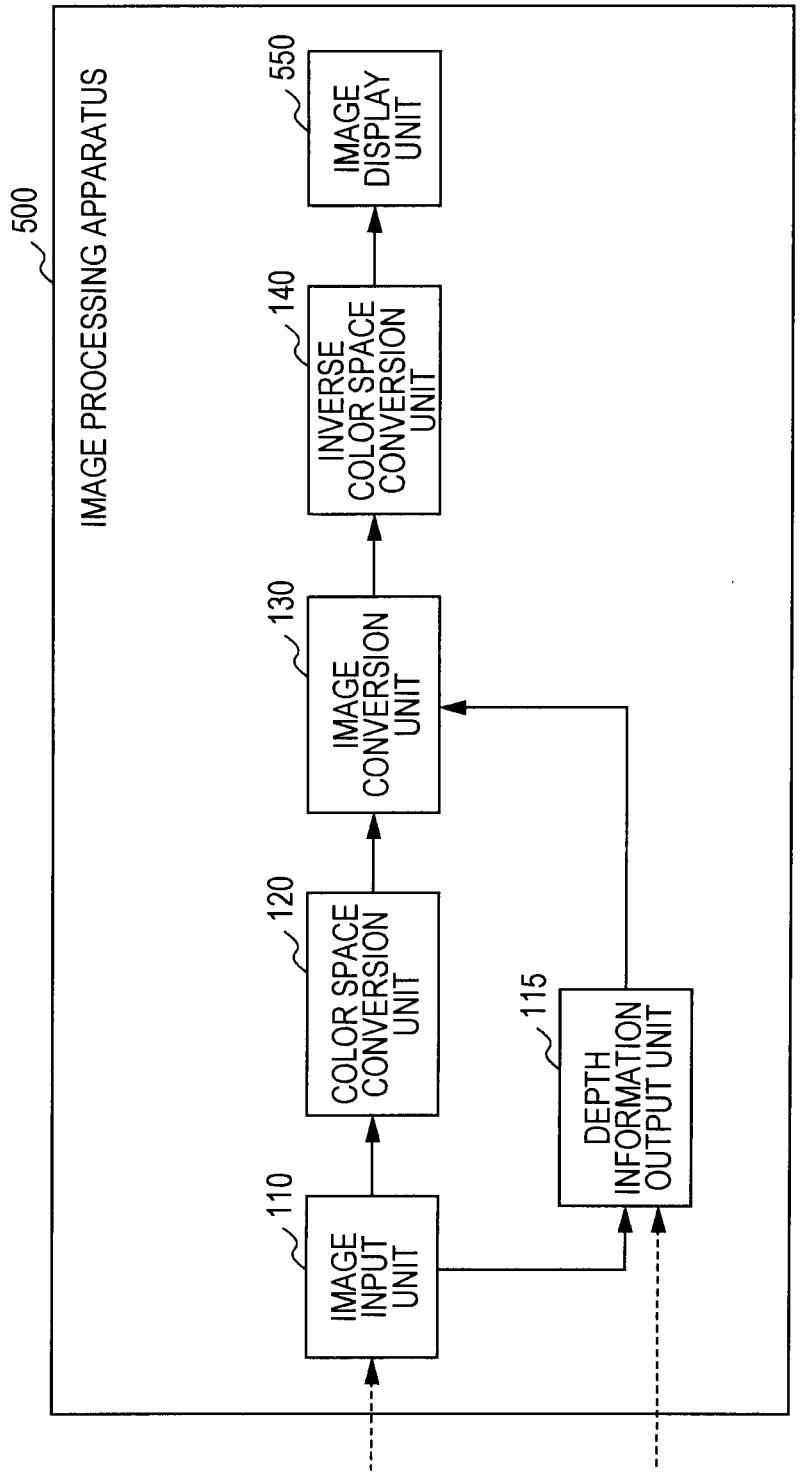

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method, and a program, and more particularly to, an image processing apparatus for generating a binocular parallax image corresponding to stereoscopic vision by performing image conversion with respect to a two-dimensional image, an image processing method, and a program.

2. Description of the Related Art

Various apparatuses and methods for converting a two-dimensional image into a binocular parallax image corresponding to stereoscopic vision have been proposed in the related art. The binocular parallax image generated based on the two-dimensional image includes a pair of a left eye image viewed by a left eye and a right eye image observed by a right eye. The binocular parallax image including the pair of the left eye image and the right eye image is displayed on a display apparatus capable of separating the binocular parallax image into the left eye image and the right eye image and providing them to the left eye and the right eye of an observer, the observer can recognize the images as a stereoscopic image.

The related art regarding the image generation and display process as described above are as follows.

For example, Japanese Unexamined Patent Application Publication No 8-30806 discloses an apparatus that shifts a left eye image and a right eye image in the horizontal direction by a predetermined amount with respect to a still image or an image with small motion, so that the image is recognized as if it floats up.

Furthermore, Japanese Unexamined Patent Application Publication No 10-51812 discloses a method that divides an image into a plurality of parallax calculation regions, calculates pseudo-depth from a feature value of the image in each region, and horizontally shifts a left eye image and a right eye image in the opposite direction based on the depth.

In addition, Japanese Unexamined Patent Application Publication No 2005-151534 discloses a method that calculates the feature value of the upper and lower portions of an image and adjusts a synthesis ratio of a plurality of scene structures representing depth information prepared in advance, thereby displaying an image through a combination of simple structures.

However, the above related art has the following problems.

According to the image conversion apparatus disclosed in Japanese Unexamined Patent Application Publication No 8-30806, the entire screen is simply shifted with respect to the still image or the image with small motion, and the context of a subject in the image may not be represented.

According to the image conversion apparatus disclosed in Japanese Unexamined Patent Application Publication No 10-51812, the pseudo-depth is estimated from the feature value of the image. However, since the estimation is based on the assumption that the sharpness, luminance and saturation of a subject located at the front of the screen are high, it may not be said that the estimation is right at all times. Since erroneous retinal disparity is applied to a subject for which depth estimation has been erroneously performed, the image may be disposed at an erroneous position.

According to the image conversion apparatus disclosed in Japanese Unexamined Patent Application Publication No 2005-151534, since the structure of the image is fitted to a relatively simple finite structure, unnatural depth is prevented from occurring. However, common problems occur in all the above-described related methods. That is, relatively large retinal disparity occurs in the generated binocular parallax image. The binocular parallax image is three-dimensionally displayed using a stereoscopic display apparatus. Generally, a stereoscopic display apparatus is used which allows a user to observe an image by using a special stereoscopic vision glasses. The stereoscopic display apparatus is classified into a passive glass type stereoscopic display apparatus, which separates an image observed by both eyes through polarizing filters or color filters, an active glass type stereoscopic display apparatus, which temporally separates an image to left and right images through a liquid crystal shutter, and the like.

In the case of seeing a binocular parallax image with a large retinal disparity, it is possible to perceive a stereoscopic effect due to retinal disparity when a user wears such stereoscopic vision glasses. However, when a user seeing an image after taking off the glasses, since the image is viewed as a double image in which left and right images largely overlap each other, the image may not be generally observed as a two-dimensional image. That is, the image converted by the existing image conversion apparatus can be really appreciated only when a user wears glasses.

Furthermore, the large retinal disparity is considered to have an influence on observer fatigue. For example, according to Japanese Unexamined Patent Application Publication No 6-194602, when a left eye image and a right eye image have been significantly shifted from each other, contradiction occurs in the control of an angle of convergence and the adjustment of the eye lens in the visibility in the real world, resulting in fatigue in stereoscopic vision using binocular parallax.

In addition, as a factor common to all the above related methods, a pixel shifting section most extensively used is employed in the generation method of the binocular parallax image corresponding to stereoscopic vision. However, when the binocular parallax image is generated through pixel shift, an area (i.e., an occlusion area) with no pixel information may occur.

The generation of an occlusion area when a left eye image and a right eye image are generated using a pixel shifting section will be described with reference to FIGS. 1A to 1D. FIGS. 1A to 1D illustrate an input image, depth information (a distance image), a right eye image and a left eye image, respectively.

The depth information (the distance image) of FIG. 1B is an image obtained by displaying distance information of the input image of FIG. 1A according to luminance, a high luminance area is a pixel part corresponding to a subject near a camera, and a low luminance area is a pixel part corresponding to a subject far from the camera.

The right eye image of FIG. 1C is generated by shifting a pixel part (a body area) at a close range of the input image of FIG. 1A in the left direction based on the depth information (the distance image) of FIG. 1B.

The left eye image of FIG. 1D is generated by shifting the pixel part (the body area) at the near distance of the input image of FIG. 1A in the right direction based on the depth information (the distance image) of FIG. 1B.

As illustrated in FIGS. 1A to 1D, the area (i.e., the occlusion area) with no pixel information occurs in the right eye image of FIG. 1C and the left eye image of FIG. 1D which are generated through the above pixel shift process.

In relation to the occlusion area generated in either or both of the two images of the binocular parallax image, since pixel information of the input image does not exist in the input image, it is necessary to perform a filling process using pixels existing in a (spatially) peripheral area. Japanese Unexamined Patent Application Publication No 2005-151534 discloses an example of an interpolation process using pixel information of a part corresponding to an input image. Furthermore, Vol. 56, No. 5, pp. 863 to 866 (2002. 5) of The Journal Of The Institute of Image Information And Television Engineers entitled "Disocclusion Based On The Texture Statistics Of The Image Segmented By The Region Competition Algorithm", coauthored by Yamada Kunio, Mochiduchi Kenji, Aizawa Kiyoharu and Saito Takahiro. also discloses an example of an interpolation process. However, although these interpolation processes are used, unnaturalness such as stretching of an image may occur in at least one of the two images of the binocular parallax image.

Moreover, according to the image conversion apparatuses disclosed in Japanese Unexamined Patent Application Publication No 10-51812 and 2005-151534, the pseudo-depth is estimated from an image. However, it is difficult to detect detailed depth from one image. For example, it is not easy to perform depth estimation with respect to a fine structure of tree branches, an electric wire or hair.

In the case of generating the binocular parallax image through the pixel shift by using such depth information, parallax equivalent to a (spatially) peripheral area occurs in such fine subjects. Therefore, since the interval between the fine subjects and the background may not be set to a different depth effect, it may not be possible to allow the binocular parallax image to have a stereoscopic effect according to an actual subject distance.

SUMMARY OF THE INVENTION

It is desirable to generate a parallax image in which an erroneous stereoscopic effect is prevented from being generated due to erroneous depth estimation. Furthermore, it is desirable to provide an image which can be appreciated as both a stereoscopic image and a two-dimensional image in the case of synthesizing a left eye image and a right eye image and displaying the synthesized image. That is, it is desirable to provide an image processing apparatus for generating and providing a binocular parallax image, which can be normally appreciated as a two-dimensional image when an observer takes off stereoscopic vision glasses and reduces the fatigue of the observer, an image processing method, and a program.

Furthermore, in the generation of the binocular parallax image through pixel shift, it is desirable to realize the generation of the binocular parallax image which does not desire a filling process of a pixel value without generating an occlusion area which has been necessarily generated in the related art. An unnatural stereoscopic effect may be easily perceived in the binocular parallax image generated through pixel shift due to the lack of resolution of depth information. In this regard, it is desirable to provide an image processing apparatus for preventing the unnatural stereoscopic effect from being perceived, an image processing method, and a program.

According to a first embodiment of the invention, there is provided an image processing apparatus including: an image input unit that inputs a two-dimensional image signal; a depth information output unit that inputs or generates depth information of image areas constituting the two-dimensional image signal; an image conversion unit that receives the image signal and the depth information from the image input unit and the depth information output unit, and generates and outputs a left eye image and a right eye image for realizing binocular stereoscopic vision; and an image output unit that outputs the left eye image and the right eye image, which are output from the image conversion unit, wherein the image conversion unit extracts a spatial feature value of the input image signal, and performs an image conversion process including an emphasis process applying the feature value and the depth information with respect to the input image signal, thereby generating at least one of the left eye image and the right eye image.

In addition, in the image processing apparatus according to an embodiment of the present invention, the image conversion unit may extract a luminance differential signal of the input image signal, sets the luminance differential signal as the feature value, generate a corrected differential signal by performing gain control based on depth information in units of image areas with respect to the differential signal, generate any one of conversion signals, which are obtained by adding the corrected differential signal to the input image signal or subtracting the corrected differential signal from the input image signal, as the left eye image or the right eye image, and output a non-conversion signal, which corresponding to the input image signal not subject to a process, as an eye image different from the conversion signal.

In addition, in the image processing apparatus according to an embodiment of the present invention, the image conversion unit may extract a luminance differential signal of the input image signal, set the luminance differential signal as the feature value, generate a corrected differential signal by performing gain control based on depth information in units of image areas with respect to the differential signal, generate signals, which are obtained by adding the corrected differential signal to the input image signal and subtracting the corrected differential signal from the input image signal, and generate a pair of the two signals as a pair of the left eye image and the right eye image.

In addition, in the image processing apparatus according to an embodiment of the present invention, the image conversion unit may perform a correction process of the luminance differential signal based on large gain with respect to an image area where the depth information which is output from the depth information output unit is large, and a correction process of the luminance differential signal based on small gain with respect to an image area where the depth information is small, thereby generating the corrected differential signal.

In addition, in the image processing apparatus according to an embodiment of the present invention, the image conversion unit may generate signals, which are obtained by adding a signal obtained by non-linearly converting the corrected differential signal to the input image signal or subtracting the signal from the input image signal, and generate any one of the signals as the left eye image or the right eye image.

In addition, in the image processing apparatus according to an embodiment of the present invention, the image conversion unit may include: (a) a phase control signal generation part that generates a differential signal for an input signal; (b) a non-linear conversion part that performs a non-linear conversion process with respect to the differential signal generated by the phase control signal generation part; (c) an image synthesizing part that adds output of the non-linear conversion part to the input signal or subtracting the output of the non-linear conversion part from the input signal; and processing paths through which an image conversion process by image conversion modules including (a) the phase control signal generation part, (b) the non-linear conversion part and (c) the image synthesizing part is repeated, wherein the image conversion unit selects and synthesizes output of each image conversion module constituting the processing path according to the depth information which is output from the depth information output unit, thereby generating the left eye image or the right eye image.

In addition, in the image processing apparatus according to an embodiment of the present invention, the image conversion unit may include: (a) a phase control signal generation part that generates a differential signal for an input signal; (b) a gain control part that performs gain control based on a gain coefficient, which is set according to the depth information which is output from the depth information output unit, with respect to the differential signal generated by the phase control signal generation part, thereby generating a corrected differential signal; (c) a non-linear conversion part that performs a non-linear conversion process with respect to output of the gain control part; (d) an image synthesizing part that adds output of the non-linear conversion part to the input signal or subtracting the output of the non-linear conversion part from the input signal; processing paths through which an image conversion process by image conversion modules including (a) the phase control signal generation part, (b) the gain control part, (c) the non-linear conversion part and (d) the image synthesizing part is repeated; a weight value calculation section that sets weight values of each image conversion module constituting the processing path according to the depth information which is output from the depth information output unit; and an image synthesizing section that synthesizes output of each image conversion module constituting the processing path according to the weight values calculated by the weight value calculation part, thereby generating the left eye image or the right eye image.

In addition, in the image processing apparatus according to an embodiment of the present invention, the image conversion unit may include: (a) a phase control signal generation part that generates a differential signal for an input signal; (b) a multiplication processing part that generates a corrected differential signal by multiplying the differential signal generated by the phase control signal generation part by a gain coefficient set according to the depth information which is output from the depth information output unit; (c) a non-linear conversion part that performs a non-linear conversion process with respect to output of the multiplication processing part; (d) an image synthesizing part that adds output of the non-linear conversion part to the input signal or subtracting the output of the non-linear conversion part from the input signal; processing paths through which an image conversion process by image conversion modules including (a) the phase control signal generation part, (b) the multiplication processing part, (c) the non-linear conversion part and (d) the image synthesizing part is repeated; a weight value calculation section that sets weight values of each image conversion module constituting the processing path according to the depth information which is output from the depth information output unit; and an image synthesizing section that synthesizes output of each image conversion module constituting the processing path according to the weight values calculated by the weight value calculation part, thereby generating the left eye image or the right eye image.

In addition, in the image processing apparatus according to an embodiment of the present invention, the image conversion unit may generate the left eye image and the right eye image with respect to each frame constituting a moving image.

In addition, in the image processing apparatus according to an embodiment of the present invention, the image processing apparatus may further include an image output unit that alternately outputs the left eye image and the right eye image, which is generated by the image conversion unit, at a frame rate twice as fast as a frame rate of an input image frame.

In addition, in the image processing apparatus according to an embodiment of the present invention, the image conversion unit may alternately generate either the left eye image or the right eye image with respect to each frame constituting a moving image.

In addition, in the image processing apparatus according to an embodiment of the present invention, the image conversion unit may generate the left eye image and the right eye image with respect to each frame constituting a moving image, and generate a binocular parallax image alternately including line data constituting the generated left and right eye images.

In addition, in the image processing apparatus according to an embodiment of the present invention, the image conversion unit may generate the left eye image and the right eye image based on a setting in which an addition signal of the generated left and right eye images is equivalent to or almost equivalent to the input signal.

In addition, in the image processing apparatus according to an embodiment of the present invention, the image processing apparatus may further include an image display unit that displays the images generated by the image conversion unit.

In addition, in the image processing apparatus according to an embodiment of the present invention, the image display unit may perform a time division stereoscopic display process of alternately outputting the left eye image and the right eye image.

In addition, in the image processing apparatus according to an embodiment of the present invention, when the image display unit performs a time division stereoscopic display process of alternately outputting the left eye image and the right eye image, the image display unit may switch an output switching timing of the left eye image and the right eye image in synchronization with shutter switching of right and left parts of glasses worn by an image observer.

In addition, in the image processing apparatus according to an embodiment of the present invention, the image display unit may have a configuration in which polarizing filters are bonded to the front surface thereof, and display the binocular parallax image alternately including the line data constituting the left eye image and the right eye image generated by the image conversion unit, polarizing directions of the polarizing filters being set to change for each horizontal line.

According to a second embodiment of the invention, there is provided an image processing method in an image processing apparatus, which includes: inputting a two-dimensional image signal by an image input unit; receiving or generating depth information of image areas constituting the two-dimensional image signal by a depth information output unit; receiving the image signal, which is output from the image input unit, and the depth information, which is output from the depth information output unit, and generating and outputting a left eye image and a right eye image for realizing binocular stereoscopic vision by an image conversion unit; and outputting the left eye image and the right eye image, which are output from the image conversion unit, by an image output unit, wherein, in the step of receiving the image signal and the depth information, a spatial feature value of the input image signal is extracted, and an image conversion process including an emphasis process applying the feature value and the depth information is performed with respect to the input image signal, resulting in generation of at least one of the left eye image and the right eye image.

According to a third embodiment of the invention, there is provided a program that causes a computer to execute image processing of an image processing apparatus, the image processing includes: inputting a two-dimensional image signal by an image input unit; receiving or generating depth information of image areas constituting the two-dimensional image signal by a depth information output unit; receiving the image signal, which is output from the image input unit, and the depth information, which is output from the depth information output unit, and generating and outputting a left eye image and a right eye image for realizing binocular stereoscopic vision by an image conversion unit; and outputting the left eye image and the right eye image, which are output from the image conversion unit, by an image output unit, wherein, in the step of receiving the image signal and the depth information, a spatial feature value of the input image signal is extracted, and an image conversion process including an emphasis process applying the feature value and the depth information is performed with respect to the input image signal, resulting in generation of at least one of the left eye image and the right eye image.

In addition, the program of the present invention, for example, can be provided to a general-purpose system capable of executing various types of program and code through a recording medium provided in a computer-readable format or a communication medium. Such a program is provided in a computer-readable format, so that processing based on the program is performed on a computer or a system.

Other and further objects, features and advantages of the present invention will be clarified by more detailed description with reference to the accompanying drawings and embodiments of the present invention to be described later. It should be noted that the system referred to herein denotes a logical aggregation of a plurality of apparatuses and each component apparatus is not necessarily accommodated in the same housing.

According to an embodiment of the present invention, it is possible to generate an image signal which can be stereoscopically viewed as an image signal in which a subject distance is reflected by simple signal processing. The image processing apparatus according to the embodiment of the present invention performs a different emphasis process applying depth information as subject distance information with respect to a spatial feature value of an input image signal, thereby generating a left eye image and a right eye image. In detail, a corrected differential signal is generated by performing gain control based on depth information with respect to the differential signal of the input signal. The corrected differential signal or a non-linear conversion signal thereof is added to the input image signal or subtracted from the input image signal, and the pairs of these signals are the left eye image and the right eye image. With such a configuration, it is possible to generate a parallax image in which the parallax based on the subject distance is set. Furthermore, an addition signal of the left and right eye images is equivalent to the input signal and can be observed as a normal two-dimensional image when a user observes the image without wearing stereoscopic vision glasses.

BRIEF DESCRIPTION OF THE DRAWINGS

FIG. 8 is a diagram explaining a non-linear conversion process of a non-linear conversion section of an image processing apparatus according to an embodiment of the present invention.

FIGS. 9A to 9E are diagrams explaining an example of a process of generating right and left eye image signals from an input image, which is performed by an image conversion unit of an image processing apparatus according to an embodiment of the present invention.

FIGS. 10A to 10E are diagrams explaining an example of a process of generating right and left eye image signals from an input image, which is performed by an image conversion unit of an image processing apparatus according to an embodiment of the present invention.

FIG. 11 is a diagram explaining a correspondence relationship among right and left eye signals, an input signal and a differential signal, and retinal disparity.

FIG. 12 is a diagram explaining a correspondence relationship among right and left eye signals, an input signal and a differential signal, and retinal disparity.

FIG. 13 is a diagram explaining a correspondence relationship among right and left eye signals, an input signal and a differential signal, and retinal disparity.

FIG. 14 is a diagram explaining a correspondence relationship among right and left eye signals, an input signal and a differential signal, and retinal disparity, wherein the right and left eye signals and the differential signal are generated by an image conversion unit of an image processing apparatus according to an embodiment of the present invention.

FIGS. 15A to 15E are diagrams explaining an example of a process of generating right and left eye image signals from an input image, which is performed by an image conversion unit of an image processing apparatus according to an embodiment of the present invention.

FIGS. 16A to 16E are diagrams explaining an example of a process of generating right and left eye image signals from an input image, which is performed by an image conversion unit of an image processing apparatus according to an embodiment of the present invention.

FIGS. 17A to 17E are diagrams explaining an example of a process of generating right and left eye image signals from an input image, which is performed by an image conversion unit of an image processing apparatus according to an embodiment of the present invention.

FIGS. 18A, 18C, 18D and 18E are diagrams explaining an example of a process of generating right and left eye image signals from an input image, which is performed by an image conversion unit of an image processing apparatus according to an embodiment of the present invention.

FIGS. 19A, 19C, 19D and 19E are diagrams explaining an example of a process of generating right and left eye image signals from an input image, which is performed by an image conversion unit of an image processing apparatus according to an embodiment of the present invention.

FIGS. 20A, 20C, 20D, 20E and 20F are diagrams explaining an example of a process of generating right and left eye image signals from an input image, which is performed by an image conversion unit of an image processing apparatus according to an embodiment of the present invention.

FIG. 28 is a diagram explaining a configuration example of an image processing apparatus according to an embodiment of the present invention.

DESCRIPTION OF THE PREFERRED EMBODIMENTS

Hereinafter, an image processing apparatus, an image processing method and a program according to an embodiment of the present invention will be described in detail with reference to the accompanying drawings. Description will be given according to the following sequence.

Figure 2:
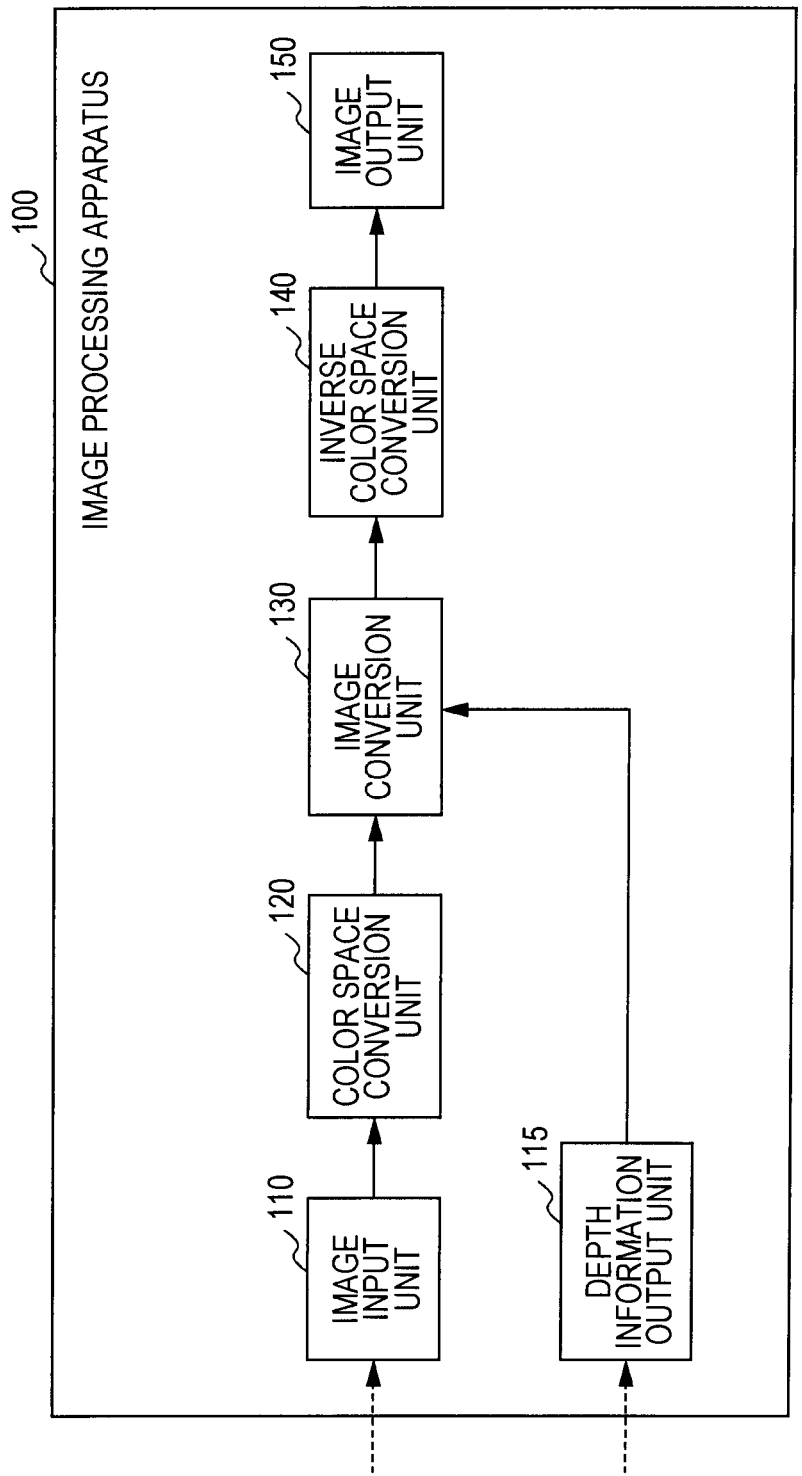
FIG. 2 is a diagram explaining a configuration example of an image processing apparatus according to an embodiment of the present invention.

1. Configuration Example of Image Processing Apparatus
2. Process of Depth Information Output Unit
3. Process of Image Conversion Unit
4. Process of Gain Control Section
5. Process of Non-linear Conversion Section
6. Process of Image Synthesizing Section
7. Stereoscopic Effect due to Retinal Disparity (Parallax)
8. Corrected Differential Signal with Gain according to Subject Distance & Image Generation Configuration Example
9. Process Sequence of Image Conversion Unit
10. Effect at the time of Two-Dimensional (2D) Display Process
11. Embodiment including Image Display Unit
1. Configuration Example of Image Processing Apparatus FIG. 2 is a diagram illustrating an image processing apparatus according to an embodiment of the present invention. In the image processing apparatus 100, an image input unit 110 receives a still image file output from a digital still camera and the like, and a moving image data output from a camcorder and the like, and converts them into an internal data format. Herein, the internal data format represents moving image data of a baseband, and includes video data of the three primary colors of red (R), green (G) and blue (B) or video data of luminance (Y) and color difference (Cb and Cr). In the internal data format, any color spaces can be employed if an identifying signal of a color space is superimposed and a color space conversion unit 120 of a subsequent stage corresponds to the image input unit 110.

Figure 1A:
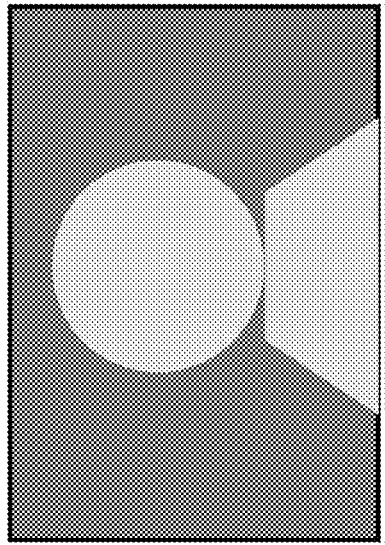
FIGS. 1A to 1D are diagrams explaining occlusion.
Figure 1B:
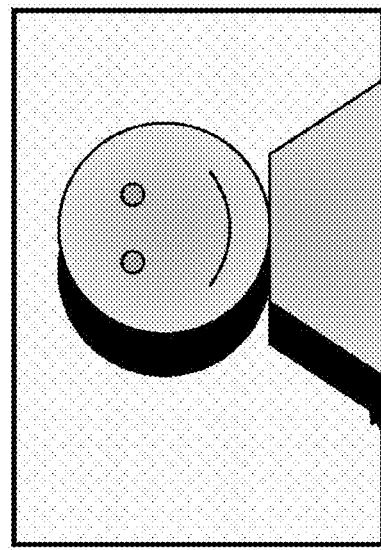
Figure 1C:
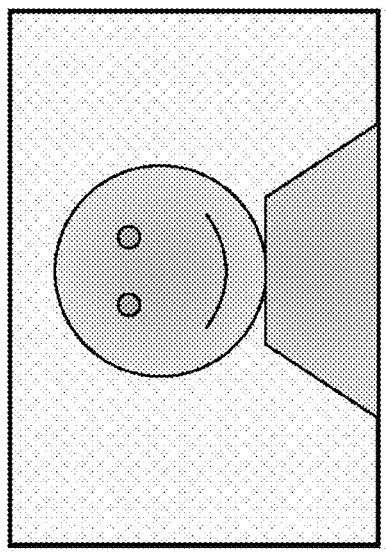
Figure 1D:
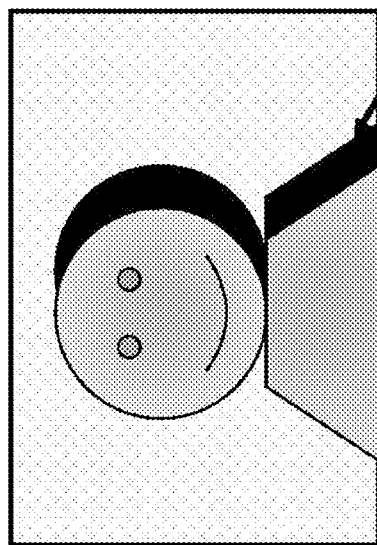

A depth information output unit 115 receives depth information, which corresponds to the input image signal of the image input unit 110, from an outside or generates the depth information therein, and outputs the depth information to an image conversion unit 130. The depth information, for example, includes a distance image such as luminance distribution data corresponding to a subject distance as illustrated in FIG. 1B. A data format is not specified.

The depth information received or generated in the depth information output unit 115 may be information which has a relative positional relationship corresponding to the input image signal and can be used for determining whether each pixel has depth of a certain degree. The input image signal may not correspond to the number of pixels in a one-to-one manner. Furthermore, in the case of a moving image, the input image signal may not correspond to the number of frames in a one-to-one manner. That is, it may be possible to employ a configuration in which one piece of common depth information is used in units of plural frames (e.g., two frames or four frames).

The video data, which is output from the image input unit 110, is input to the color space conversion unit 120 and is converted into a luminance signal and a color difference signal. At this time, when the input video data conforms to the Y, Cb and Cr color space, the color space conversion unit 120 outputs the input video data without performing a color space conversion. When the input video data conforms to the R, G and B color space or other color spaces, the color space conversion unit 120 converts the input video data into a luminance (Y) and color difference (Cb and Cr) signal and outputs the converted signal.

Herein, the color space of the video data, which is output from the color space conversion unit 120, is not limited to the Y, Cb and Cr color space. For example, any color spaces can be employed if a luminance component and a color component are separated from them.

The video data, which is output from the color space conversion unit 120, is input to the image conversion unit 130. Meanwhile, the depth information is input to the image conversion unit 130 from the depth information output unit 115.

The image conversion unit 130, for example, generates a binocular parallax image including a left eye image L (Left) and a right eye image R (Right) through a process which will be described later, synthesizes these images according to the type of a stereoscopic display apparatus, and outputs the synthesized image. That is, the image conversion unit 130 extracts a spatial feature value from the input image signal and performs a different emphasis process with respect to the extracted feature value, thereby generating the left eye image and the right eye image.

The video data, which is output from the image conversion unit 130, is input to an inverse color space conversion unit 140, and the Y, Cb and Cr color space is converted into a color space corresponding to an output image format. At this time, when the output image format is based on the Y, Cb and Cr color space, the inverse color space conversion unit 140 outputs the video data without performing a color space conversion. As described above, FIG. 2 illustrates the configuration including the color space conversion unit 120 and the inverse color space conversion unit 140. The configuration is not necessary and the configuration may be omitted.

The video data, which is output from the inverse color space conversion unit 140, is input to an image output unit

150. The image output unit 150 converts the video data into video data which can be received in a stereoscopic display apparatus capable of realizing stereoscopic vision by displaying the binocular parallax image converted by the image conversion unit 130, and outputs the converted data, wherein the stereoscopic display apparatus is connected to the image processing apparatus 100 from an outside.

In addition, this embodiment describes the method in which the input still image is converted into the video data in the image input unit 110. However, the present invention is not limited to this method. It may be possible to employ a configuration in which one still image is converted into left and right eye images and then output for example, to a memory card and the like as two still images in the form of a file.

2. Process of Depth Information Output Unit

Next, an example of the process of the depth information output unit 115 will be described. The depth information output unit 115 receives the depth information from an outside and outputs the depth information, or generates the depth information therein and outputs the depth information.

When the depth information is received from an outside, an acquisition method of the depth information is not specified. For example, it may be possible to use a method for acquiring the depth information using a range scanner on the market, a method for acquiring the depth information using a stereo method after picking up an image signal by using one more camera (a total of two cameras) at the time of image acquisition, and the like.

Furthermore, the depth information output unit 115 may also generate the depth information therein by using an input image signal as a two-dimensional image without receiving the depth information from the outside of the image processing apparatus 100.

A method for obtaining distance information from a two-dimensional image includes a method entitled "Make3D: Learning 3-D Scene Structure from a Single Still Image" issued in IEEE Transactions on Pattern Analysis and Machine Intelligence (PAMI), 2008 by A. Saxena, the method disclosed in Japanese Unexamined Patent Application Publication No. 2005-151534, and the like.

Figure 3:
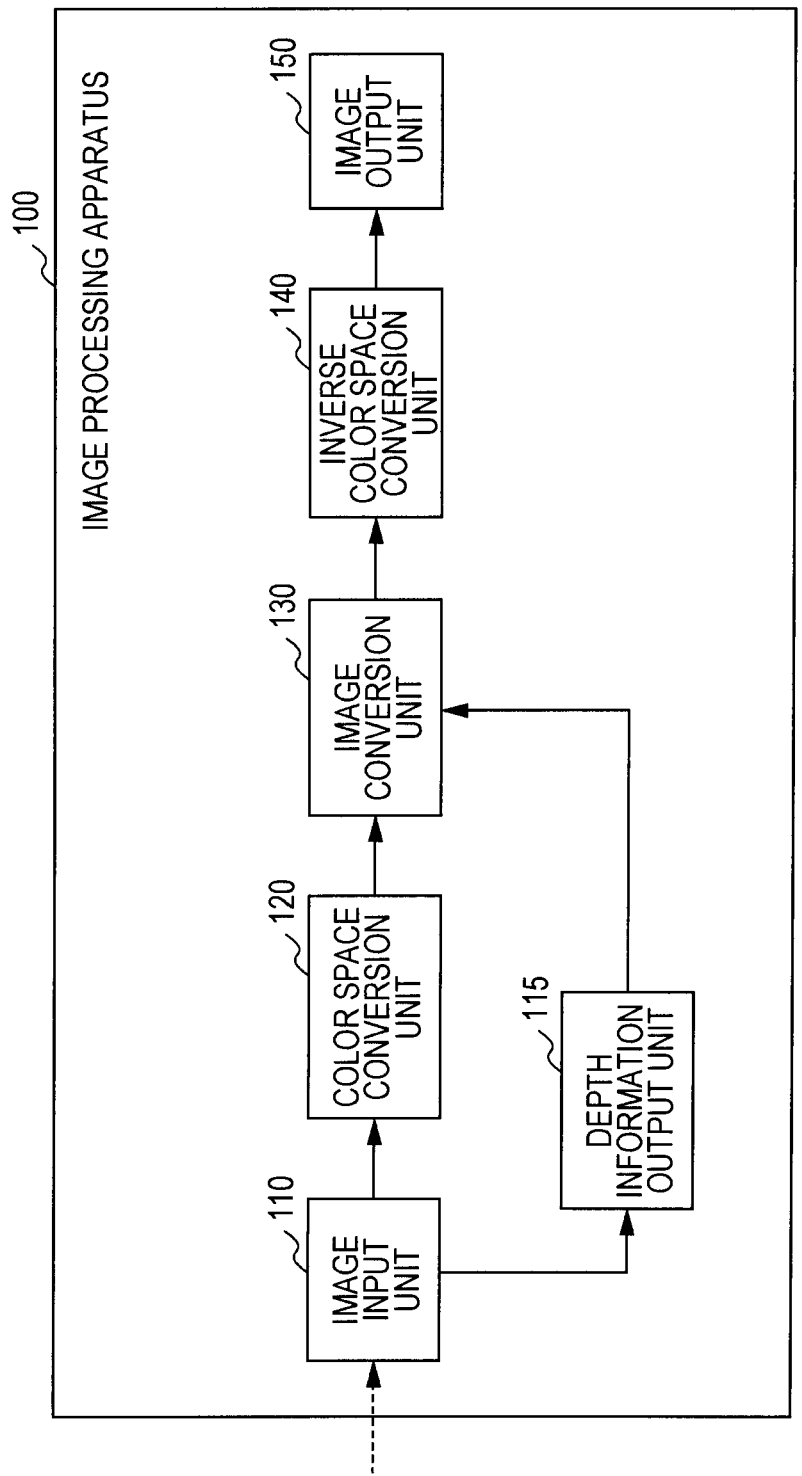
FIG. 3 is a diagram explaining a configuration example of an image processing apparatus according to an embodiment of the present invention.

By using the methods disclosed in these documents, the depth information output unit 115 can generate the depth information by using the input image signal as the two-dimensional image and output the depth information to the image conversion unit 130. In the case of employing such a configuration, the image processing apparatus 100 has a configuration in which the depth information output unit 115 receives an image through the image input unit 110, generates depth information based on the input image, and outputs the generated depth information to the image conversion unit 130 as illustrated in FIG. 3.

3. Process of Image Conversion Unit

Figure 4:
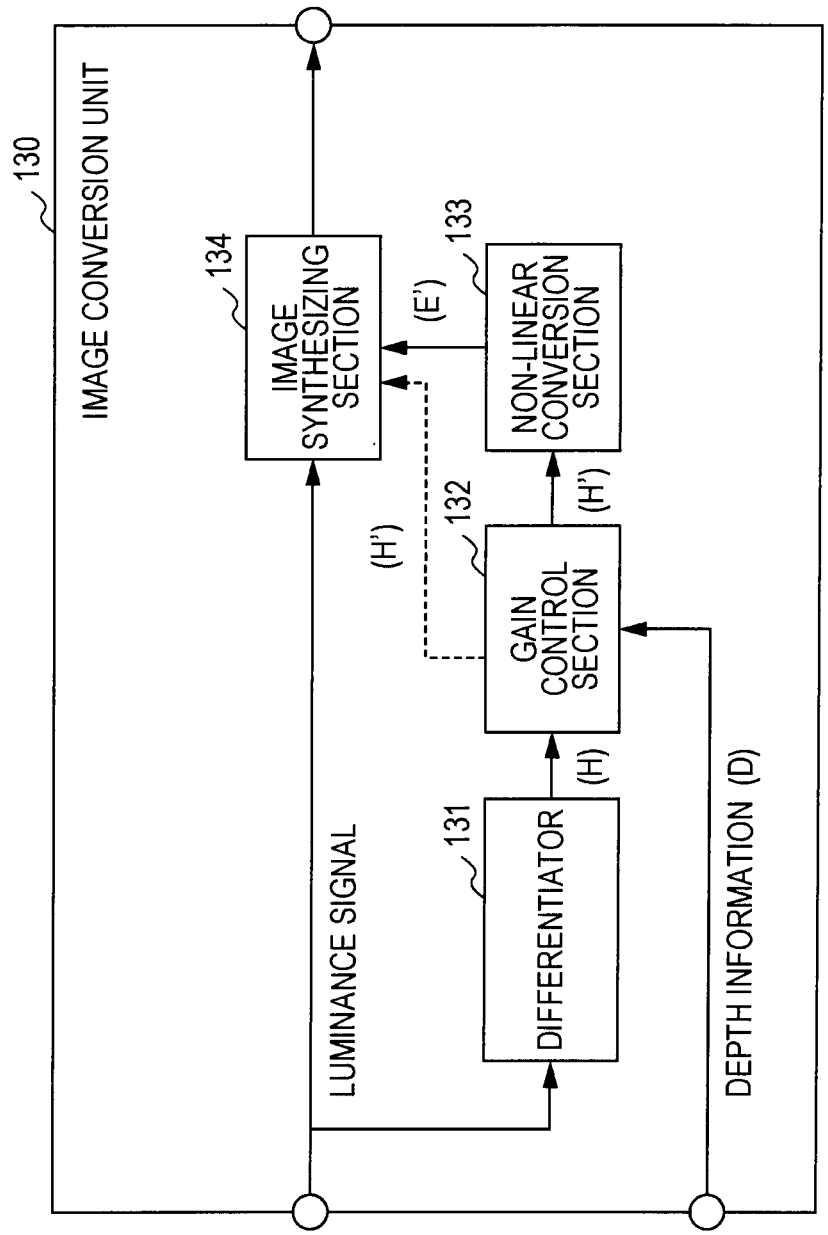
FIG. 4 is a diagram explaining a configuration example of an image conversion unit of an image processing apparatus according to an embodiment of the present invention.

Next, an example of the process of the image conversion unit 130 will be described. FIG. 4 is a block diagram illustrating the configuration of the image conversion unit 130 according to the embodiment. The image conversion unit 130 extracts the spatial feature value of the input image signal and performs the different emphasis process with respect to the extracted feature value, thereby generating the left eye image and the right eye image. The image conversion unit 130 includes a differentiator 131, a gain control section 132, a non-linear conversion section 133, and an image synthesizing section 134.

The differentiator 131 extracts a luminance signal from the video data inputted to the image conversion unit 130 and generates a differential signal H for the luminance signal. In detail, for example, the differentiator 131 receives a luminance signal of an image in the horizontal direction and generates a signal by primarily differentiating the input luminance signal. In the primary differentiation process, for example, a 3 tap first-order linear differential filter in the horizontal direction is used.

In addition, in the embodiment, the example in which the luminance signal is used as processing data has been described. However, instead of the luminance signal, a color signal (RGB and the like) may also be used as data to be processed.

The gain control section 132 controls an amplitude value of the differential signal by multiplying the differential signal H output from the differentiator 131 by a coefficient (a gain coefficient) based on a preset rule, thereby generating a corrected differential signal H' which is a correction signal of the differential signal.

The non-linear conversion section 133 non-linearly converts the corrected differential signal H' output from the gain control section 132, and outputs a parallax emphasis signal E' to the image synthesizing section 134.

The image synthesizing section 134 generates the left eye image and the right eye image by applying each frame image, which constitutes the video data, and the spatial feature value generated from the frame image, i.e., the corrected differential signal H' of the luminance signal, or the parallax emphasis signal E' generated by non-linearly converting the corrected differential signal.

In addition, as indicated by the dotted line of FIG. 4, it may be possible to employ a configuration in which the conversion process of the non-linear conversion section 133 is omitted, the corrected differential signal H' generated by the correction process of the gain control section 132 is directly input to the image synthesizing section 134, and the image synthesizing section 134 generates the left eye image L and the right eye image R by applying the corrected differential signal.

4. Process of Gain Control Section

Next, the process performed by the gain control section 132 will be described.

Figure 5:
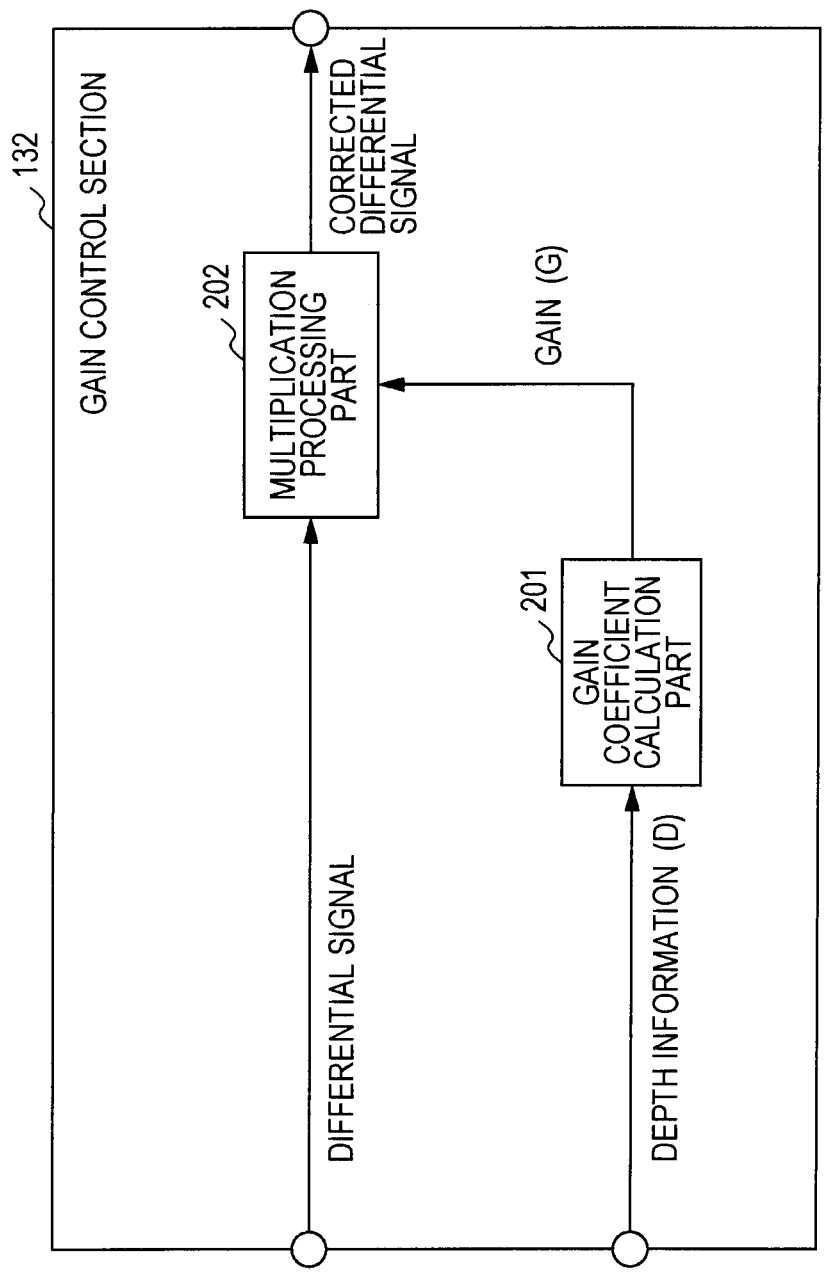
FIG. 5 is a diagram explaining a configuration example of a gain control section of an image processing apparatus according to an embodiment of the present invention.

FIG. 5 is a block diagram illustrating the configuration of the gain control section 132 according to the embodiment. The gain control section 132 controls the amplitude value of the input differential signal based on the input depth information as well. In addition, in the embodiment to be described below, the depth information is input for each pixel of the input differential signal in the form of a so-called depth map with one depth value.

A gain coefficient calculation part 201 uses the input depth information for each pixel to output a gain coefficient for a corresponding pixel.

A multiplication processing part 202 performs a multiplication process of multiplying the amplitude value of the differential signal H by the gain coefficient for each pixel, which is output from the gain coefficient calculation part 201, with respect to the input differential signal for each pixel, thereby outputting the corrected differential signal H' obtained by gain-controlling the amplitude value.

Figure 6:
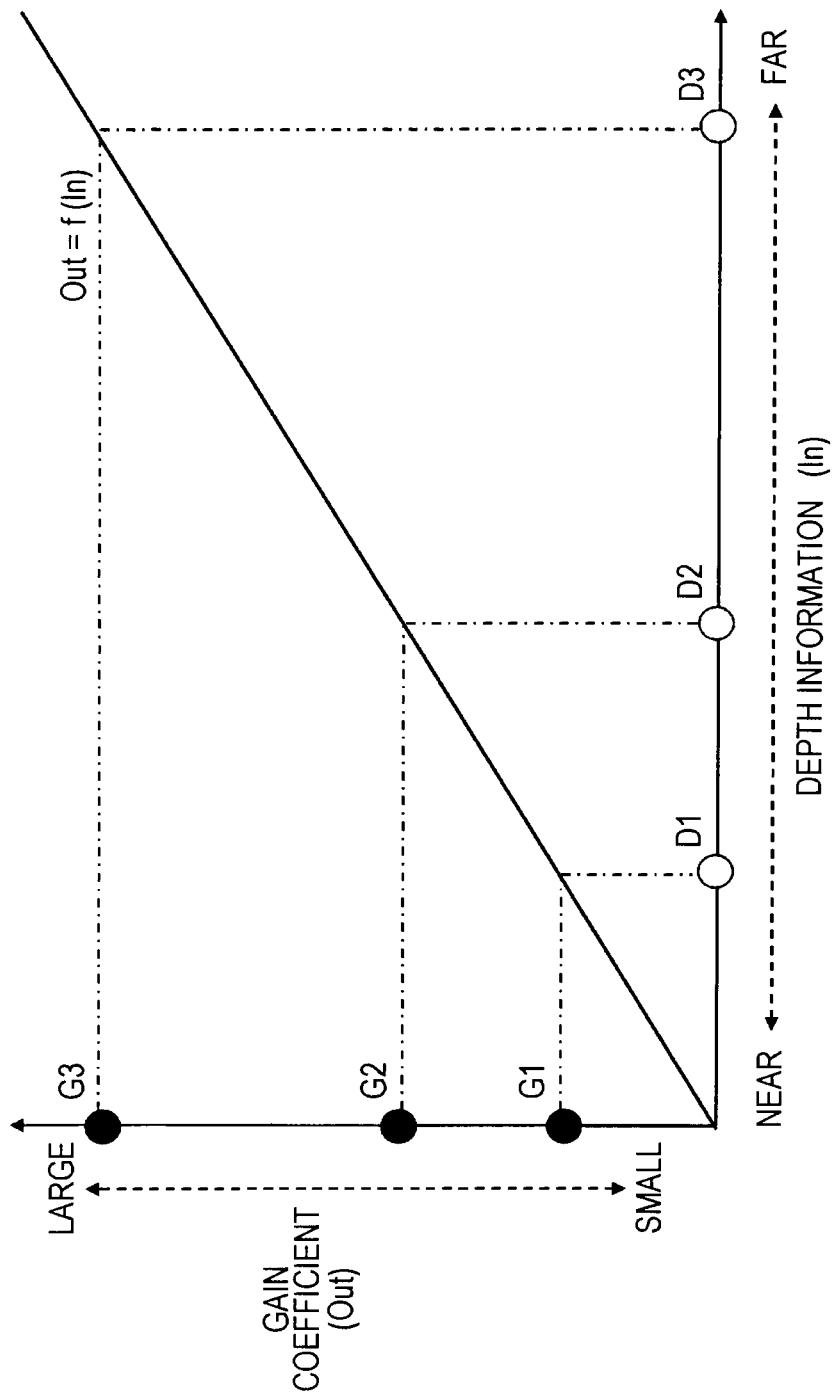
FIG. 6 is a diagram explaining a gain control process of a gain control section of an image processing apparatus according to an embodiment of the present invention.

FIG. 6 is a diagram illustrating an example of a method for determining a gain coefficient, which is performed by the gain coefficient calculation part 201. A horizontal axis denotes depth information as an input signal. A vertical axis denotes the output of a gain coefficient in the gain coefficient calculation part 201.

The gain coefficient calculation part 201 converts the input depth information In by using a preset function f(x) to output a gain coefficient Out.

At this time, the function f(x) can be variously set.

As an example of the function f(x), for example, a linear function as expressed by the equation below is used.

$$f(x)=A \times x \text{ (}A\text{ is an integer)}$$

In the equation above, the A is a preset integer and can be set to have various values.

Furthermore, a conversion function in the gain coefficient calculation part 201 is not limited to the linear function, and a non-linear conversion may also be performed.

In relation to the depth information, values corresponding to each pixel of the differential signal are input and gain coefficients corresponding to each pixel are output.

FIG. 6 is a diagram illustrating an example in which the input values (depth information) of the gain coefficient calculation part correspond to the output values (gain coefficients). FIG. 6 illustrates an example of three output values (gain coefficients) corresponding to three input values (depth information), respectively.

D1 to D3 are examples of the input values (depth information) and the values of depths corresponding to these particular three pixels are assumed. In addition, the depth is a value corresponding to the distance from an observer (a user) or a camera to a subject.

The depth (=subject distance) is increased (far away from a user or a camera) from a front side to a rear side in the sequence of D1<D2<D3.

At this time, G1 to G3 are examples of the output values (gain coefficients) which are obtained by inputting D1 to D3 to the function f(x) of FIG. 6.

As with the example, the gain coefficient calculation part 201 outputs gain coefficients corresponding to each pixel of the differential signal.

FIGS. 7A to 7D show an example of a process in which the gain control section 132 controls the amplitude value of a differential signal.

FIGS. 7A to 7D show an example of an input signal, a differential signal, depth information, and a corrected differential signal.

Figure 7A:
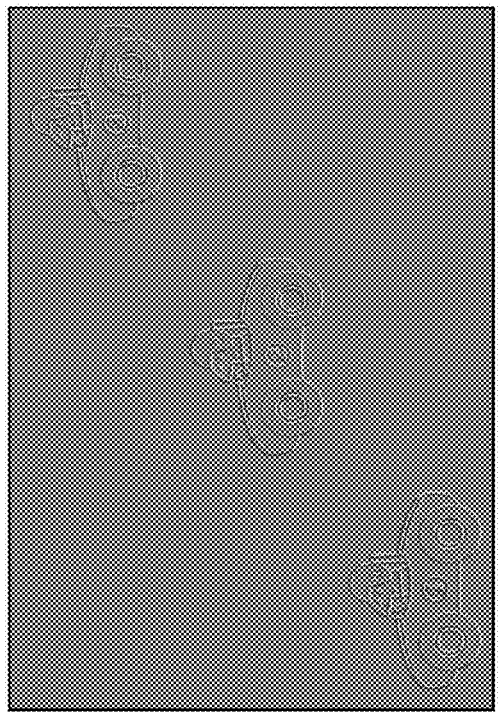
FIGS. 7A to 7D are diagrams explaining signals applied to processing of an image processing apparatus according to an embodiment of the present invention.

FIG. 7A shows an example of an input image signal.

Figure 7C:
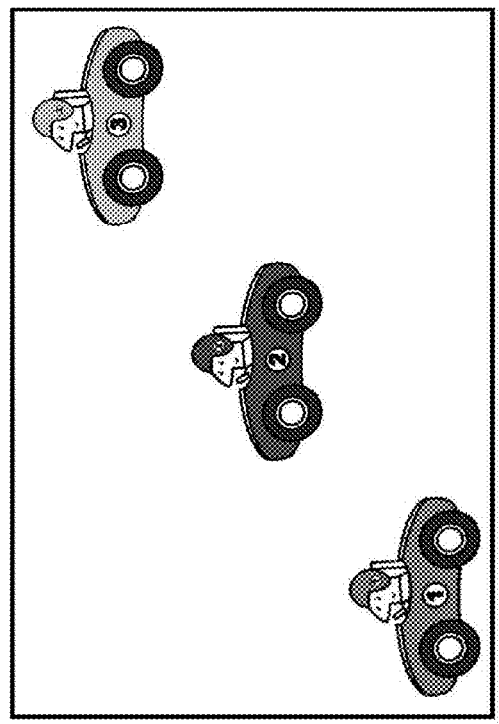
Figure 7B:
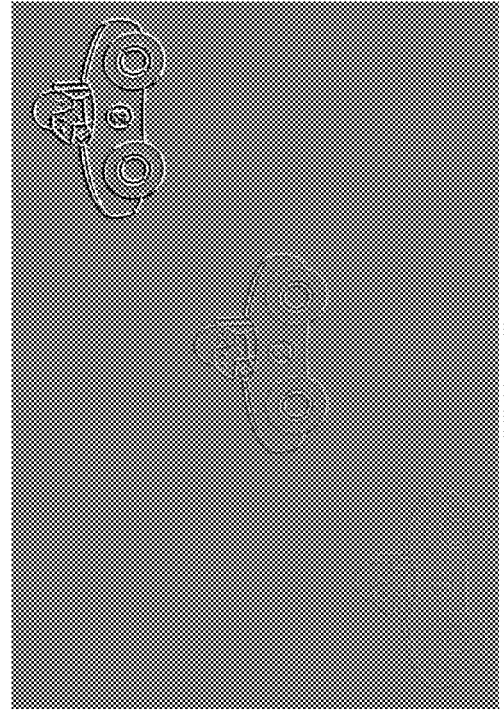

FIG. 7B shows an image obtained by performing a differentiation process with respect to the input image signal of FIG. 7A.

FIG. 7C shows depth information corresponding to the input image signal of FIG. 7A, and is simply obtained by giving the values of depth to each of three areas obtained by dividing an image.

Herein, the values of the depth information D3, D2 and D1 (D1<D2<D3) defined in FIG. 6 are given to the image signal representing the depth information of FIG. 7C in order from the upper side.

At this time, as with the relationship between the depth and the gain values described in FIG. 6, gain values multiplied by each pixel of the differential signal of FIG. 7B are G3, G2 and G1 (G1<G2<G3) in order from the upper side of the image.

Figure 7D:
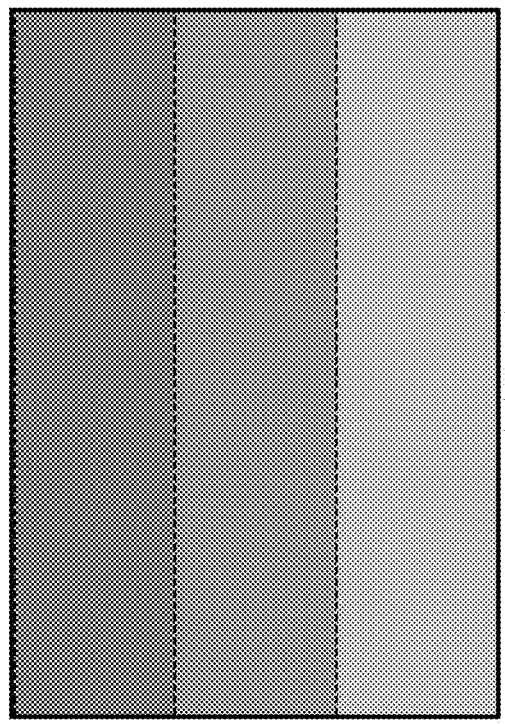

The corrected differential signal illustrated in FIG. 7D is an example of a result obtained by multiplying each pixel of the differential signal of FIG. 7B by the gain values based on the depth information of FIG. 7C.

In the corrected differential signal illustrated in FIG. 7D, a large gain value is multiplied by the upper side (a far area) of a screen, and a small gain value is multiplied by the lower side (a near area) of the screen.

As a result, the amplitude value of the differential signal is large at the upper side (the far area) of the screen and is small at the lower side (the near area) of the screen.

The image processing apparatus according to the embodiment of the present invention generates the left eye image and the right eye image by using the differential signal with different amplitudes according to distance as described above, and outputs the left eye image and the right eye image. As a result, the image processing apparatus generates an image with different parallaxes according to distance. A detailed processing example will be described in detail later.

5. Process of Non-linear Conversion Section

Next, the process performed by the non-linear conversion section 133 will be described. The non-linear conversion section 133 generates the parallax emphasis signal E' by non-linearly converting the corrected differential signal H', which is output from the gain control section 132 after having passed through the gain control according to distance, and outputs the parallax emphasis signal E' to the image synthesizing section 134.

FIG. 8 illustrates an example of the non-linear conversion process performed by the non-linear conversion section 133. The horizontal axis denotes the differential signal (the luminance) corrected differential signal) which is output from the gain control section 132 after having passed through the gain control (correction) according to distance. The horizontal axis denotes the output after the non-linear conversion process is performed by the non-linear conversion section 133. The non-linear conversion section 133 outputs the parallax emphasis signal Out by converting the input corrected differential signal In by using the preset function f(x). That is, Out=f(In). At this time, the function f(x) can be variously set. As an example of the function f(x), for example, an exponential function expressed by the equation below is used.

$$f(x)=x^{\gamma}$$

In the equation above, γ is a preset coefficient and can be set to have various values.

Furthermore, a conversion function in the non-linear conversion section 133 is not limited to the exponential function, and a linear conversion may also be performed.

The image synthesizing section 134 receives the parallax emphasis signal, which is output from the non-linear conversion section 133, and the video data, which is input to the image conversion unit 130, synthesizes each frame image constituting the video data and the parallax emphasis signal, and generates the left eye image and the right eye image.

In addition, as indicated by the dotted line of FIG. 4, it may be possible to employ a configuration in which the conversion process of the non-linear conversion section 133 is omitted, the corrected differential signal H', which is obtained by performing by the gain control section 132 the gain control according to distance with respect to the differential signal generated by the differentiator 131, is directly input to the image synthesizing section 134. In such a case, the image synthesizing section 134 generates the left eye image and the right eye image by applying the corrected differential signal H' after having passed through the gain control according to the depth (the subject distance).

6. Process of Image Synthesizing Section

Next, the process of the image synthesizing section 134 will be described.

The image synthesizing section 134 generates the left eye image and the right eye image by applying each frame image, which constitutes the video data, and the spatial feature value generated from the frame image, i.e., the corrected differential signal of the luminance signal, or the parallax emphasis signal generated by non-linearly converting the corrected differential signal.

FIGS. 9A to 9E and FIGS. 10A to 10E illustrate the concept of the image synthesizing process performed by the image synthesizing section 134.

FIGS. 9A to 9E illustrate image areas with a large distance (image areas with large depth).

FIGS. 10A to 10E illustrate image areas with a small distance (image areas with small depth).

FIGS. 9A to 9E and FIGS. 10A to 10E illustrate an input signal S, a differential signal H, a corrected (gain-controlled) differential signal H', a right eye image signal R, and a left eye image signal L with respect to the respective image areas, respectively, in order from the upper side.

Description will be given in correspondence with the depth information of FIG. 7C. For example, FIGS. 9A to 9E illustrate a processing example corresponding to the image area (the image area with large depth) with a large distance (D3) of the upper side of the image illustrated in FIG. 7C. Meanwhile, FIGS. 10A to 10E illustrate a processing example corresponding to the image area (the image area with small depth) with a small distance (D1) of the lower side of the image illustrated in FIG. 7C.

First, the processing example in the image area (the image area with the large depth) with the large distance illustrated in FIGS. 9A to 9E will be described.

FIG. 9A represents a change in the luminance of the input signal S for one arbitrary one horizontal line of an arbitrary frame of video data. FIG. 9A exemplifies one line on which a high luminance area exists at the center. In the area A between a line position x1 and a line position x2, the luminance gradually increases. Between the line position x2 and a line position x3, a high luminance portion maintaining a high luminance level exists. In the area B between the line position x3 and a line position x4, the luminance gradually decreases.

The differential signal H illustrated in FIG. 9B is a result obtained by differentiating the input signal. The differential signal is generated by the differentiator 131 of the image conversion unit 130 illustrated in FIG. 4.

As illustrated in FIG. 9B, the differential signal H generated by the differentiator 131 has a positive value in the area A where the change in the luminance of the input signal S illustrated in FIG. 9A is positive, and a negative value in the area B where the change in the luminance of the input signal S illustrated in FIG. 9A is negative.

The corrected (gain-controlled) differential signal H' after correction illustrated in FIG. 9C is generated by the gain control section 132 of the image conversion unit 130 illustrated in FIG. 4, and is obtained by performing correction (gain control) with respect to the differential signal of FIG. 9B based on the depth information. In addition, the example of FIGS. 9A to 9E is a processing example in the image area (the image area with the large depth) with the large distance (e.g., the D3 of FIGS. 6 and 7C), a correction process using the larger gain G3 is performed as described with reference to FIGS. 6 and 7A to 7D, and the amplitude of the differential signal is corrected to a larger amplitude.

The dotted line illustrated in FIG. 9C is the signal (the differential signal H of FIG. 9B) before correction, and the solid line illustrated in FIG. 9C is the corrected differential signal H' after correction according to distance. As described above, the amplitude of the corrected differential signal H' is corrected to be large through gain control according to distance.

The right eye image signal illustrated in FIG. 9D and the left eye image signal illustrated in FIG. 9E are generated by the image synthesizing section 134 of the image conversion unit 130 illustrated in FIG. 4. The image synthesizing section 134 synthesizes the input signal S illustrated in FIG. 9A and the parallax emphasis signal E' which is a result (the output of the non-linear conversion section 133) obtained by non-linearly converting the corrected differential signal H' after correction (gain control), which is illustrated in FIG. 9C, by the non-linear conversion section 133, thereby generating the right eye image signal illustrated in FIG. 9D and the left eye image signal illustrated in FIG. 9E.

Next, the processing example in the image area (the image area with the small depth) with the small distance illustrated in FIGS. 10A to 10E will be described. FIGS. 10A to 10E illustrate the processing example corresponding to the image area (the image area with the small depth) with the small distance (D1) of the lower side of the image illustrated in FIG. 7C.

The input signal illustrated in FIG. 10A and the differential signal illustrated in FIG. 10B are signals which are similar to the input signal illustrated in FIG. 9A and the differential signal illustrated in FIG. 9B. The differential signal H illustrated in FIG. 10B is obtained by differentiating the input signal S illustrated in FIG. 10A. The differential signal is generated by the differentiator 131 of the image conversion unit 130 illustrated in FIG. 4. As illustrated in FIG. 10B, the differential signal generated by the differentiator 131 has a positive value in the area A where the change in the luminance of the input signal illustrated in FIG. 10A is positive, and a negative value in the area B where the change in the luminance of the input signal illustrated in FIG. 10A is negative.

The corrected (gain-controlled) differential signal H' after correction illustrated in FIG. 10C is generated by the gain control section 132 of the image conversion unit 130 illustrated in FIG. 4, and is obtained by performing correction (gain control) with respect to the differential signal of FIG. 10B based on the depth information.

The example of FIGS. 10A to 10E is a processing example in the image area (the image area with the large depth) with the small distance (e.g., the D1 of FIGS. 6 and 7C), a correction process using the small gain G1 is performed as described with reference to FIGS. 6 and 7A to 7D, and the amplitude of the differential signal is corrected to a small amplitude.

The dotted line illustrated in FIG. 10C is the signal (the differential signal of FIG. 10B) before correction, and the solid line illustrated in FIG. 10C is the corrected differential signal after correction according to distance. As described above, the amplitude of the corrected differential signal is corrected to be small through gain control according to distance.

The right eye image signal illustrated in FIG. 10D and the left eye image signal illustrated in FIG. 10E are generated by the image synthesizing section 134 of the image conversion unit 130 illustrated in FIG. 4. The image synthesizing section 134 synthesizes the input signal S illustrated in FIG. 10A and the parallax emphasis signal E' which is a result (the output of the non-linear conversion section 133) obtained by non-linearly converting the corrected differential signal H' after correction (gain control), which is illustrated in FIG. 10C, by the non-linear conversion section 133, thereby generating the right eye image signal illustrated in FIG. 10D and the left eye image signal illustrated in FIG. 10E.

As described above, the image processing apparatus according to the embodiment of the present invention generates the corrected differential signal (FIG. 9C) with the large amplitude when the distance is large and the corrected differential signal (FIG. 10C) with the small amplitude when the distance is small, and generates the right eye image signals illustrated in FIGS. 9D and 10D and the left eye image signals illustrated in FIGS. 9E and 10E through a synthesis process of the corrected differential signals (or the parallax emphasis signals which are obtained by non-linearly converting the parallax emphasis signals) and the input signals illustrated in FIGS. 9A and 10A.

A process for generating the right eye image signals illustrated in FIGS. 9D and 10D and the left eye image signals illustrated in FIGS. 9E and 10E will be described using equations.

The luminance level of video data corresponding to the input signals illustrated in FIGS. 9A and 10A is expressed as S and the signal level of the differential signals illustrated in FIGS. 9B and 10B is expressed as H.

Furthermore, the signal level of the corrected differential signals as the result of the correction for the differential signals, which is performed in the gain control section 132, is expressed as H'.

In addition, when the corrected differential signals H' are generated, the gain value G multiplied by the differential signals H illustrated in FIGS. 9B and 10B is determined from a function which is preset based on the depth information D, and the like.

The gain value when the distance is large as illustrated in FIGS. 9A to 9E is expressed as G3, and the gain value when the distance is small as illustrated in FIGS. 10A to 10E is expressed as G1.

In the examples illustrated in FIGS. 9A to 9E and FIGS. 10A to 10E, the relationship of G3>1>G1 is assumed.

If the signal level of the corrected differential signals illustrated in FIGS. 9C and 100 is expressed as H', the H' can be expressed by Equation below as a signal corrected using the gain values G3 and G1.

The corrected differential signal H' when the distance is large as illustrated in FIGS. 9A to 9E and the corrected differential signal H' when the distance is small as illustrated in FIGS. 10A to 10E are expressed by the equations below, respectively.

$$H'=G3 \times H$$

$$H'=G1 \times H$$

Signals calculated through the equations above have the signal levels H' of the corrected differential signals illustrated in FIGS. 9C and 100.

When the distance is large as illustrated in FIG. 9C, if the corrected differential signal H' as indicated by the solid line is compared with the differential signal (refer to FIG. 9B) before correction as indicated by the dotted line, the amplitude of the corrected differential signal H' as indicated by the solid line is larger than that of the differential signal before correction as indicated by the dotted line.

Meanwhile, when the distance is large as illustrated in FIG. 10C, if the corrected differential signal H' as indicated by the solid line is compared with the differential signal (refer to FIG. 9B) before correction as indicated by the dotted line, the amplitude of the corrected differential signal H' as indicated by the solid line is smaller than that of the differential signal before correction as indicated by the dotted line.

This is because the corrected differential signals illustrated in FIGS. 9C and 10C are generated through the multiplication of different gain values.

That is, for a pixel with large depth information (the distance from a camera is large) which is output from the depth information output unit 115, the differential signal illustrated in FIG. 9B is multiplied by a large gain value and corrected, so that the corrected differential signal illustrated in FIG. 9C is generated.

Meanwhile, for a pixel with small depth information (the distance from the camera is small) which is output from the depth information output unit 115, the differential signal illustrated in FIG. 10B is multiplied by a small gain value and corrected, so that the corrected differential signal illustrated in FIG. 10C is generated.

The corrected differential signals illustrated in FIGS. 9C and 10C, for example, are subject to the non-linear conversion process by the non-linear conversion section 133 through the setting previously described with reference to FIG. 8, resulting in the generation of the parallax emphasis signals E'.

The image synthesizing section 134 receives the video data S corresponding to the input signal illustrated in FIGS. 9A and 10A and the parallax emphasis signal E' obtained by non-linearly converting the corrected differential signal H' illustrated in FIGS. 9C and 10C, thereby generating right eye image signals Right and left eye image signals Left through the equations below.

$$Right=S-E'$$

$$Left=S+E$$

The signals Right and left generated through the above process are the right eye image signals indicated by the solid line in FIGS. 9D and 10D and the left eye image signals indicated by the solid line in FIGS. 9E and 10E, respectively.

Meanwhile, the signals indicated by the dotted lines in FIGS. 9D and 9E and FIGS. 10D and 10E are not the corrected differential signal H illustrated in FIGS. 9C and 10C, but correspond to the right eye image signal and the left eye image signal which are generated using the parallax emphasis signal E obtained through a non-linear conversion applying differential signals before correction, i.e., the differential signals H illustrated in FIGS. 9B and 10B. That is, the equations below are established.

$$Right=S-E$$

$$Left=S+E$$

In the case of comparing the solid lines with the dotted lines which are drawn in the right eye image signals illustrated in FIGS. 9D and 10D and the left eye image signals illustrated in FIGS. 9E and 10E, when the distance is large as illustrated in FIGS. 9A to 9E, the amplitudes of the solid lines (the corrected differential signals) are larger than those of the dotted lines (the differential signals before correction) in both the right eye image signal illustrated in FIG. 9D and the left eye image signal illustrated in FIG. 9E.

Meanwhile, when the distance is small as illustrated in FIGS. 10A to 10E, the amplitudes of the solid lines (the corrected differential signals) are smaller than those of the dotted lines (the differential signals before correction) in both the right eye image signal illustrated in FIG. 10D and the left eye image signal illustrated in FIG. 10E.

That is to say, when the distance is large, the difference between the right eye image signal illustrated in FIG. 9D and the left eye image signal illustrated in FIG. 9E is increased. When the distance is small, the difference between the right eye image signal illustrated in FIG. 10D and the left eye image signal illustrated in FIG. 10E is reduced.

In the case of displaying the right eye image signals illustrated in FIGS. 9D and 10D and the left eye image signals illustrated in FIGS. 9E and 10E as described above, when the distance is large, since retinal disparity between the right eye image signals illustrated in FIGS. 9D and 10D and the left eye image signals illustrated in FIGS. 9E and 10E is large, the image seems to be located at a long distance. When distance is small, since the retinal disparity between the right eye image signals illustrated in FIGS. 9D and 10D and the left eye image signals illustrated in FIGS. 9E and 10E is small, the image seems to be located at a short distance.

In addition, the above embodiment has described the example in which the image synthesizing section 134 generates the right eye image signals Right illustrated in FIGS. 9D and 10D and the left eye image signals Left illustrated in FIGS. 9E and 10E according to the equations below by using the parallax emphasis signals E', which are obtained by performing the non-linear conversion process (refer to FIG. 8) as a parallax emphasis process by the non-linear conversion section 133 with respect to the corrected differential signals H' illustrated in FIGS. 9C and 10C, and the input signals S.

Right=$S-E'$

Left=$S+E$

However, as described above, the parallax emphasis process performed by the non-linear conversion section 133 is not necessary. That is, it may be possible to employ a configuration in which the image synthesizing section 134 generates the right eye image signals Right illustrated in FIGS. 9D and 10D and the left eye image signals Left illustrated in FIGS. 9E and 10E by using the input as indicated by the dotted line in FIG. 4, that is, the corrected differential signals H' illustrated in FIGS. 9C and 10C and the input signals S according to the equations below.

Right=$S-H'$

Left=$S+H'$

7. Stereoscopic Effect due to Retinal Disparity (Parallax)

After the right eye image signal and the left eye image signal described with respect to FIGS. 9A to 9E and FIGS. 10A to 10E are generated, the image of these image signals is observed by the right eye and the left eye of an observer, so that parallax occurs and thus the observer can feel depth. This is a phenomenon based on retinal disparity of the right eye image and the left eye image. Hereinafter, the retinal disparity of the right eye image R (Right) and the left eye image L (Left) generated in the image processing apparatus 100 according to the embodiment of the present invention will be described.

As described above, the image processing apparatus according to the embodiment of the present invention generates the corrected differential signals H' illustrated in FIGS. 9C and 10C by multiplying the differential signals H illustrated in FIGS. 9B and 10B by the gain values according to distance, and generates the right eye image signals Right illustrated in FIGS. 9D and 10D and the left eye image signals Left illustrated in FIGS. 9E and 10E by using the corrected differential signals H' illustrated in FIGS. 9C and 10C and the input signals S.

Right=$S-H'$

Left=$S+H$

Alternatively, the image processing apparatus according to the embodiment of the present invention generates the right eye image signals Right illustrated in FIGS. 9D and 10D and the left eye image signals Left illustrated in FIGS. 9E and 10E according to the equations below by using the parallax emphasis signals E', which are obtained by non-linearly converting the corrected differential signals H' illustrated in FIGS. 9C and 10C, and the input signals S.

Right=$S-E'$

Left=$S+E$

The reason for generating the corrected differential signals H' illustrated in FIGS. 9C and 10C by using the gain values according to distance is for further increasing parallax with respect to a subject with a large distance.

The present applicant has a prior application of the present application, which is Japanese Priority Patent Application JP 2008-203614. The prior application discloses a configuration in which parallax between a right eye image and a left eye image is set through a process independent of a subject distance. First, the process of the prior application will be described.

According to the process of the prior application (Japanese Priority Patent Application JP 2008-203614), a right eye image signal Right and a left eye image signal Left are generated by applying a differential signal H of an input signal S. That is, subject distance information is not used.

Hereinafter, an example will be described, in which the non-linear conversion process is omitted and the right eye image signal Right and the left eye image signal Left are generated through addition and subtraction of the input signal S and the differential signal H.

In the prior application (Japanese Priority Patent Application JP 2008-203614), the right eye image signal Right and the left eye image signal Left are generated by applying the input signal S and the differential signal H of the input signal according to the equations below.

Right=$S-H$

Left=$S+H$

The right eye image signal Right and the left eye image signal Left correspond to the signals indicated by the dotted lines in FIGS. 9D and 9E and FIGS. 10D and 10E. In FIGS. 9D and 9E and FIGS. 10D and 10E, the signal levels of the dotted lines are equal to each other. That is, the signals are signals for which correction according to subject distances has not been performed.

FIG. 11 is a diagram explaining retinal disparity occurring in the right eye image signal Right and the left eye image signal Left indicated by the dotted lines in FIGS. 9D and 9E and FIGS. 10D and 10E, which are generated by adding/subtracting the differential signal (FIG. 9B=FIG. 10B), for which the correction according to subject distances has not been performed, to/from the input signal. Herein, for the simplification of description, FIG. 11 illustrates a case where a one dimensional sine wave signal is input as the input signal S.

The right eye image signal Right and the left eye image signal Left are generated by applying the input signal S and the differential signal H of the input signal according to the equations below.

Right=$S-H$

Left=$S+H$

In FIG. 11, the horizontal axis denotes a pixel position in the horizontal direction of an image and the vertical axis denotes a luminance level of a pixel.

The input signal S is expressed by a sine wave signal, i.e., the equation below.

S=$\sin \omega x$

At this time, the differential signal H is expressed by a cosine wave signal, i.e., the equation below.

H=$\cos \omega x$

At this time, the left eye image signal L and the right eye image signal R are expressed by the equations below.

$$L = S + H = \sin\omega x + \cos\omega x = \sqrt{2}\sin\left(\omega x + \frac{\pi}{4}\right)$$
$$R = S - H = \sin\omega x - \cos\omega x = \sqrt{2}\sin\left(\omega x - \frac{\pi}{4}\right)$$ [Equation 1]

From the equations above, the phase of the left eye image signal L advances by π/4 as compared with the input signal S, and the phase of the right eye image signal R is delayed by π/4 as compared with the input signal S. That is, the left eye image signal L has an amplitude twice as large as that of the input signal and shifted in the horizontal direction by ⅛ of the period determined by an angular frequency ω. Similarly to this, the right eye image signal R has an amplitude twice as large as that of the input signal and shifted in the horizontal direction by ⅛ of the period determined by an angular frequency ω. As described above, since the phase difference of π/2 occurs between the left eye image signal L and the right eye image signal R, the phase difference is perceived as retinal disparity, so that depth can be felt.

In addition, the retinal disparity varies depending on the angular frequency ω. FIG. 12 illustrates waveforms when the angular frequency of an input signal is reduced by ½ as compared with FIG. 11. As can be understood from FIG. 12, the retinal disparity is twice as large as the case of FIG. 11. When the input signal is stereoscopically viewed with both eyes, the input signal seems to be located at a rear side as compared with the input signal illustrated in FIG. 11.

Moreover, FIG. 13 illustrates waveforms when the angular frequency of an input signal is increased by two times as compared with FIG. 11. As can be understood from FIG. 13, the retinal disparity is reduced by ½ as compared with FIG. 11. When the input signal is stereoscopically viewed with both eyes, the input signal seems to be located at a front side as compared with the input signal illustrated in FIG. 11.

As described above, the retinal disparity varies depending on the angular frequency ω. However, in this scheme, the phase difference between the left eye image signal L and the right eye image signal R does not depend on the distance of a subject. The phase difference (corresponds to the retinal disparity) between the left eye image signal L and the right eye image signal R is maximally limited to the width of a ½ wavelength of a spatial frequency of the input signal. This does not depend on the distance of a subject. As described above, this scheme is problematic in that regardless of the distance of a subject the same parallax is set.

The embodiment of the present invention is to solve the above problems. That is, the image processing apparatus according to the embodiment of the present invention generates the corrected differential signals H' (the data indicated by the solid lines in FIGS. 9C and 10C) by multiplying the differential signals H illustrated in FIGS. 9B and 10B by the gain values according to the distance.

The image processing apparatus generates the right eye image signals Right illustrated in FIGS. 9D and 10D and the left eye image signals Left illustrated in FIGS. 9E and 10E by using the corrected differential signals H' (the data indicated by the solid lines in FIGS. 9C and 10C) according to distance. That is, the image synthesizing section 134 generates the right eye image signals Right illustrated in FIGS. 9D and 10D and the left eye image signals Left illustrated in FIGS. 9E and 10E according to the following Equations which represent addition and subtraction of the input signal and the corrected differential signal H' obtained by multiplying the gain values according to distance.

Right=S-H'

Left=S+H

In addition, the equations above represent a processing example in which the non-linear conversion process (refer to FIG. 8). In the case of performing the non-linear conversion process, the following processes are performed.

The image synthesizing section 134 generates the right eye image signals Right illustrated in FIGS. 9D and 10D and the left eye image signals Left illustrated in FIGS. 9E and 10E according to the following equations by using the parallax emphasis signals E', which are obtained by performing the non-linear conversion process (refer to FIG. 8) as the parallax emphasis process by the non-linear conversion section 133 with respect to the corrected differential signals H' illustrated in FIGS. 9C and 10C, and the input signals S.

Right=S-E'

Left=S+E'

In the configuration according to the embodiment of the present invention, the right eye image signals Right and the left eye image signals Left are generated by adding the corrected differential signal H', which is obtained by multiplying the gain values according to distance, or the parallax emphasis signal E', which is generated by non-linearly converting the corrected differential signal H', to the input signal S, or subtracting the corrected differential signal H' from the input signal S. Through the above process, the parallax for a subject with a large distance can be increased as compared with a subject with a small distance.

The process according to the embodiment of the present invention, that is, the principle of parallax adjustment according to the subject distance will be described with reference to FIG. 14. For the simplification of description, FIG. 14 illustrates a case where a one dimensional sine wave signal is input as the input signal S similarly to FIG. 1.

FIG. 14 illustrates five signals: the input signal S; a first left eye signal L1 (when the subject distance (depth) is small); a second left eye signal L2 (when the subject distance (depth) is large); a first right eye signal R1 (when the subject distance (depth) is small); and a second right eye signal R2 (when the subject distance (depth) is large).

The first left eye signal L1 (when the subject distance (depth) is small and the first right eye signal R1 (when the subject distance (depth) is small), for example, correspond to the setting illustrated in FIGS. 10A to 10E.

The second left eye signal L2 (when the subject distance (depth) is large and the second right eye signal R2 (when the subject distance (depth) is large), for example, correspond to the left and right eye signals generated through the setting illustrated in FIGS. 9A to 9E.

In detail, in the case of the gains (G1<G3) according to distance, the left and right eye signals are generated by adding the corrected differential signal H', which is generated according to the equations below by multiplying the gains according to the subject distances by the differential signal H, to the input signal S, or subtracting the corrected differential signal H' from the input signal S.

First right eye signal $R1=S-H'=S-(G1 \times H)$

First left eye signal $L1=S+H'=S+(G1 \times H)$

Second right eye signal $R2=S-H'=S-(G3 \times H)$

Second left eye signal $L2=S+H'=S+(G3 \times H)$

As a result, the phase of the first right eye signal R1 (=S-H'=S-(G1×H)) advances by a constant amount α as compared with the input signal.

The phase of the first left eye signal L1 (=S+H'=S+(G1×H)) is delayed by the constant amount α as compared with the input signal.

Furthermore, the phase of the second right eye signal R2 (=S−H'=S−(G3×H)) advances by an amount (α+β) as compared with the input signal.

The phase of the second left eye signal L2 (=S+H'=S+(G3×H)) is delayed by the amount (α+β) as compared with the input signal.

As a result, an image observed by both eyes when the subject distance is small includes a combination of the first right eye signal R1 (=S−H'=S−(G1×H)) and the first left eye signal L1 (=S+H'=S+(G1×H)). At this time, retinal disparity is 2α.

Meanwhile, an image observed by both eyes when the subject distance is large includes a combination of the second right eye signal R2 (=S−H'=S−(G3×H)) and the second left eye signal L2 (=S+H'=S+(G3×H)). At this time, retinal disparity is 2 (α+β).

That is, the parallax of the image observed by both eyes when the subject distance is small is 2α and the parallax of the image observed by both eyes when the subject distance is large is 2 (α+β).

As described above, the parallax of the image observed by both eyes is set to be small when the subject distance is small and is set to be large when the subject distance is large. That is, the parallax is set according to the subject distances.

Consequently, it is possible to provide an observer (a user) of the image with perception that an object with a small subject distance seems to be located in front and an object with a large subject distance seems to be located further away than the nearer object.

As described above, the image processing apparatus 100 according to the embodiment of the present invention extracts the corrected differential signal H', which is generated by multiplying the gain G according to the depth (i.e., the subject distance D) by the luminance differential signal H as the spatial feature value of the input image signal S, or the parallax emphasis signal E' generated by non-linearly converting the corrected differential signal H', and performs a different emphasis process having applied the feature value to the input image signal, thereby generating a left eye image and a right eye image.

In addition, the right eye image signals Right illustrated in FIGS. 9D and 10D are generated as signals having the following signal characteristics d1 to d3.

Signal Characteristics (d1) in at least a part of the area A where the change in the luminance of the input signals illustrated in FIGS. 9A and 10A is positive and the differential signals (or the corrected differential signals illustrated in FIGS. 9C and 10O) illustrated in FIGS. 9B and 10B have a positive value, a signal area occurs where luminance is reduced as compared with the input signal illustrated in FIGS. 9A and 10A.

(d2) in at least a part of the area B where the change in the luminance of the input signal illustrated in FIGS. 9A and 10A is negative and the differential signals (or the corrected differential signals illustrated in FIGS. 9C and 10O) illustrated in FIGS. 9B and 10B have a negative value, a signal area occurs where luminance is increased as compared with the input signal illustrated in FIGS. 9A and 10A.

(d3) in an area where the differential signals (or the corrected differential signals illustrated in FIGS. 9C and 10C) illustrated in FIGS. 9B and 10B have a value of 0, no change occurs in the luminance of the input signal.

Furthermore, the left eye image signals Left illustrated in FIGS. 9E and 10E are generated as signals having the following signal characteristics e1 to e3.

Signal Characteristics (e1) in at least a part of the area A where the change in the luminance of the input signals illustrated in FIGS. 9A and 10A is positive and the differential signals (or the corrected differential signals illustrated in FIGS. 9C and 10C) illustrated in FIGS. 9B and 10B have a positive value, a signal area occurs where luminance is increased as compared with the input signal illustrated in FIGS. 9A and 10A.

(e2) in at least a part of the area B where the change in the luminance of the input signals illustrated in FIGS. 9A and 10A is negative and the differential signals (or the corrected differential signals illustrated in FIGS. 9C and 10C) illustrated in FIGS. 9B and 10B have a negative value, a signal area occurs where luminance is reduced as compared with the input signal illustrated in FIGS. 9A and 10A.

(e3) in an area where the differential signals (or the corrected differential signals illustrated in FIGS. 9C and 10C) illustrated in FIGS. 9B and 10B have a value of 0, no change occurs in the luminance of the input signal.

As described above, the image synthesizing section 134 illustrated in FIG. 4 synthesizes the input signals S illustrated in FIGS. 9A and 10A and the corrected differential signals H' corrected according to distance as illustrated in FIGS. 9C and 10O, or the parallax emphasis signal E' which is a result (the output of the non-linear conversion section 133) obtained by further non-linearly converting the corrected differential signals H' by the non-linear conversion section 133, thereby generating the right eye image signals Right illustrated in FIGS. 9D and 10D and the left eye image signals Left illustrated in FIGS. 9E and 10E.

For example, if an input signal to be converted is a still image, the image synthesizing section 134 performs a signal synthesizing process with respect to one frame image constituting the still image according to the equations below, thereby generating the right eye image signals Right illustrated in FIGS. 9D and 10D and the left eye image signals Left illustrated in FIGS. 9E and 10E.

Right eye image signal $R=S-H'$

Left eye image signal $L=S+H'$ or

Right eye image signal $R=S-E'$

Left eye image signal $L=S+E'$

Furthermore, if an input signal to be converted is a moving image, the image synthesizing section 134 performs a signal synthesizing process with respect to each frame image constituting the moving image according to the equations below, thereby generating the right eye image signals Right illustrated in FIGS. 9D and 10D and the left eye image signals Left illustrated in FIGS. 9E and 10E.

$R=S-H'$ $L=S+H'$ or $R=S-E'$ $L=S+E'$

However, in the case of the moving image, the generation pattern of the left eye image signal and the right eye image signal may also be changed according to the image output unit 150 (refer to FIG. 2) that finally performs image display and the control scheme of a display apparatus. Hereinafter, a plurality of processing examples performed by the image synthesizing section 134 when an input signal to be converted is a moving image (video data) will be described with reference to FIGS. 15A to 15E and the other drawings.

First, a basic processing example performed by the image synthesizing section 134 when the input signal to be converted is the moving image (video data) will be described with reference to FIGS. 15A to 15E. According to the processing example illustrated in FIGS. 15A to 15E, the image synthesizing section 134 (refer to FIG. 4) generates and outputs both images of the left eye image Left and the right eye image Right with respect to all frames (frame n, frame n+1, frame n+2, frame n+3 . . . ) of input video data.

FIGS. 15A to 15E illustrate a detailed image example of an input image frame S, depth information D, a corrected differential signal H', a right eye signal R, and a left eye signal L. In addition, the depth information D illustrated in FIG. 15B is depth information data corresponding to luminance, which indicates that a subject distance is small (near) in a bright part and is large (far) in a dark part.

The image synthesizing section 134 inputs the luminance signal S of the input image frame illustrated in FIG. 15A and a corrected differential signal H' [=a corrected differential signal H' obtained by controlling the gain of a differential image signal based on the depth information illustrated in FIG. 15B] to all frames of the input image frame illustrated in FIG. 15A, and generates and outputs the right eye image signal illustrated in FIG. 15D and the left eye image signal illustrated in FIG. 15E according to a calculation process expressed by the equations below. In such a case, the image synthesizing section 134 outputs video signals of two systems.

Right eye image signal $R=S-H'$

Left eye image signal $L=S+H'$

In addition, the image synthesizing section 134 may generate and output the right eye image signal illustrated in FIG. 15D and the left eye image signal illustrated in FIG. 15E according to a calculation process expressed by the equations below by using the non-linear conversion (refer to FIG. 8) for the corrected differential signal H'.

Right eye image signal $R=S-E'$

Left eye image signal $L=S+E'$

According to the basic processing example illustrated in FIGS. 15A to 15E, the image synthesizing section 134 outputs the video signals of two systems of the right eye image and the left eye image corresponding to all frames. The image output unit 150 (refer to FIG. 1) receiving the signals of two systems outputs the data to a display apparatus for realizing stereoscopic vision. The display apparatus performs output control according to various display schemes for realizing the stereoscopic vision. For example, the display apparatus includes a display scheme such as an image output scheme corresponding to a passive glass method for separating an image observed by both eyes through polarizing filters or color filters, an image output scheme corresponding to an active glass method for temporally separating an observed image alternately with respect to both eyes by alternately opening and closing a liquid crystal shutter from side to side, and the like. The display apparatus displays an image by using the video signal of two systems generated by the image synthesizing section 134 according to any one of the above-described display schemes.

According to the basic processing example illustrated in FIGS. 15A to 15E, depth information is individually generated or input for each frame and the process is performed. However, it may be possible to employ a configuration using depth information created from one frame in units of plural frames, or input depth information corresponding to one representative frame.

FIGS. 16A to 16E illustrate an example using depth information created from one frame in units of two frames and FIGS. 17A to 17E illustrate an example using depth information created from one frame in units of four frames.

With such processing configurations, data processing is possible, in which a refining load of the depth information is reduced, and delay of a process and the like do not occur although the processing capacity of an apparatus is reduced.

Furthermore, in the case where the image display scheme is predetermined, it is possible to set the image synthesizing section 134 to generate and output an output image signal corresponding to each image output scheme. Hereinafter, processing examples of the image synthesizing section 134 corresponding to the three different display schemes will be described with reference to FIGS. 18A, 18C, 18D and 18E, FIGS. 19A, 19C, 19D and 19E, and FIGS. 20A, 20C, 20D, 20E and 20F.

For example, various types display schemes of the display apparatus that finally performs image display are as follows.

(1) A scheme in which a left eye image and a right eye image are time-divided and alternately output (FIGS. 18A, 18C, 18D and 18E)

This, for example, is an image output scheme corresponding to an active glass method for temporally separating an observed image alternately with respect to both eyes by alternately opening and closing a liquid crystal shutter image from side to side.

(2) A scheme corresponding to an active glass method with a high output frame rate in the scheme in which the left eye image and the right eye image are time-divided and alternately output (FIGS. 19A, 19C, 19D and 19E)

This is a time division scheme similar to that of FIGS. 18A, 18C, 18D and 18E, except that the output frame rate is high.

(3) A scheme in which the left eye image and the right eye image are spatially separated and simultaneously output (FIGS. 20A, 20C, 20D, 20*E* and 20*F*)

This, for example, is an image output scheme corresponding to the passive glass method for separating an image observed by both eyes through polarizing filters or color filters. For example, in a stereoscopic display apparatus employing the spatial division scheme, after polarizing filters, in which the polarizing directions thereof are set to change for each horizontal line, are bonded to the front surface of a display unit, when a user views the image with glasses based on a polarizing filter scheme, video separated for each horizontal line is observed by both eyes of the user.

First, the processing example of the image synthesizing section 134 when the display scheme of the display apparatus that finally performs the image display is the scheme in which the left eye image and the right eye image are time-divided and alternately output will be described with reference to FIGS. 18A, 18C, 18D and 18E.

In such an image display scheme, the image synthesizing section 134 generates the left eye image Left and the right eye image Right by switching them with respect to all frames (frame n, frame n+1, frame n+2, frame n+3 . . . ) of the input video data, and outputs them.

Odd number frames and even number frames of input video data are set as a left eye image and a right eye image (or a right eye image and a left eye image) for output. In relation to the output image, the left eye image and the right eye image are time-divided and alternately output in the image display apparatus through the image output unit 150. For example, the output timing of each image is controlled in synchronization with the open/close of the shutter provided in glasses based on a liquid crystal shutter scheme, which is worn by a user who observes the image. That is, the output timing is controlled such that the left eye image and the right eye image are temporally and alternately observed by the left eye and the right eye, respectively.

Since the images are output to the stereoscopic display apparatus employing such a time division scheme, the image synthesizing section 134 performs an image synthesizing process with respect to all frames (frame n, frame n+1, frame n+2, frame n+3 . . . ) of the input video data by switching the left eye image and the right eye image in units of frames. That is, as illustrated in FIGS. 18D and 18E, the image synthesizing section 134 alternately performs the synthesis of the left eye image Left and the synthesis of the right eye image Right in units of frames, and outputs the synthesized images.

In the example illustrated in FIGS. 18A, 18C, 18D and 18E, the right eye image is first generated in the frame n according to the equations below. That is, when the luminance level of video data of the frame n of an input signal illustrated in FIG. 18A is expressed by S and the signal level of a corrected differential signal of the frame n illustrated in FIG. 18C is expressed by H', the right eye image signal illustrated in FIG. 18D and the left eye image signal illustrated in FIG. 18E are generated through addition and subtraction below.

Right eye image signal Right=$S-H'$

Left eye image signal Left=$S+H'$

In addition, when the signal level of a parallax emphasis signal obtained by non-linearly converting the corrected differential signal H' is expressed by E', the right eye image signal illustrated in FIG. 18D and the left eye image signal illustrated in FIG. 18E may also be generated through addition and subtraction below.

Right eye image signal Right=$S-E'$

Left eye image signal Left=$S+E'$

According to such a scheme, the image synthesizing section 134 generates one image of the right eye image or the left eye image in correspondence with each frame, and outputs the generated image. That is, the image synthesizing section 134 outputs video data of one system.

In relation to the output image, the left eye image and the right eye image are time-divided and alternately output in the image display apparatus through the image output unit 150. The output timing of each image is controlled in synchronization with the open/close of the shutter provided in glasses based on the liquid crystal shutter scheme, which is worn by a user who observes the image. That is, the output timing is controlled such that the left eye image and the right eye image are temporally and alternately observed by the left eye and the right eye, respectively.

FIGS. 19A, 19C, 19D and 19E illustrate the processing example of the image synthesizing section 134 when the display scheme of the display apparatus that finally performs the image display is the scheme in which the left eye image and the right eye image are time-divided and alternately output, similarly to the case of FIGS. 18A, 18C, 18D and 18E. However, differently from the case of FIGS. 18A, 18C, 18D and 18E, in this processing example, both images of the left eye image Left and the right eye image Right are synthesized through the synthesis process according to the equations below with respect to each frame of input video data, and are output.

Right eye image signal Right=$S-H'$

Left eye image signal Left=$S+H'$ or

Right eye image signal Right=$S-E'$

Left eye image signal Left=$S+E'$

In the display apparatus that performs image output, the left eye image and the right eye image are time-divided and alternately output at a frame rate twice as fast as that of the input video data.

In such a process, as illustrated in FIGS. 19A, 19C, 19D and 19E, the image synthesizing section 134 generates the right eye image R illustrated in FIG. 19D and the left eye image L illustrated in FIG. 19E from one frame (e.g., the frame n of an input image illustrated in FIG. 19A) and a corrected differential signal image (or a parallax emphasis signal) illustrated in FIG. 19C of the input image by applying the equations below.

$R=S-H', L=S+H'$ or $R=S-E', L=S+E'$

In addition, the image synthesizing section 134 generates the right eye image illustrated in FIG. 19D and the left eye image illustrated in FIG. 19E from the next frame (i.e., the frame n+1 of the input image illustrated in FIG. 19A) and a corrected differential signal image (or a parallax emphasis signal) illustrated in FIG. 19C of the input image by applying the equations above.

In this way, the left eye image and the right eye image are generated from one frame. In relation to the two images (i.e., the right eye image and the left eye image) generated from one frame, the left eye image and the right eye image are time-divided and alternately output in the image display apparatus through the image output unit 150.

The image output unit 150 outputs the images such that they are displayed at a frame rate twice as fast as the frame rate of the input image illustrated in FIG. 19A. In addition, the image output unit 150 synchronously controls the open/close of the shutter provided in glasses based on the liquid crystal shutter scheme, which is worn by a user who observes the image in compliance with the display timing of the images. That is, the image output unit 150 allows the left eye image and the right eye image to be temporally and alternately observed by the left eye and the right eye, respectively. In such a scheme, the image synthesizing section 134 outputs video data with a frame rate twice as fast as that of the input video data of one system.

FIGS. 20A, 20C, 20D, 20E and 20F illustrate the processing example of the image synthesizing section 134 when images are output to the stereoscopic display apparatus employing the spatial division scheme. In the stereoscopic display apparatus employing the spatial division scheme, after polarizing filters, in which the polarizing directions thereof are set to change for each horizontal line, are bonded to the front surface of a display unit, when a user sees the image with glasses based on a polarizing filter scheme, video separated for each horizontal line is provided for both eyes of the user. That is, the right and left polarizing filters of the glasses are also filters in which the polarizing directions thereof are set to change, only the right eye image illustrated in FIG. 20D is observed by the right eye, and only the left eye image illustrated in FIG. 20E is observed by the left eye.

In such a process, as illustrated in FIGS. 20A, 20C, 20D, 20E and 20F, the image synthesizing section 134 performs a synthesis process according to the equations below with respect to one frame (e.g., the frame n of an input image illustrated in FIG. 20A) and a corrected differential signal image (or a parallax emphasis signal) illustrated in FIG. 20C of the input image, thereby generating the right eye image illustrated in FIG. 20D and the left eye image illustrated in FIG. 20E.

Right eye image signal Right=$S-H'$

Left eye image signal Left=$S+H'$ or

Right eye image signal Right=$S-E'$

Left eye image signal Left=$S+E'$

In addition, the image synthesizing section 134 generates a binocular parallax image illustrated in FIG. 20F from the right eye image illustrated in FIG. 20D and the left eye image illustrated in FIG. 20E. That is, the image synthesizing section 134 reduces the phases of the right eye image illustrated in FIG. 20D and the left eye image illustrated in FIG. 20E to ½ in the vertical direction by shifting the images by one line. The image synthesizing section 134 alternately synthesizes the left eye image and the right eye image, which are generated in this way, in units of horizontal lines, thereby generating and outputting one binocular parallax image illustrated in FIG. 20F.

The binocular parallax image illustrated in FIG. 20F is generated by connecting effective areas (image display portions except for black lines) of the right eye image illustrated in FIG. 20D and the left eye image illustrated in FIG. 20E to one another. That is, the binocular parallax image illustrated in FIG. 20F alternately includes each line data of the right eye image illustrated in FIG. 20D and the left eye image illustrated in FIG. 20E. In this way, the image synthesizing section 134 generates and outputs the binocular parallax image illustrated in FIG. 20F. In such a scheme, the image synthesizing section 134 outputs video data of one system, which has a frame rate the same as that of the input image.

The image output unit 150 displays the binocular parallax image illustrated in FIG. 20F on the stereoscopic display apparatus employing the spatial division scheme. As described above, the stereoscopic display apparatus employing the spatial division scheme includes the polarizing filters provided at the front surface of a display unit, in which the polarizing directions thereof are set to change for each horizontal line. A user observes the binocular parallax image with glasses based on the polarizing filter scheme. The right and left polarizing filters of the glasses are also filters in which the polarizing directions thereof are set to change, only the right eye image illustrated in FIG. 20D is observed by the right eye, and only the left eye image illustrated in FIG. 20E is observed by the left eye.

The right eye image signal Right and the left eye image signal Left described with reference to FIGS. 18A, 18C, 18D and 18E, FIGS. 19A, 19C, 19D and 19E, and FIGS. 20A, 20C, 20D, 20E and 20F are images generated according to the equations below, which have been previously described.

Right eye image signal Right=$S-H'$

Left eye image signal Left=$S+H'$ or

Right eye image signal Right=$S-E'$

Left eye image signal Left=$S+E'$

In the equations above, S denotes the input signal, H' denotes the corrected differential signal generated by multiplying the gain G according to distance by the differential signal H of the input signal S, and E' denotes the parallax emphasis signal obtained by non-linearly converting the corrected differential signal H'.

In addition, the parallax emphasis signal E' may also be obtained through a linear conversion, as well as the non-linear conversion for the corrected differential signal H' of the input signal S.

The right eye image signal Right and the left eye image signal Left as described above are generated and observed by both eyes of an observer, so that depth can be felt. This a phenomenon based on the retinal disparity of the right eye image and the left eye image.

8. Corrected Differential Signal with Gain according to Subject Distance & Image Generation Configuration Example Next, the corrected differential signal with the gain according to the subject distance and a detailed configuration example of the image conversion unit that performs image generation will be described.

Figure 21:
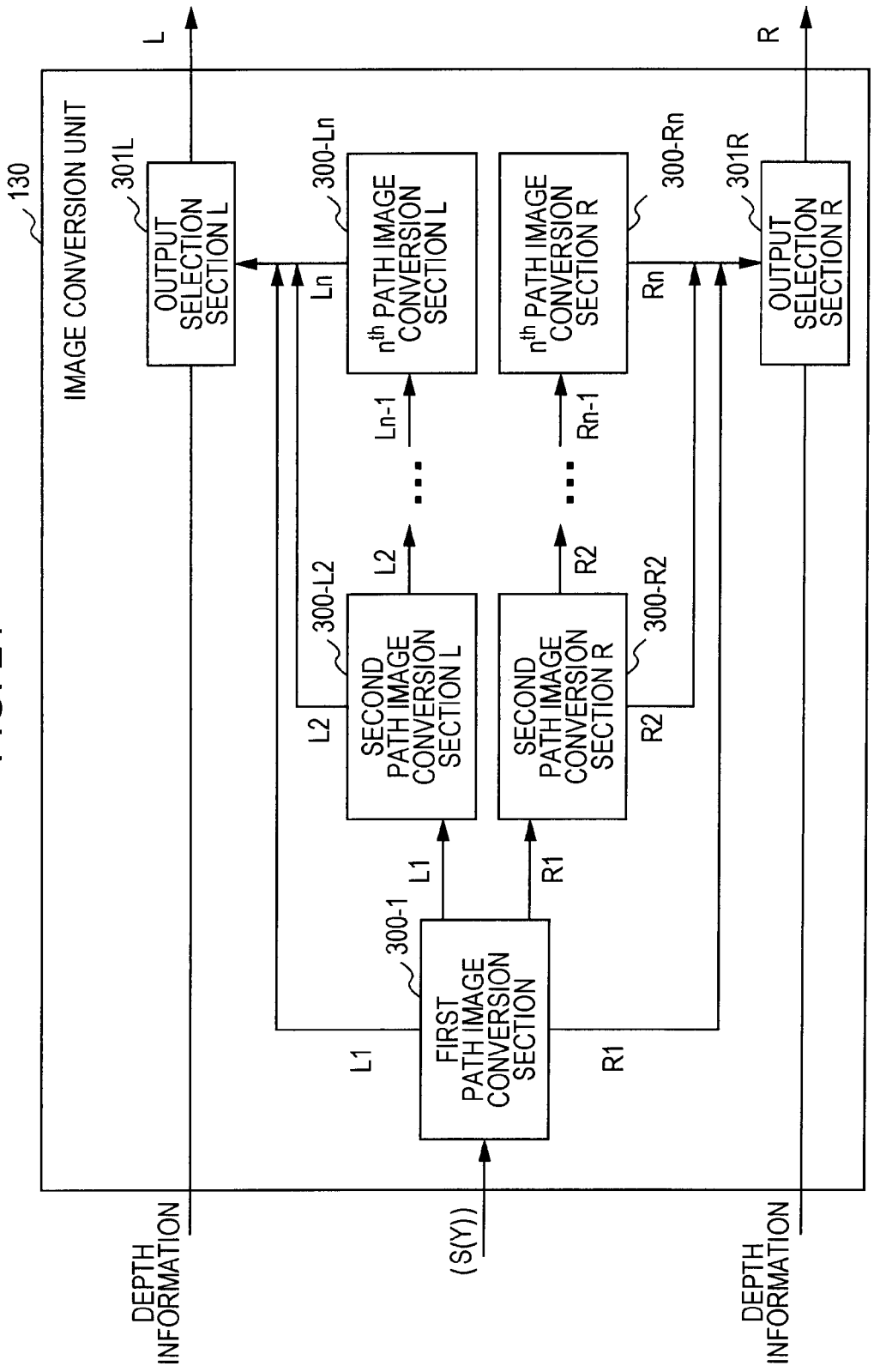
FIG. 21 is a diagram explaining a configuration example of an image conversion unit of an image processing apparatus according to an embodiment of the present invention.

The configuration example of the image conversion unit 130 has been previously described with reference to FIG. 4. The configuration of the image conversion unit 130 illustrated in FIG. 4 is one configuration example of the image conversion unit. FIG. 21 illustrates a configuration example of the image conversion unit 130, which is different from that of FIG. 4.

The image conversion unit 130 illustrated in FIG. 21 includes a first path image conversion section 300-1, second to $n^{th}$ path image conversion sections L (300-L2 to 300-Ln), second to $n^{th}$ path image conversion sections R (300-R2 to 300-Rn), an output selection section L (301L), and an output selection section R (301R).

The first path image conversion section 300-1, the second to $n^{th}$ path image conversion sections L (300-L2 to 300-Ln), and the second to $n^{th}$ path image conversion sections R (300-R2 to 300-Rn) have the same configuration which will be described with reference to FIG. 22. Thus, for example, each image conversion section 300 can be configured by repeatedly using a single piece of hardware.

The output selection section L (301L) receives the output of the first path image conversion section 300-1 and the output of the second to $n^{th}$ path image conversion sections L (300-L2 to 300-Ln), and selectively outputs any one of the output of the first path image conversion section 300-1 and the output of the second to $n^{th}$ path image conversion sections L (300-L2 to 300-Ln) in units of pixels or pixel blocks according to distance information in units of pixels or pixel blocks. The output image is a left eye image L.

The output selection section R (301R) receives the output of the first path image conversion section 300-1 and the output of the second to $n^{th}$ path image conversion sections R (300-R2 to 300-Rn), and selectively outputs any one of the output of the first path image conversion section 300-1 and the output of the second to $n^{th}$ path image conversion sections R (300-R2 to 300-Rn) in units of pixels or pixel blocks according to distance information in units of pixels or pixel blocks. The output image is a right eye image R.

In addition, in relation to data to be processed in the image conversion unit 130 illustrated in FIG. 21, an input signal is defined as a luminance signal Y and luminance images are generated based on the luminance signal. However, the luminance images are output by reflecting the luminance thereof in color signals (RGB and the like) as pixel values, so that image signals L and R can be generated for output.

The detailed configuration example and processing of the first path image conversion section 300-1, the second path image conversion section L (300-L2), and the second path image conversion section R (300-R2) will be described with reference to FIG. 22.

The first path image conversion section 300-1 includes a first path phase control signal generation part 311, a first path non-linear conversion part 312, and a first path image synthesizing part 313.

The first path phase control signal generation part 311 performs a process with respect to the input signal S. In addition, in the following description, in order to clarify that the process is performed with respect to the luminance Y of the input signal, the input signal S is expressed by the input signal Y. The first path phase control signal generation part 311 performs a differential process with respect to the input signal Y to generate a differential signal h(Y).

The first path non-linear conversion part 312 performs a non-linear conversion process with respect to the differential signal h(Y) to control the generation of parallax. The first path non-linear conversion part 312 performs the non-linear conversion process, which has been described with reference to FIG. 8, to generate a parallax emphasis signal e(Y) as output.

The first path image synthesizing part 313 adds the parallax emphasis signal e(Y), which is a non-linearly converted differential signal, to the input luminance signal Y and subtracts the parallax emphasis signal e(Y) from the input luminance signal Y, thereby generating the following signals.

Left eye signal $L1=Y+e(Y)$

Right eye signal $R1=Y-e(Y)$

The second path image conversion section L (300-L2) receives the left eye signal L1 generated by the first path image conversion section 300-1 and generates a left eye signal L2 causing a large parallax.

The second path image conversion section R (300-R2) receives the right eye signal R1 generated by the first path image conversion section 300-1 and generates a right eye signal R2 causing the large parallax.

The second path image conversion section L (300-L2) and the second path image conversion section R (300-R2) have the same configuration as that of the first path image conversion section 300-1.

That is, the second path image conversion section L (300-L2) includes a second path phase control signal generation part 321, a second path non-linear conversion part 322, and a second path image synthesizing part 323.

The second path image conversion section R (300-R2) includes a second path phase control signal generation part 331, a second path non-linear conversion part 332, and a second path image synthesizing part 333.

The second path image conversion section L (300-L2) receives the left eye signal L1 generated by the first path image conversion section 300-1 and generates the left eye signal L2 causing the large parallax by performing the following process.

The second path phase control signal generation part 321 performs a differential process with respect to the input signal (the left eye signal L1) to generate a differential signal h(L1).

The second path non-linear conversion part 322 performs a non-linear conversion process with respect to the differential signal h(L1) to control the generation of parallax. The second path non-linear conversion part 322 performs the non-linear conversion process, which has been described with reference to FIG. 8, to generate a parallax emphasis signal e(L1) as output.

The second path image synthesizing part 323 adds the parallax emphasis signal e(L1), which is a non-linearly converted differential signal, to the input signal (the left eye signal L1), thereby generating the following signals.

Left eye signal $L2=L1+e(L1)$

As described above, the second path image conversion section L (300-L2) receives the left eye signal L1 generated by the first path image conversion section 300-1 and generates the left eye signal L2 causing a large parallax.

The second path image conversion section R (300-R2) receives the right eye signal R1 generated by the first path image conversion section 300-1 and generates the right eye signal R2 causing the large parallax by performing the following process.

The second path phase control signal generation part 331 performs a differential process with respect to the input signal (the right eye signal R1) to generate a differential signal h(R1).

The second path non-linear conversion part 332 performs a non-linear conversion process with respect to the differential signal h(R1) to control the generation of parallax. The second path non-linear conversion part 332 performs the non-linear conversion process, which has been described with reference to FIG. 8, to generate a parallax emphasis signal e(R1) as output.

The second path image synthesizing part 333 subtracts the parallax emphasis signal e(R1) from the input signal (the right eye signal R1), thereby generating the following signals.

Right eye signal $R2=R1-e(R1)$

As described above, the second path image conversion section R (300-R2) receives the right eye signal R1 generated by the first path image conversion section 300-1 and generates the right eye signal R2 causing the large parallax.

Figure 22:
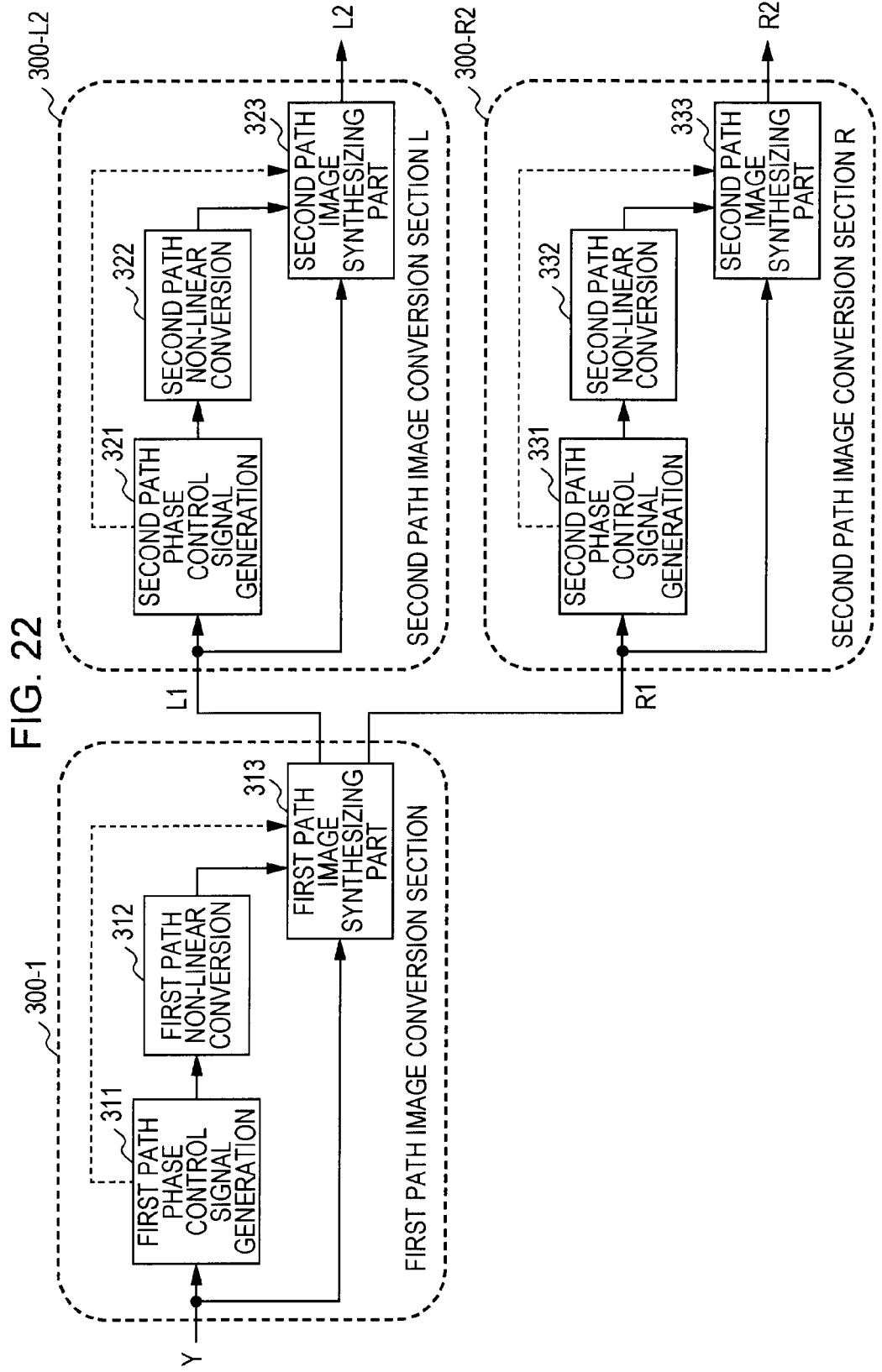
FIG. 22 is a diagram explaining a configuration example of an image conversion unit of an image processing apparatus according to an embodiment of the present invention.

FIG. 22 illustrates the configuration of the first path image conversion section 300-1, the second path image conversion sections L (300-L2), and the second path image conversion sections R (300-R2). Furthermore, the third to $n^{th}$ path image conversion sections L and R also have the same configuration. The $k^{th}$ path image conversion sections L and R receive the output (L(k−1) and R(k−1)) of the (k−1)$^{th}$ path image conversion sections L and R of the prior stage, and generate a left eye signal Lk and a right eye signal Rk, which cause parallax, respectively.

The output selection section L (301L) receives the output of the first path image conversion section 300-1 and the output of the second to $n^{th}$ path image conversion sections L (300-L2 to 300-Ln), and selectively outputs any one of the output of the first path image conversion section 300-1 and the output of the second to $n^{th}$ path image conversion sections L (300-L2 to 300-Ln) in units of pixels or pixel blocks according to the distance information in units of pixels or pixel blocks. The output image is the left eye image L.

For a pixel area where a subject distance is small, the output L1 of the first path image conversion section 300-1 is selected as the output of the pixel area. For a pixel area where the subject distance is large, the output Ln of the $n^{th}$ path image conversion section L (300-Ln) is selected as the output of the pixel area. That is, the output of the first path image conversion section 300-1 to the $n^{th}$ path image conversion section L (300-Ln) is selected according to the size of the distance information, and the left eye image L of each pixel area is generated for output.

Meanwhile, the output selection section R (301R) receives the output of the first path image conversion section 300-1 and the output of the second to $n^{th}$ path image conversion sections R (300-R2 to 300-Rn), and selectively outputs any one of the output of the first path image conversion section 300-1 and the output of the second to $n^{th}$ path image conversion sections R (300-R2 to 300-Rn) in units of pixels or pixel blocks according to the distance information in units of pixels or pixel blocks. The output image is the right eye image R.

For a pixel area where the subject distance is small, the output R1 of the first path image conversion section 300-1 is selected as the output of the pixel area. For a pixel area where the subject distance is large, the output Rn of the $n^{th}$ path image conversion section R (300-Rn) is selected as the output of the pixel area. That is, the output of the first path image conversion section 300-1 to the $n^{th}$ path image conversion section R (300-Rn) is selected according to the size of the distance information, and the right eye image R of each pixel area is generated for output.

Through these processes, the images for each eye are generated for output, in which parallax between the left eye image and the right eye image is set to be small in the pixel area where the subject distance is small and set to be large in the pixel area where the subject distance is large.

For example, the image signals obtained as the output of the first path image conversion section 300-1 are the first left eye signal L1 and the first right eye signal R1 as illustrated in FIG. 14.

The output of the second path image conversion section L (300-L2) corresponds to the second left eye signal L2 as illustrated in FIG. 14, and the output of the second path image conversion section R (300-R2) corresponds to the second right eye signal R2 as illustrated in FIG. 14.

In the pixel area where the subject distance is small, the first left eye signal L1 and the first right eye signal R1 as illustrated in FIG. 14, which are obtained as the output of the first path image conversion section 300-1, are used, and the parallax between the first left eye signal L1 and the first right eye signal R1 is $2\alpha$.

Furthermore, in the pixel area where the subject distance is large, the output of the second path image conversion section L (300-L2) and the output of the second path image conversion section R (300-R2), are used, and the parallax between the first left eye signal L2 and the first right eye signal R2 is $2(\alpha+\beta)$.

As described above, in the image processing apparatus according to the embodiment of the present invention, the parallax according to the subject distance can be generated.

Next, another configuration example of the image conversion unit 130 will be described with reference to FIG. 23.

Figure 23:
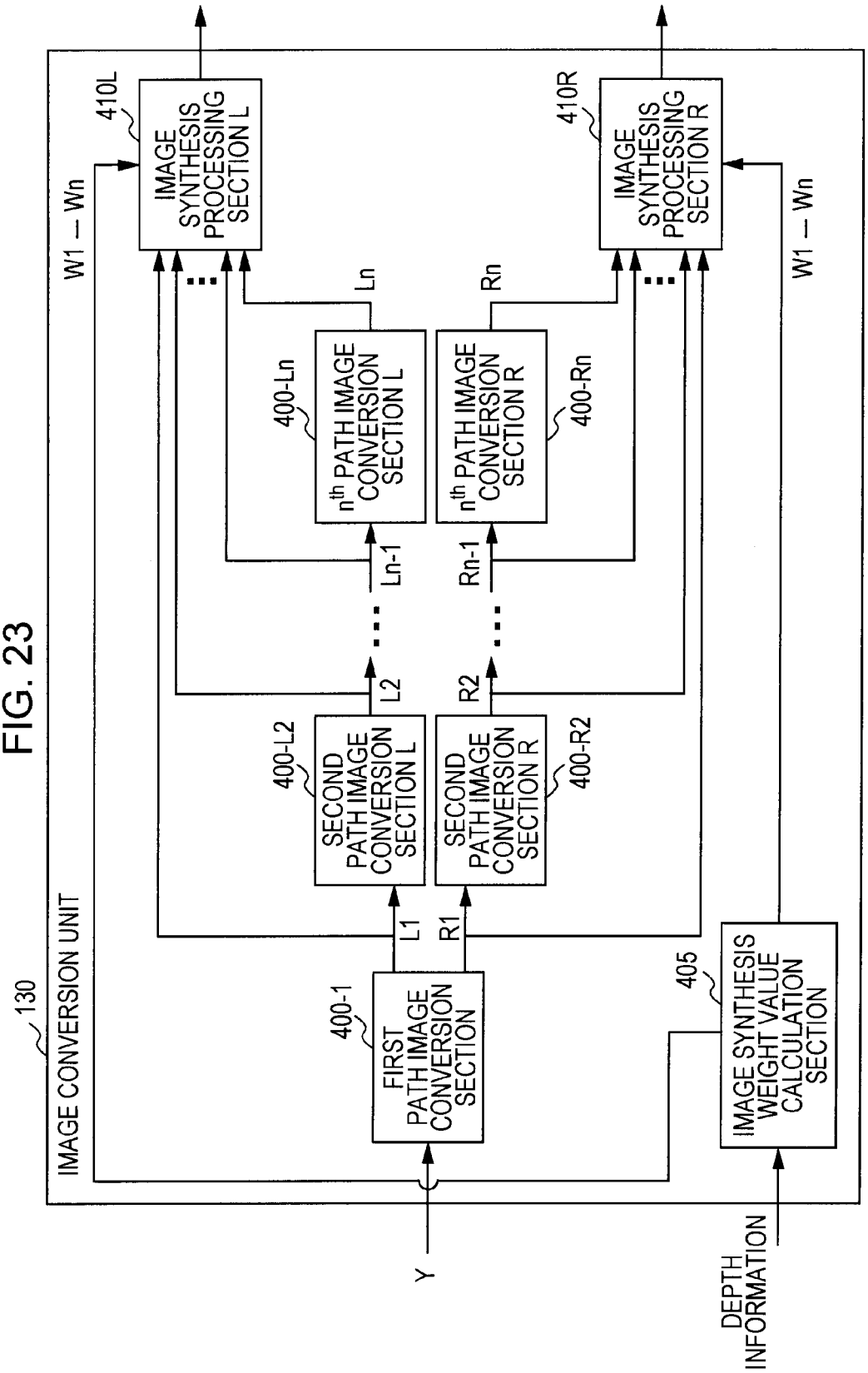
FIG. 23 is a diagram explaining a configuration example of an image conversion unit of an image processing apparatus according to an embodiment of the present invention.

The image conversion unit 130 illustrated in FIG. 23 includes a first path image conversion section 400-1, second to $n^{th}$ path image conversion sections L (400-L2 to 400-Ln), second to $n^{th}$ path image conversion sections R (400-R2 to 400-Rn), an image synthesis weight value calculation section 405, an image synthesis processing section L (410L), and an image synthesis processing section R (410R).

The first path image conversion section 400-1, the second to $n^{th}$ path image conversion sections L (400-L2 to 400-Ln), and the second to $n^{th}$ path image conversion sections R (400-R2 to 400-Rn) have the same configuration which will be described with reference to FIGS. 24 and 25. Thus, for example, each image conversion section 400 can be configured by repeatedly using a single piece of hardware.

The image synthesis weight value calculation section 405 receives the depth information from the depth information output unit 115 (refer to FIGS. 2 and 3), and outputs weight (W) information based on the depth of each pixel to the image synthesis processing section L (410L) and the image synthesis processing section R (410R) according to preset information. Weight refers to weight information regarding respective output values of the first to $n^{th}$ path image conversion sections.

The image synthesis processing section L (410L) adds the output values of the first path image conversion section and the second to $n^{th}$ path image conversion sections L according to the weight information which is input from the image synthesis weight value calculation section 405, thereby generating a left eye image L.

The image synthesis processing section R (410R) adds the output values of the first path image conversion section and the second to $n^{th}$ path image conversion sections R according to the weight information which is input from the image synthesis weight value calculation section 405, thereby generating a right eye image R.

The detailed configuration example and processing of the first path image conversion section 400-1, the second path image conversion section L (400-L2), and the second path image conversion section R (400-R2) will be described with reference to FIG. 24.

The first path image conversion section 400-1 includes a first path phase control signal generation part 411, a first path gain control part 412, a first path non-linear conversion part 413, and a first path image synthesizing part 414.

The first path phase control signal generation part 411 performs a differential process with respect to the input luminance signal Y to generate a differential signal h(Y).

The first path gain control part 412 multiplies the differential signal h(Y) by gain based on distance information of each pixel, thereby generating a corrected differential signal h'(Y).

The first path non-linear conversion part 413 performs a non-linear conversion process with respect to the corrected differential signal h'(Y) to control the generation of parallax. The first path non-linear conversion part 413 performs the non-linear conversion process, which has been described with reference to FIG. 8, to generate a parallax emphasis signal e'(Y) as output.

The first path image synthesizing part 414 adds the parallax emphasis signal e'(Y), which is a non-linearly converted corrected differential signal, to the input luminance signal Y and subtracts the parallax emphasis signal e'(Y) from the input luminance signal Y, thereby generating the following signals.

Left eye signal $L1=Y+e'(Y)$

Right eye signal $R1=Y-e'(Y)$

The second path image conversion section L (400-L2) receives the left eye signal L1 generated by the first path image conversion section 400-1 and generates a left eye signal L2 causing a large parallax.

The second path image conversion section R (400-R2) receives the right eye signal R1 generated by the first path image conversion section 400-1 and generates a right eye signal R2 causing a large parallax.

The second path image conversion section L (400-L2) and the second path image conversion section R (400-R2) have the same configuration as that of the first path image conversion section 400-1.

That is, the second path image conversion section L (400-L2) includes a second path phase control signal generation part 421, a second path gain control part 422, a second path non-linear conversion part 423, and a second path image synthesizing part 424.

The second path image conversion section R (400-R2) includes a second path phase control signal generation part 431, a second path gain control part 432, a second path non-linear conversion part 433, and a second path image synthesizing part 434.

The second path image conversion section L (400-L2) receives the left eye signal L1 generated by the first path image conversion section 400-1 and generates the left eye signal L2 causing the large parallax by performing the following process.

The second path phase control signal generation part 421 performs a differential process with respect to the input signal (the left eye signal L1) to generate a differential signal h(L1).

The second path gain control part 422 multiplies the differential signal h(L1) by gain based on distance information of each pixel, thereby generating a corrected differential signal h'(L1).

The second path non-linear conversion part 423 performs a non-linear conversion process with respect to the corrected differential signal h'(L1) to control the generation of parallax. The second path non-linear conversion part 423 performs the non-linear conversion process, which has been described with reference to FIG. 8, to generate a parallax emphasis signal e'(L1) as output.

The second path image synthesizing part 424 adds the parallax emphasis signal e'(L1), which is a non-linearly converted differential signal, to the input signal (the left eye signal L1), thereby generating the following signals.

Left eye signal $L2 = L1 + e'(L1)$

As described above, the second path image conversion section L (400-L2) receives the left eye signal L1 generated by the first path image conversion section 400-1 and generates the left eye signal L2 causing the large parallax.

The second path image conversion section R (400-R2) receives the right eye signal R1 generated by the first path image conversion section 400-1 and generates the right eye signal R2 causing the large parallax by performing the following process.

The second path phase control signal generation part 431 performs a differential process with respect to the input signal (the right eye signal R1) to generate a differential signal h(R1).

The second path gain control part 432 multiplies the differential signal h(R1) by gains based on distance information of each pixel, thereby generating a corrected differential signal h'(R1).

The second path non-linear conversion part 433 performs a non-linear conversion process with respect to the corrected differential signal h'(R1) to control the generation of parallax. The second path non-linear conversion part 433 performs the non-linear conversion process, which has been described with reference to FIG. 8, to generate a parallax emphasis signal e'(R1) as output.

The second path image synthesizing part 434 subtracts the parallax emphasis signal e'(R1) from the input signal (the right eye signal R1), thereby generating the following signals.

Right eye signal $R2 = R1 - e'(R1)$

As described above, the second path image conversion section R (400-R2) receives the right eye signal R1 generated by the first path image conversion section 400-1 and generates the right eye signal R2 causing the large parallax.

Figure 24:
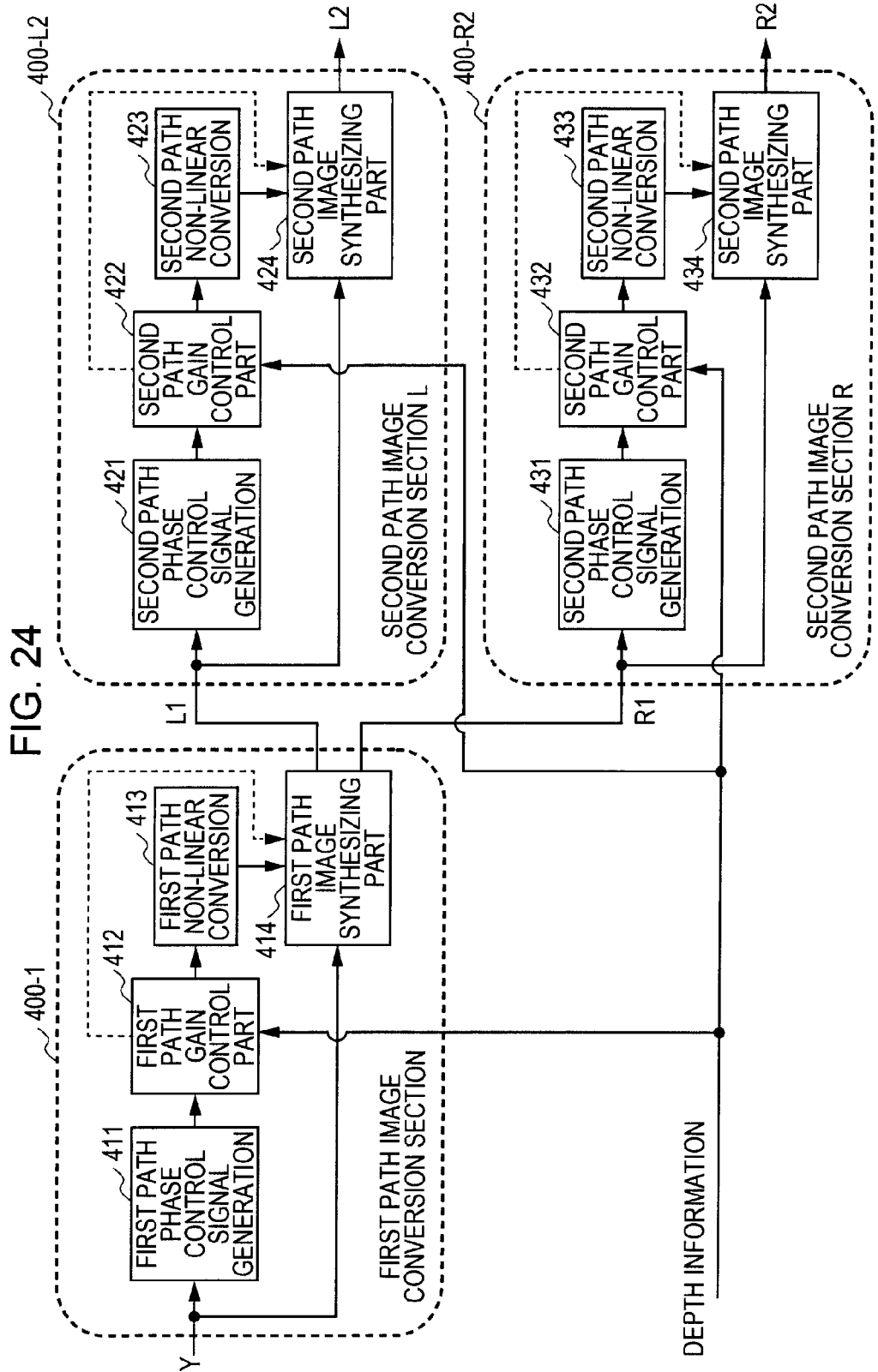
FIG. 24 is a diagram explaining a configuration example of an image conversion unit of an image processing apparatus according to an embodiment of the present invention.

FIG. 24 illustrates the configuration of the first path image conversion section 400-1, the second path image conversion sections L (400-L2), and the second path image conversion sections R (400-R2). Furthermore, the third to $n^{th}$ path image conversion sections L and R also have the same configuration. The $k^{th}$ path image conversion sections L and R receive the output (L(k−1) and R(k−1)) of the $(k-1)^{th}$ path image conversion sections L and R of the prior stage, and generate a left eye signal Lk and a right eye signal Rk, which cause parallax, respectively.

The left eye signals L1 to Ln generated by the first path image conversion section 400-1 and the second to $n^{th}$ path image conversion sections L (400-L2 to 400-Ln) are input to the image synthesis processing section L (410L).

The right eye signals R1 to Rn generated by the first path image conversion section 400-1 and the second to $n^{th}$ path image conversion sections R (400-R2 to 400-Rn) are input to the image synthesis processing section R (410R).

As described above, the weight information including addition weights of each path image conversion section set according to the depth is input to the image synthesis processing section L (410L) and the image synthesis processing section R (410R) from the image synthesis weight value calculation section 405.

The image synthesis processing section L (410L) adds the output values of the first path image conversion section and the second to $n^{th}$ path image conversion sections L according to the weight information which is input from the image synthesis weight value calculation section 405, thereby generating the left eye image L.

The image synthesis processing section R (410R) adds the output values of the first path image conversion section and the second to $n^{th}$ path image conversion sections R according to the weight information which is input from the image synthesis weight value calculation section 405, thereby generating the right eye image R.

Depth information corresponding to the input image is input to the image synthesis weight value calculation section 405. When the depth information is input to a certain area (or a pixel) of an image, n weight values W1 to Wn (n corresponds to the number of paths in image conversion) corresponding to the area are determined based on predetermined setting. They are weight values multiplied by the output results of each path.

Weight addition adapted to the area of the image is performed in the image synthesis processing section L (410L) and the image synthesis processing section R (410R) based on the weight values.

Herein, for a certain pixel [coordinate is (x, y)], if a pixel value in a $k^{th}$ path output image is set to Pk(x, y) and weight is set to Wk(x, y), the pixel value Pout(x, y) in the output image is calculated by the equation below.

$$p_{out(x,y)} = \sum_{k=1}^{n} p_{k(x,y)} \times w_{k(x,y)} \qquad \text{[Equation 2]}$$

herein $$\sum_{k=1}^{n} w_{k(x,y)} = 1$$

The above calculation equation is applied to the left eye image L and the right eye image R.

For the setting of the weights W1 to Wn, a real number may be allocated such that the sum of the weight values is 1, and a method is not specifically limited. When considering that parallax is large in an image with a large number of paths, that is, an image which seems to be located at a front side is generated, weight to an output image with a small number of paths is set to be large (the value of weight with a small k of wk is increased) based on the depth information in the case where a corresponding area is shown at a "front side", and weight to an output image with a large number of paths is set to be large (the value of weight with a large k of wk is increased) based on the depth information in the case where a corresponding area is shown at a "rear side".

In addition, the gain control part included in each path image conversion section calculates a gain coefficient based on preset depth information. The gain coefficient based on the depth information can be set using various methods. For example, in the case where the distance of a subject is small, that is, depth is shallow, a gain coefficient multiplied in the stage with a small number of paths is increased and a gain coefficient multiplied in the stage with a large number of paths is reduced. Furthermore, in the case where the distance of a subject is large, that is, depth is deep, a gain coefficient multiplied in the stage with a small number of paths is reduced and a gain coefficient multiplied in the stage with a large number of paths is increased.

Another configuration example of the first path image conversion section 400-1, the second path image conversion section L (400-L2), and the second path image conversion section R (400-R2) constituting the image conversion unit 130 illustrated in FIG. 23 will be described with reference to FIG. 25.

Figure 25:
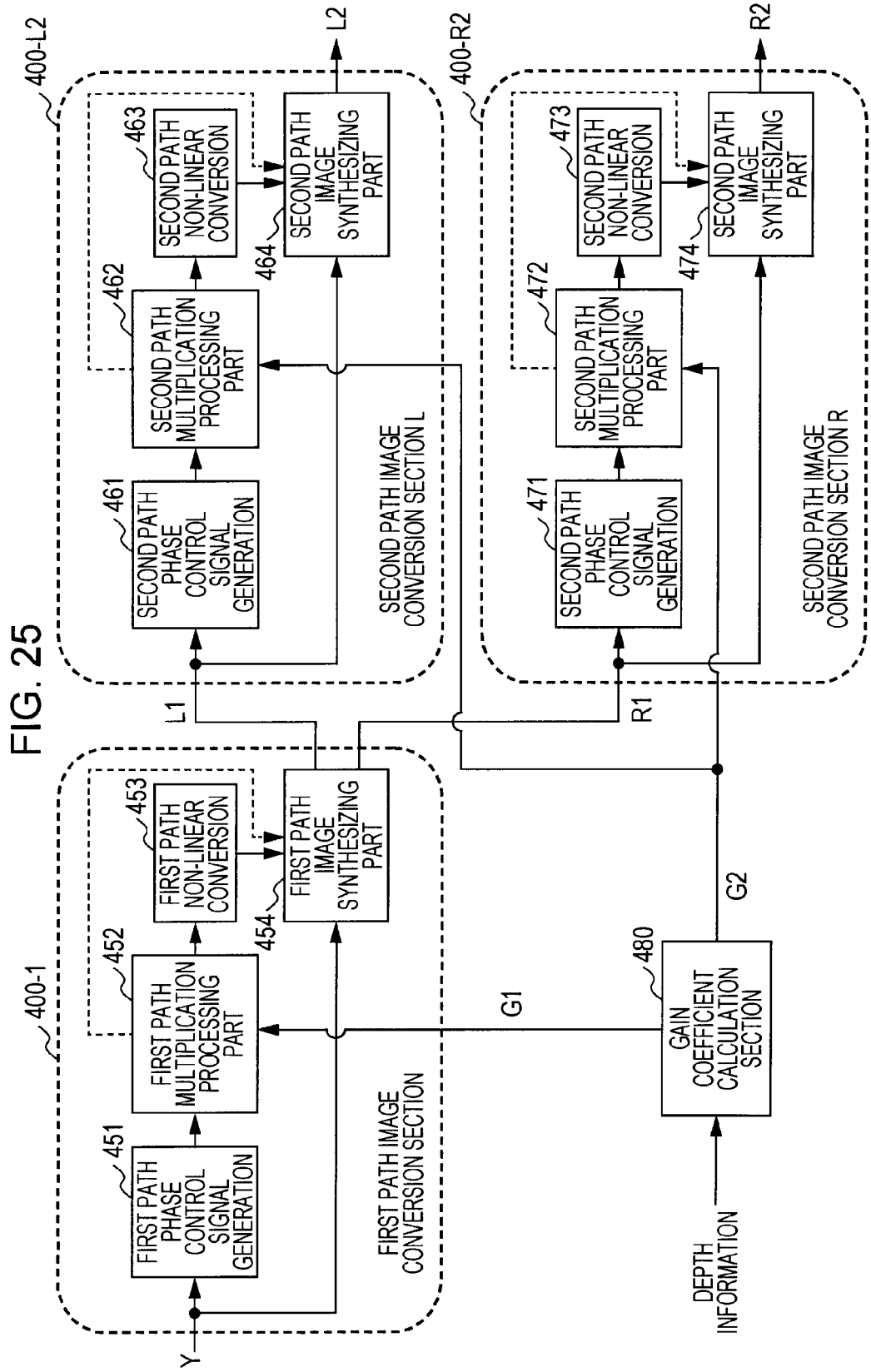
FIG. 25 is a diagram explaining a configuration example of an image conversion unit of an image processing apparatus according to an embodiment of the present invention.

The configuration illustrated in FIG. 25 is different from the configuration described with reference to FIG. 24, and depth information is input to a gain coefficient calculation section 480. The gain coefficient calculation section 480 calculates a gain coefficient, which corresponds to the depth information in units of input image areas, based on a preset algorithm (corresponding data of depth and a gain coefficient), and outputs the gain coefficient as a calculation result to each path image conversion section.

The first path image conversion section 400-1 includes a first path phase control signal generation part 451, a first path multiplication processing part 452, a first path non-linear conversion part 453, and a first path image synthesizing part 454.

The first path phase control signal generation part 451 performs a differential process with respect to an input luminance signal Y to generate a differential signal h(Y).

The first path multiplication processing part 452 multiplies the differential signal h(Y) by the gain coefficient input from the gain coefficient calculation section 480, thereby generating a corrected differential signal h'(Y). The gain coefficient input from the gain coefficient calculation section 480 is based on distance information of each pixel.

The first path non-linear conversion part 453 performs a non-linear conversion process with respect to the corrected differential signal h'(Y) to control the generation of parallax. The first path non-linear conversion part 453 performs the non-linear conversion process, which has been described with reference to FIG. 8, to generate a parallax emphasis signal e'(Y) as output.

The first path image synthesizing part 454 adds the parallax emphasis signal e'(Y), which is a non-linearly converted corrected differential signal, to the input luminance signal Y and subtracts the parallax emphasis signal e'(Y) from the input luminance signal Y, thereby generating the following signals.

Left eye signal $L1 = Y + e'(Y)$

Right eye signal $R1 = Y - e'(Y)$

The second path image conversion section L (400-L2) includes a second path phase control signal generation part 461, a second path multiplication processing part 462, a second path non-linear conversion part 463, and a second path image synthesizing part 464.

The second path image conversion section L (400-L2) receives the left eye signal L1 generated by the first path image conversion section 400-1 and generates a left eye signal L2 causing a large parallax.

The second path image conversion section R (400-R2) includes a second path phase control signal generation part 471, a second path multiplication processing part 472, a second path non-linear conversion part 473, and a second path image synthesizing part 474.

The second path image conversion section R (400-R2) receives the right eye signal R1 generated by the first path image conversion section 400-1 and generates a right eye signal R2 causing a large parallax.

The difference with the configuration described with reference to FIG. 24 is that the gain coefficient is not calculated by each path image conversion section, and the gain coefficient generated by the gain coefficient calculation section 480 is input and multiplied by the differential signal h generated by each path phase control signal generation part, thereby generating the corrected differential signal h'.

In addition, the gain coefficient calculation section 480 calculates the gain coefficient based on the preset depth information and outputs the gain coefficient to each path image conversion section. The gain coefficient based on the depth information can be set using various methods. For example, in the case where the distance of a subject is small, that is, depth is shallow, a gain coefficient multiplied in the stage with a small number of paths is increased and a gain coefficient multiplied in the stage with a large number of paths is reduced. Furthermore, in the case where the distance of a subject is large, that is, depth is deep, a gain coefficient multiplied in the stage with a small number of paths is reduced and a gain coefficient multiplied in the stage with a large number of paths is increased.

So far, the configuration illustrated in FIG. 22 has been described as the configuration example of the path image conversion sections constituting the image conversion unit illustrated in FIG. 21, and the configurations illustrated in FIGS. 24 and 25 have been described as the configuration example of the path image conversion sections constituting the image conversion unit illustrated in FIG. 23.

However, all the configurations of the path image conversion sections illustrated in FIGS. 22, 24 and 25 can be used as the configuration of the path image conversion sections constituting the image conversion unit illustrated in FIG. 21 or the image conversion unit illustrated in FIG. 23.

9. Process Sequence of Image Conversion Unit

Figure 26:
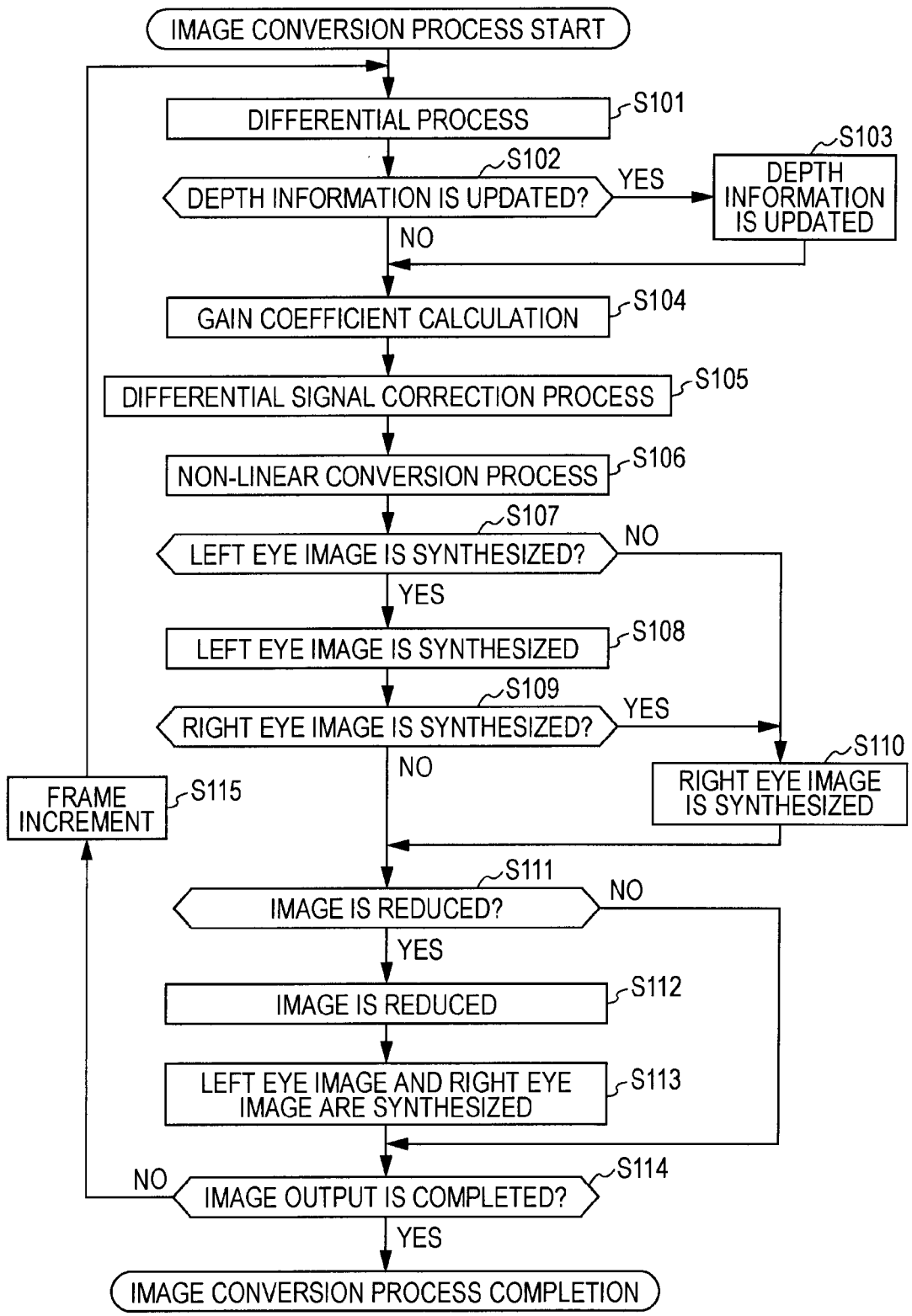
FIG. 26 is a flowchart explaining the sequence of processes performed by an image conversion unit of an image processing apparatus according to an embodiment of the present invention.

Next, the sequence of processes performed by the image conversion unit 130 of the image processing apparatus 100 according to the embodiment of the present invention will be described with reference to the flowchart illustrated in FIG. 26. In addition, the flowchart illustrated in FIG. 26 illustrates the process when an input image is a moving image (video data).

In step S101, the differentiator 131 (refer to FIG. 4) performs a differential process with respect to the luminance signal of the video data which is input to the image conversion unit 130. That is, the differentiator 131, for example, performs a differential process with respect to the input signals illustrated in FIGS. 9A and 10A to generate the differential signals H illustrated in FIGS. 9B and 10B.

In step S102, it is determined whether depth information is updated. The update of the depth information is performed according to preset information such as a one-frame unit, a two-frame unit or a four-frame unit. The update of the depth information by a one-frame unit, for example, corresponds to the process which has been previously described with reference to FIGS. 15A to 15E, the update of the depth information by a two-frame unit corresponds to the process illustrated in FIGS. 16A to 16E, and the update of the depth information by a four-frame unit corresponds to the process illustrated in FIGS. 17A to 17E. It is determined whether an update time is reached according to the above settings.

When the update time is reached, since the determination in step S102 is "yes", the image conversion process proceeds to step S103 and the depth information is updated. That is, depth information corresponding to the latest input frame is acquired.

In step S104, a calculation process of a gain coefficient is performed. The gain coefficient is calculated corresponding to the depth information. However, the content of the gain coefficient is changed according to the configuration of an image conversion unit. Herein, the case using the configuration of the image conversion unit 130 illustrated in FIG. 4 will be described. In such a case, the gain control section 132 illustrated in FIG. 4 calculates the gain coefficient. The calculated gain coefficient is set to be large when a subject distance is large and small when the subject distance is small.

In step S105, a differential signal correction process is performed. A correction process of the differential signal is performed by applying the gain coefficient calculated by the gain control section 132 illustrated in FIG. 4. In detail, as described with reference to FIG. 5, the multiplication processing part 202 in the gain control section 132 multiplies the differential signal by the gain G calculated based on the depth information. Through the above correction process, for example, the corrected differential signals H' illustrated in FIGS. 9C and 10C are generated.

In step S106, a non-linear conversion process is performed with respect to the corrected differential signals H'. The non-linear conversion section 133 (refer to FIG. 4) performs the non-linear conversion process with respect to the corrected differential signal H' which is output from the gain control section 132. For example, the non-linear conversion process is a non-linear conversion process corresponding to the graph as illustrated in FIG. 8.

Processes in step S107 and subsequent steps are performed by the image synthesizing section 134. In step S107, a control part of the image synthesizing section 134 determines whether to perform synthesis of a left eye image with respect to a current input frame. The determination process is performed according to a display scheme of an image display apparatus, which is output from the image processing apparatus 100, and the value of a frame counter provided in the image synthesizing section 134. The frame counter holds values corresponding to frame numbers of an input image frame.

When the output scheme of the image display apparatus, for example, is the time division output scheme illustrated in FIGS. 18A, 18C, 18D and 18E, the image synthesizing section 134 determines whether to output the left eye image according to the value of the frame counter. That is, according to the time division output scheme illustrated in FIGS. 18A, 18C, 18D and 18E, the left eye image is controlled to be output in either an even number frame or an odd number frame. When it is determined that the left eye image is output according to the value of the frame counter, the image conversion process proceeds to step S108. Meanwhile, When it is determined that the current input frame is a frame in which the right eye image is output according to the value of the frame counter, the image conversion process proceeds to step S110.

Furthermore, when the output scheme of the image display apparatus is not the time division output scheme illustrated in FIGS. 18A, 18C, 18D and 18E, that is, when the output scheme of the image display apparatus is the time division output scheme using the twice the frame rate illustrated in FIGS. 19A, 19C, 19D and 19E, the spatial division output scheme illustrated in FIGS. 20A, 20C, 20D, 20E and 20F, or the image display apparatus receives the left eye image and the right eye image and performs display control, the image synthesizing section 134 determines whether to synthesize left eye images with respect to all input frames, and the image conversion process proceeds to step S108.

In step S108, the image synthesizing section 134 generates the left eye image Left according to the equation below, which has been previously described.

Left eye image signal Left=$S+E'$

In addition, the luminance level of video data corresponding to the input signal illustrated in FIG. 19A is expressed by S, and the signal level of the parallax emphasis signal, which is obtained by non-linearly converting the corrected differential signal H' obtained by correcting the differential signal H by applying the gain G according to the subject distance (depth information), is expressed by E'.

Meanwhile, when it is determined that the synthesis of the left eye image is not performed with respect to the current input frame in step S107, the image conversion process proceeds to step S110, and a right eye image is generated with respect to the current input frame. The image synthesizing section 134 generates the right eye image Right according to the equation below, which has been previously described.

Right eye image signal Right=$S-E'$

In addition, the luminance level of video data corresponding to the input signal illustrated in FIG. 19A is expressed by S, and the signal level of the parallax emphasis signal, which is obtained by non-linearly converting the corrected differential signal H' obtained by correcting the differential signal H by applying the gain G according to the subject distance (depth information), is expressed by E'.

If the generation of the right eye image is completed in step S108, it is determined whether to generate the right eye image with respect to a frame the same as the generation frame of the left eye image in step S109. When the output scheme of the image display apparatus is the time division output scheme illustrated in FIGS. 18A, 18C, 18D and 18E, since only an image for any one of the left eye and the right eye are synthesized in each frame, it is determined that the generation of the right eye image is not performed and the image conversion process proceeds to step S111.

Furthermore, when the output scheme of the image display apparatus is not the time division output scheme illustrated in FIGS. 18A, 18C, 18D and 18E, that is, when the output scheme of the image display apparatus is the time division output scheme using the twice frame rate illustrated in FIGS. 19A, 19C, 19D and 19E, the spatial division output scheme illustrated in FIGS. 20A, 20C, 20D, 20E and 20F, or the image display apparatus receives the left eye image and the right eye image and performs display control, the image synthesizing section 134 determines whether to synthesize right eye images with respect to all input frames, and the image conversion process proceeds to step S110. The process in step S110 is the generation process of the right eye image according to the equations above as previously described above.

In step S111, the control part of the image synthesizing section 134 determines whether to perform an image reduction process. When the output scheme of the image display apparatus is the spatial division output scheme illustrated in FIGS. 20A, 20C, 20D, 20E and 20F, it is determined that the image reduction process is performed and the image conversion process proceeds to step S112. When the output scheme of the image display apparatus is not the spatial division output scheme illustrated in FIGS. 20A, 20C, 20D, 20E and 20F, that is, when the output scheme of the image display apparatus is any one of the simultaneous output scheme of the left eye image and the right eye image as illustrated in FIGS. 15A to 15E, FIGS. 16A to 16E and FIGS. 17A to 17E, the time division output scheme illustrated in FIGS. 18A, 18C, 18D and 18E, and the time division output scheme using the twice frame rate illustrated in FIGS. 19A, 19C, 19D and 19E, since the image reduction process is not necessary, the image conversion process proceeds to step S114.

In steps S112 and S113, the image synthesizing section 134 generates the binocular parallax image illustrated in FIG. 20F from the right eye image illustrated in FIG. 20D and the left eye image illustrated in FIG. 20E as previously described with reference to FIGS. 20A, 20C, 20D, 20E and 20F. That is, the image synthesizing section 134 reduces the right eye image illustrated in FIG. 20D and the left eye image illustrated in FIG. 20E by ½ in the vertical direction by shifting the phases of the right eye image and the left eye image by one line (step S112). In addition, the image synthesizing section 134 alternately synthesizes the left eye image and the right eye image, which are obtained in this way, in units of horizontal lines, thereby generating one binocular parallax image illustrated in FIG. 20F (step S113).

In step S114, it is determined whether an image output process has been completed in the image output unit 150. When the image output process has been completed, the image conversion process is completed. When the image output process has not been completed, the image conversion process proceeds to step S115.

In step S115, after the frame counter is incremented, the image conversion process proceeds to step S101 and the processes of steps S101 to S114 are repeated.

In addition, the flow illustrated in FIG. 26 corresponds to the process of the image conversion unit having the configuration illustrated in FIG. 4.

In the case of using an image conversion unit having a configuration of generating images sequentially causing large parallax by connecting the plurality of path image conversion sections described with reference to FIGS. 21 to 25, for example, the processes of steps S104 to S106 in the flow illustrated in FIG. 26 are differently set.

In the configuration of the image conversion unit described with reference to FIG. 21, the output selection section 301 illustrated in FIG. 21 performs a process of selecting a path image conversion section that employs output corresponding to each pixel as its own output. A process of determining information regarding the selection based on depth information is performed. Consequently, in the configuration of FIG. 21, the processes of steps S104 to S106 in the flow illustrated in FIG. 26 can be replaced with the path selection process based on the depth information.

Furthermore, in the configuration of the image conversion unit having the configuration described with reference to FIG. 23, the content of the gain coefficient calculation process of step S104 is different. In the configuration of the image conversion unit described with reference to FIG. 23, each path image conversion section 400 calculates a gain coefficient to be used. According to the gain coefficient calculation process, the gain coefficient is calculated based on the following settings. In the case where the distance of a subject is small, that is, depth is shallow, a gain coefficient multiplied in the stage with a small number of paths is increased and a gain coefficient multiplied in the stage with a large number of paths is reduced. Furthermore, in the case where the distance of a subject is large, that is, depth is deep, a gain coefficient multiplied in the stage with a small number of paths is reduced and a gain coefficient multiplied in the stage with a large number of paths is increased.

In addition, in the configuration of the image conversion unit having the configuration described with reference to FIG. 23, it is necessary to calculate weight information regarding respective output values of the first to $n^{th}$ path image conversion sections.

Figure 27:
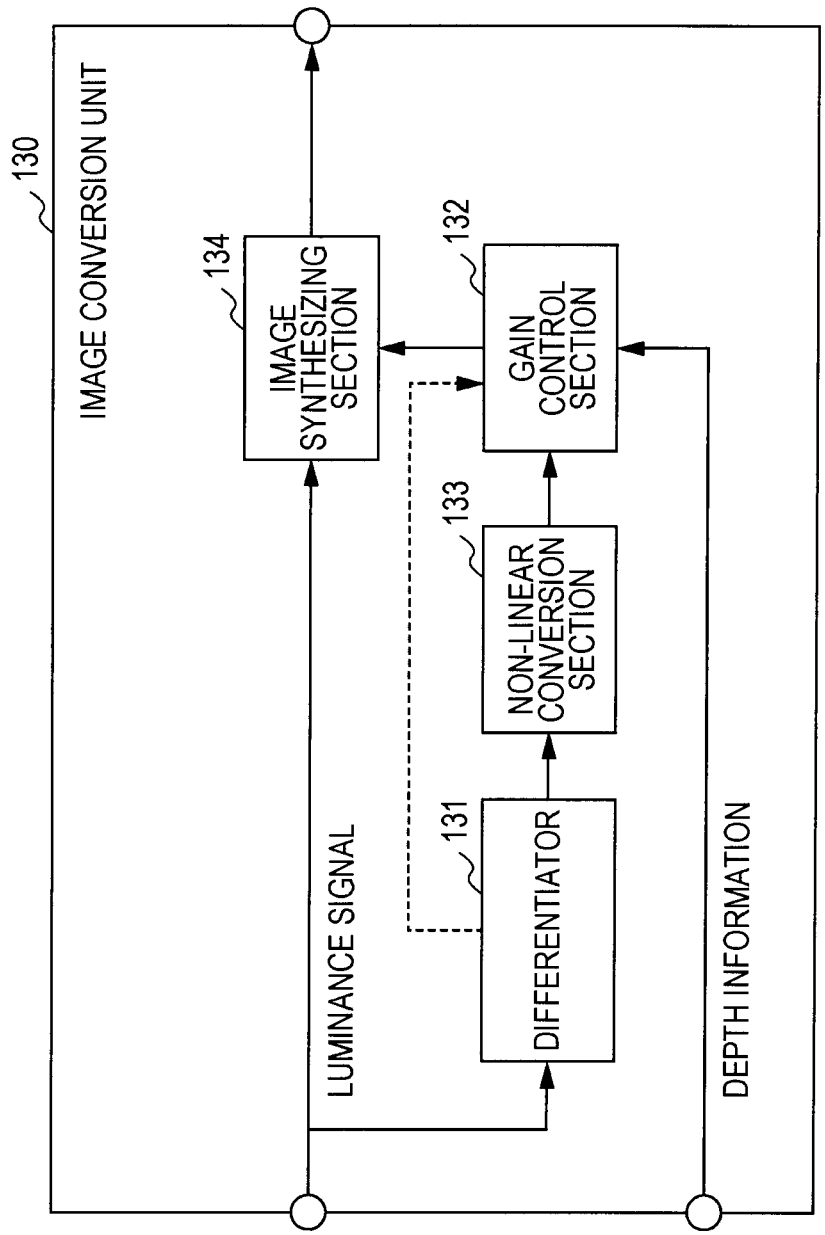
FIG. 27 is a diagram explaining a configuration example of an image conversion unit of an image processing apparatus according to an embodiment of the present invention.

Moreover, the image conversion unit, for example, may have the configuration as illustrated in FIG. 27. According to the configuration of the image conversion unit 130 illustrated in FIG. 27, the positions of the gain control section 132 and the non-linear conversion section 133 are changed, as compared with the configuration of the image conversion unit illustrated in FIG. 4.

According to the configuration illustrated in FIG. 27, the non-linear conversion section 133 performs a non-linear conversion (refer to FIG. 8) with the differential signal generated by the differentiator 131 and inputs a non-linear conversion result to the gain control section 132 so that a gain coefficient based on the subject distance (depth information) is multiplied to generate the corrected differential & non-linear processed signal E'. In such a case, the process sequence is different from that in the configuration illustrated in FIG. 4. However, the result is almost the same as that in the configuration illustrated in FIG. 4.

According to the image processing apparatus of the embodiment of the present invention as described above, two-dimensional image data is input, a feature value of the image, that is, edge portions in which luminance changes are extracted, and the image patterns of the edge portions are changed, thereby generating the right eye image and the left eye image. With such a configuration, it is possible to generate an appropriate binocular parallax image in a stereoscopic display apparatus.

In addition, depth information corresponding to the distance of a subject from a camera is obtained, the gain control of the differential signal H is performed with respect to the input signal S according to the depth information to generate the corrected differential signal H', and the left eye signal L and the right eye signal R are generated through the addition and subtraction of the corrected differential signal H' or the parallax emphasis signal E', which is obtained by non-linearly converting the corrected differential signal H', and the input signal, so that it is possible to generate a binocular parallax image in which parallax based on the subject distance (depth) is set.

Moreover, it is possible to generate a parallax image embedded with all effective pixel values without any problem (refer to FIG. 1) with occlusion occurring in the generation of a parallax image caused by pixel shift according to the related art.

10. Effect at the time of Two-Dimensional (2D) Display Process

In addition, the image processing apparatus according to the embodiment of the present invention generates the right eye image Right and the left eye image Left as described below.

That is, the differential signals H illustrated in FIGS. 9B and 10B for the input signals S in FIGS. 9A and 10A are multiplied by the gain values based on distances to generate the corrected differential signals H' illustrated in FIGS. 9C and 10C, and the right eye image signals Right illustrated in FIGS. 9D and 10D and the left eye image signals Left illustrated in FIGS. 9E and 10E are generated using the corrected differential signals H' illustrated in FIGS. 9C and 10C and the input signals S.

Right=S−H'

Left=S+H'

Otherwise, the right eye image signals Right illustrated in FIGS. 9D and 10D and the left eye image signals Left illustrated in FIGS. 9E and 10E are generated using the parallax emphasis signal E', which is obtained by non-linearly converting the corrected differential signals H' illustrated in FIGS. 9C and 10C, and the input signals S.

Right=S−E'

Left=S+E'

As can be understood from the equations above, an addition signal generated by adding the right eye image signal and the left eye image signal is as follows.

Addition signal=(S+H')+(S−H')=S or

Addition signal=(S+E')+(S−E')=S

As a result, the addition signal is equivalent to the input image.

Thus, for example, in the case where the image is displayed on a stereoscopic display apparatus employing the time division scheme as described with reference to FIGS. 18A, 18C, 18D and 18E or FIGS. 19A, 19C, 19D and 19E, if a user (observer) observes the image without wearing glasses based on a liquid crystal shutter scheme, the user perceives an image, in which the left eye image Left and the right eye image Right have been integrated, by a temporal integration function of the human vision system. That is, the image is equivalent to the addition signal S.

Addition signal=(S+H')+(S−H')=S or

Addition signal=(S+E')+(S−E')=S

In other words, it is possible to perceive a two-dimensional input image as is. That is, the input image is not viewed as an unnatural double image and can be observed as an image for which no processes have been performed.

Furthermore, in the case where the image is displayed on a stereoscopic display apparatus employing the spatial division scheme as illustrated in FIGS. 20A, 20C, 20D, 20E and 20F, when a user observes the image from such a distance to the extent that the user may not perceive one pixel in the vertical direction without wearing polarizing glasses, the user perceives an image in which two pixels in the vertical direction are added. That is, this image is equivalent to the addition signal S.

Addition signal=(S+H')+(S−H')=S or

Addition signal=(S+E')+(S−E')=S

Meanwhile, since the retinal disparity of human sight is about ten times as high when using the glasses as normal sight, the retinal disparity between the left eye image and the right eye image can be sufficiently recognized even if the user observes the image from such a distance. Consequently, when the user has taken off the polarizing glasses, the image is not viewed as an unnatural double image and can be observed as an image for which no processes have been performed. If the user wears the polarizing glasses, stereoscopic perception is possible.

As described above, the image generated by the image processing apparatus according to the embodiment of the present invention is displayed on a stereoscopic display apparatus, so that stereoscopic perception is possible when a user wears stereoscopic vision glasses and the image can be perceived as a two-dimensional image for which no conversion has been performed when a user does not wear the stereoscopic vision glasses.

As described above, the addition signal is set to be equivalent to or almost equivalent to the input signal. Consequently, when a user sees an image displayed on a stereoscopic display apparatus, the user can perceive stereoscopic representation if the user wears the stereoscopic vision glasses and can perceive the image as a normal two-dimensional image if the user does not wear the stereoscopic vision glasses. That is, it is possible to appreciate an image regardless of whether a user wears the glasses. Furthermore, in the image processing apparatus according to the embodiment of the present invention, parallax between the left eye image and the right eye image is significantly small and fatigue of a user when the user wears the stereoscopic vision glasses can be reduced.

11. Embodiment Including Image Display Unit

The image processing apparatus described with reference to FIGS. 2 and 3 does not have an image display unit. However, the image processing apparatus may also have an image display unit. FIG. 28 is a diagram illustrating the image processing apparatus including the image display unit according to an embodiment.

In the image display apparatus 500, an image input unit 110 receives a still image file output from a digital still camera and the like, and a moving image data output from a camcorder and the like, and converts them into an internal data format. Herein, the internal data format represents moving image data of a baseband, and includes video data of the three primary colors of red (R), green (G) and blue (B) or video data of luminance (Y) and color difference (Cb and Cr). In the internal data format, any color spaces can be employed if an identifying signal of a color space is superimposed and a color space conversion unit 120 of a subsequent stage corresponds to the image input unit 110.

A depth information output unit 115 receives depth information, which corresponds to the input image signal of the image input unit 110, from an outside or generates the depth information therein, and outputs the depth information to an image conversion unit 130. The depth information, for example, includes a distance image and the like as illustrated in FIG. 1B. A data format is not specified.

The video data, which is output from the image input unit 110, is input to the color space conversion unit 120 and is converted into a luminance signal and a color difference signal. At this time, when the input video data conforms to the Y, Cb and Cr color space, the color space conversion unit 120 outputs the input video data without performing a color space conversion. When the input video data conforms to the R, G and B color space or other color spaces, the color space conversion unit 120 converts the input video data into a luminance (Y) and color difference (Cb and Cr) signal and output the converted signal.

Herein, the color space of the video data, which is output from the color space conversion unit 120, is not limited to the Y, Cb and Cr color space. For example, any color spaces can be employed if a luminance component and a color component are separated from them.

The video data, which is output from the color space conversion unit 120, is input to the image conversion unit 130. The image conversion unit 130 generates binocular parallax images for the left eye and the right eye through the process which has been previously described, synthesizes these images according to the type of the image display unit 550, and outputs the synthesized image.

The video data, which is output from the image conversion unit 130, is input to an inverse color space conversion unit 140, and the Y, Cb and Cr color space is converted into a R, G and B color space.

The video data, which is output from the inverse color space conversion unit 140, is input to the image display unit 550. The image display unit 550 serves as both an image output unit and a display unit, and performs image display according to any one of stereoscopic display schemes (a time division scheme or a spatial division scheme) described below.

Time Division Scheme

According to a time division stereoscopic display method, an odd number frame and an even number frame of input video data are recognized as a left eye image and a right eye image (or a right eye image and a left eye image), respectively, and video is temporally and alternately provided to the left eye and the right eye by controlling glasses based on a liquid crystal shutter scheme which are worn by a user. According to this display method, the image display unit 550 controls the output switching timing of the left eye image and the right eye image in synchronization with the shutter switching of right and left parts of glasses worn by a viewer.

Spatial Division Scheme

According to a spatial division stereoscopic display method, after polarizing filters, in which the polarizing directions thereof are set to change for each horizontal line, are bonded to the front surface of a display unit, when a user sees an image with glasses based on a polarizing filter scheme, video separated for each horizontal line is provided to both eyes of the user.

As described above, in the image processing apparatus according to the embodiment of the present invention, two-dimensional image data is input and a right eye image and a left eye image are generated from a feature value of the image in a pseudo way, so that a stereoscopic display using binocular parallax can be performed. In addition, in the image processing apparatus according to the embodiment of the present invention, since an image conversion is performed such that an image obtained by adding the left eye image to the right eye image is equivalent to the input image, a user can perceive stereoscopic representation if the user wears the stereoscopic vision glasses and can perceive the image as a normal two-dimensional image if the user does not wear the stereoscopic vision glasses, so that it is possible to appreciate the image regardless of whether the user wears the glasses. Moreover, in the image display apparatus according to the embodiment of the present invention, a parallax between the left eye image and the right eye image is significantly small and fatigue of a user when the user wears the stereoscopic vision glasses can be reduced.

So far, the specific embodiment of the present invention has been described in detail. However, it will be apparent to those skilled in the art that modification and substitution can be made within the scope of the present invention. That is, the present invention is disclosed in the form of exemplification and should not be limited in interpretation. In order to determine the scope of the present invention, the section of the appended claims should be taken into consideration.

Furthermore, a series of processes described in the specification can be performed by hardware, software, or a composite configuration of the hardware and software. When the processes are performed by software, the program recording a process sequence can be executed after being installed in a memory in a computer, which is embedded in dedicated hardware, or the program can be executed after being installed in a general-purpose computer capable of performing various processes. For example, program can be recorded on a recording medium in advance. The program can not only be installed from the recording medium to the computer, but can also be installed on a recording medium such as an embedded hard disk after being received through a network called a LAN (Local Area Network) or the Internet.

In addition, various processes written in the specification can not only be performed in time series according to the writing thereof, but can also be performed in parallel or individually according to the processing capacity of an apparatus, which performs the processes, or if necessary. Moreover, it should be noted that the system referred to herein denotes a logical aggregation of a plurality of apparatuses and each component apparatus is not necessarily accommodated in the same housing.

The present application contains subject matter related to that disclosed in Japanese Priority Patent Application JP 2009-283080 filed in the Japan Patent Office on Dec. 14, 2009, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An image processing apparatus comprising:
an image input unit that inputs a two-dimensional image signal;
a depth information output unit that inputs or generates depth information of image areas constituting the two-dimensional image signal;
an image conversion unit that receives the image signal and the depth information from the image input unit and the depth information output unit, and generates and outputs a left eye image and a right eye image for realizing binocular stereoscopic vision; and
an image output unit that outputs the left eye image and the right eye image, which are output from the image conversion unit,
wherein the image conversion unit:
extracts a spatial feature value of the input image signal, performs an image conversion process including an emphasis process applying the feature value and the depth information with respect to the input image signal, thereby generating at least one of the left eye image and the right eye image, extracts a luminance differential signal of the input image signal, sets the luminance differential signal as the feature value, generates a corrected differential signal by performing gain control based on depth information in units of image areas with respect to the differential signal, generates at least two signals which are obtained by adding the corrected differential signal to the input image signal and subtracting the corrected differential signal from the input image signal, respectively, and generates a pair of the at least two signals as a pair of the left eye image and the right eye image;

wherein the image conversion unit comprises:

a phase control signal generation part that generates a differential signal for an input signal;

a non-linear conversion part that performs a non-linear conversion process with respect to the differential signal generated by the phase control signal generation part;

an image synthesizing part that adds output of the non-linear conversion part to the input signal or subtracting the output of the non-linear conversion part from the input signal; and processing paths through which an image conversion process by image conversion modules including the phase control signal generation part, the non-linear conversion part and the image synthesizing part is repeated, and wherein the image conversion unit selects and synthesizes output of each image conversion module constituting the processing path according to the depth information which is output from the depth information output unit, thereby generating the left eye image or the right eye image.

2. The image processing apparatus according to claim 1, wherein the image conversion unit generates any one of conversion signals, which are obtained by adding the corrected differential signal to the input image signal or subtracting the corrected differential signal from the input image signal, as the left eye image or the right eye image, and outputs a non-conversion signal, which corresponds to the input image signal not subject to a process, as an eye image different from the conversion signal.

3. The image processing apparatus according to claim 2, wherein the image conversion unit performs a correction process of the luminance differential signal based on large gain with respect to an image area where the depth information which is output from the depth information output unit is large, and a correction process of the luminance differential signal based on small gain with respect to an image area where the depth information is small, thereby generating the corrected differential signal.

4. The image processing apparatus according to claim 2, wherein the image conversion unit generates signals, which are obtained by adding a signal obtained by non-linearly converting the corrected differential signal to the input image signal or subtracting the signal from the input image signal, and generates any one of the signals as the left eye image or the right eye image.

5. The image processing apparatus according to claim 1, wherein the image conversion unit further comprises:

a gain control part that performs gain control based on a gain coefficient, which is set according to the depth information which is output from the depth information output unit, with respect to the differential signal generated by the phase control signal generation part, thereby generating a corrected differential signal; and an image synthesizing section that synthesizes output of each image conversion module constituting the processing path according to the weight values calculated by the weight value calculation part, thereby generating the left eye image or the right eye image.

6. The image processing apparatus according to claim 1, wherein the image conversion unit further comprises:

a multiplication processing part that generates a corrected differential signal by multiplying the differential signal generated by the phase control signal generation part by a gain coefficient set according to the depth information which is output from the depth information output unit; and an image synthesizing section that synthesizes output of each image conversion module constituting the processing path according to the weight values calculated by the weight value calculation part, thereby generating the left eye image or the right eye image.

7. The image processing apparatus according to claim 1, wherein the image conversion unit generates the left eye image and the right eye image with respect to each frame constituting a moving image.

8. The image processing apparatus according to claim 7, further comprising an image output unit that alternately outputs the left eye image and the right eye image, which is generated by the image conversion unit, at a frame rate twice as fast as a frame rate of an input image frame.

9. The image processing apparatus according to claim 1, wherein the image conversion unit alternately generates either the left eye image or the right eye image with respect to each frame constituting a moving image.

10. The image processing apparatus according to claim 1, wherein the image conversion unit generates the left eye image and the right eye image with respect to each frame constituting a moving image, and generates a binocular parallax image alternately including line data constituting the generated left and right eye images.

11. The image processing apparatus according to claim 1, wherein the image conversion unit generates the left eye image and the right eye image based on a setting in which an addition signal of the generated left and right eye images is equivalent to or almost equivalent to the input signal.

12. The image processing apparatus according to claim 1, further comprising an image display unit that displays the images generated by the image conversion unit.

13. The image processing apparatus according to claim 12, wherein the image display unit performs a time division stereoscopic display process of alternately outputting the left eye image and the right eye image.

14. The image processing apparatus according to claim 13, wherein, when the image display unit performs a time division stereoscopic display process of alternately outputting the left eye image and the right eye image, the image display unit switches an output switching timing of the left eye image and the right eye image in synchronization with shutter switching of right and left parts of glasses worn by an image observer.

15. The image processing apparatus according to claim 12, wherein the image display unit has a configuration in which polarizing filters are bonded to the front surface thereof, and displays the binocular parallax image alternately including the line data constituting the left eye image and the right eye image generated by the image conversion unit, polarizing directions of the polarizing filters being set to change for each horizontal line.

16. An image processing method in an image processing apparatus, comprising the steps of:

inputting a two-dimensional image signal by an image input unit;

receiving or generating depth information of image areas constituting the two-dimensional image signal by a depth information output unit;

receiving the image signal, which is output from the image input unit, and the depth information, which is output from the depth information output unit, and generating and outputting a left eye image and a right eye image for realizing binocular stereoscopic vision by an image conversion unit; and outputting the left eye image and the right eye image, which are output from the image conversion unit, by an image output unit wherein the step of receiving the image signal and the depth information further comprises extracting a spatial feature value of the input image signal, performing an image conversion process including an emphasis process applying the feature value and the depth information with respect to the input image signal, resulting in generation of at least one of the left eye image and the right eye image, extracting a luminance differential signal of the input image signal, setting the luminance differential signal as the feature value, generating a corrected differential signal by performing gain control based on depth information in units of image areas with respect to the differential signal, generating at least two signals which are obtained by adding the corrected differential signal to the input image signal and subtracting the corrected differential signal from the input image signal, respectively, and generating a pair of the at least two signals as a pair of the left eye image and the right eye image, and wherein the image conversion unit comprises:

a phase control signal generation part that generates a differential signal for an input signal;

a non-linear conversion part that performs a non-linear conversion process with respect to the differential signal generated by the phase control signal generation part;

an image synthesizing part that adds output of the non-linear conversion part to the input signal or subtracting the output of the non-linear conversion part from the input signal; and processing paths through which an image conversion process by image conversion modules including the phase control signal generation part, the non-linear conversion part and the image synthesizing part is repeated, and wherein the image conversion unit selects and synthesizes output of each image conversion module constituting the processing path according to the depth information which is output from the depth information output unit, thereby generating the left eye image or the right eye image.

17. A non-transitory, computer-readable medium comprising instructions that cause a computer to execute image processing of an image processing apparatus, the image processing comprising:

inputting a two-dimensional image signal by an image input unit;

receiving or generating depth information of image areas constituting the two-dimensional image signal by a depth information output unit;

receiving the image signal, which is output from the image input unit, and the depth information, which is output from the depth information output unit, and generating and outputting a left eye image and a right eye image for realizing binocular stereoscopic vision by an image conversion unit; and outputting the left eye image and the right eye image, which are output from the image conversion unit, by an image output unit wherein the step of receiving the image signal and the depth information further comprises extracting a spatial feature value of the input image signal, performing an image conversion process including an emphasis process applying the feature value and the depth information with respect to the input image signal, resulting in generation of at least one of the left eye image and the right eye image, extracting a luminance differential signal of the input image signal, setting the luminance differential signal as the feature value, generating a corrected differential signal by performing gain control based on depth information in units of image areas with respect to the differential signal, generating at least two signals which are obtained by adding the corrected differential signal to the input image signal and subtracting the corrected differential signal from the input image signal, respectively, and generating a pair of the at least two signals as a pair of the left eye image and the right eye image, and wherein the image conversion unit comprises:

a phase control signal generation part that generates a differential signal for an input signal;

a non-linear conversion part that performs a non-linear conversion process with respect to the differential signal generated by the phase control signal generation part;

an image synthesizing part that adds output of the non-linear conversion part to the input signal or subtracting the output of the non-linear conversion part from the input signal; and processing paths through which an image conversion process by image conversion modules including the phase control signal generation part, the non-linear conversion part and the image synthesizing part is repeated, and wherein the image conversion unit selects and synthesizes output of each image conversion module constituting the processing path according to the depth information which is output from the depth information output unit, thereby generating the left eye image or the right eye image.

* * * * *